US009009829B2

(12) United States Patent
Stolfo et al.

(10) Patent No.: US 9,009,829 B2
(45) Date of Patent: Apr. 14, 2015

(54) METHODS, SYSTEMS, AND MEDIA FOR BAITING INSIDE ATTACKERS

(75) Inventors: Salvatore J. Stolfo, Ridgewood, NJ (US); Angelos D. Keromytis, New York, NY (US); Brian M. Bowen, New York, NY (US); Shlomo Hershkop, Brooklyn, NY (US); Vasileios P. Kemerlis, New York, NY (US); Pratap V. Prabhu, New York, NY (US); Malek Ben Salem, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 549 days.

(21) Appl. No.: 12/565,394

(22) Filed: Sep. 23, 2009

(65) Prior Publication Data

US 2010/0077483 A1    Mar. 25, 2010

Related U.S. Application Data

(63) Continuation-in-part of application No. PCT/US2008/066623, filed on Jun. 12, 2008.

(60) Provisional application No. 60/934,307, filed on Jun. 12, 2007, provisional application No. 61/044,376, filed on Apr. 11, 2008, provisional application No. 61/099,526, filed on Sep. 23, 2008, provisional application No. 61/165,634, filed on Apr. 1, 2009.

(51) Int. Cl.
*G06F 11/00* (2006.01)
*G06F 21/55* (2013.01)
(Continued)

(52) U.S. Cl.
CPC ............ *G06F 21/554* (2013.01); *G06F 21/566* (2013.01); *H04L 63/1466* (2013.01)

(58) Field of Classification Search
CPC .. G06F 21/554; G06F 21/566; H04L 63/1466
USPC .................................................... 726/23, 24
See application file for complete search history.

(56) References Cited

U.S. PATENT DOCUMENTS 5,440,723 A    8/1995    Arnold et al.
5,621,889 A    4/1997    Lermuzeaux et al.
(Continued)

FOREIGN PATENT DOCUMENTS

WO    WO/2008/041915    4/2008

OTHER PUBLICATIONS

The International Search Report and the Written Opinion of the International Searching Authority, International Patent Application No. PCT/US08/66623, Feb. 13, 2009.

(Continued)

*Primary Examiner* — Peter Shaw
(74) *Attorney, Agent, or Firm* — Byrne Poh LLP

(57) ABSTRACT

Methods, systems, and media for providing trap-based defenses are provided. In accordance with some embodiments, a method for providing trap-based defenses is provided, the method comprising: generating decoy information based at least in part on actual information in a computing environment, wherein the decoy information is generated to comply with one or more document properties; embedding a beacon into the decoy information; and inserting the decoy information with the embedded beacon into the computing environment, wherein the embedded beacon provides a first indication that the decoy information has been accessed by an attacker and wherein the embedded beacon provides a second indication that differentiates between the decoy information and the actual information.

46 Claims, 24 Drawing Sheets

(51) Int. Cl.
*G06F 21/56* (2013.01)
*H04L 29/06* (2006.01)

(56) References Cited

U.S. PATENT DOCUMENTS

| | | | |
|---|---|---|---|
| 5,796,952 A * | 8/1998 | Davis et al. ............... 709/224 |
| 5,987,611 A | 11/1999 | Freund |
| 5,991,714 A | 11/1999 | Shanner |
| 6,108,799 A | 8/2000 | Boulay et al. |
| 6,405,318 B1 | 6/2002 | Rowland |
| 6,408,391 B1 | 6/2002 | Huff et al. |
| 6,671,811 B1 | 12/2003 | Diep et al. |
| 6,687,833 B1 | 2/2004 | Osborne et al. |
| 6,963,983 B2 | 11/2005 | Munson et al. |
| 7,093,291 B2 | 8/2006 | Bailey |
| 7,152,242 B2 | 12/2006 | Douglas |
| 7,155,509 B1 | 12/2006 | Cordsmeyer et al. |
| 7,355,600 B2 | 4/2008 | Baraff et al. |
| 7,356,844 B2 | 4/2008 | Lyle et al. |
| 7,424,735 B2 | 9/2008 | Sorkin et al. |
| 7,428,484 B2 | 9/2008 | Yun et al. |
| 7,463,265 B2 | 12/2008 | Styles |
| 7,464,407 B2 | 12/2008 | Nakae et al. |
| 7,464,408 B1 | 12/2008 | Shah et al. |
| 7,475,405 B2 | 1/2009 | Manganaris et al. |
| 7,545,379 B2 | 6/2009 | Xie et al. |
| 7,603,709 B2 | 10/2009 | Lewis et al. |
| 7,673,147 B2 | 3/2010 | Moghe et al. |
| 7,716,181 B2 | 5/2010 | Todd |
| 7,788,071 B2 | 8/2010 | Bond et al. |
| 7,908,652 B1 | 3/2011 | Austin et al. |
| 2002/0035696 A1 | 3/2002 | Thacker |
| 2002/0066034 A1 | 5/2002 | Schlossberg et al. |
| 2002/0116635 A1 | 8/2002 | Sheymov |
| 2002/0184528 A1 | 12/2002 | Shevenell et al. |
| 2002/0197978 A1 | 12/2002 | Zavidniak |
| 2004/0049693 A1 | 3/2004 | Douglas |
| 2004/0111632 A1 | 6/2004 | Halperin |
| 2004/0148521 A1 | 7/2004 | Cohen et al. |
| 2004/0172557 A1 | 9/2004 | Nakae et al. |
| 2004/0260733 A1 | 12/2004 | Adelstein et al. |
| 2005/0071643 A1 | 3/2005 | Moghe |
| 2005/0172115 A1 | 8/2005 | Bodorin et al. |
| 2005/0188272 A1 | 8/2005 | Bodorin et al. |
| 2005/0265331 A1 | 12/2005 | Stolfo et al. |
| 2005/0281291 A1 | 12/2005 | Stolfo et al. |
| 2006/0015630 A1 | 1/2006 | Stolfo et al. |
| 2006/0085854 A1 | 4/2006 | Agrawal et al. |
| 2006/0123083 A1 | 6/2006 | Goutte et al. |
| 2006/0242694 A1 | 10/2006 | Gold et al. |
| 2006/0265750 A1 | 11/2006 | Huddleston |
| 2007/0101430 A1 | 5/2007 | Raikar |
| 2007/0157289 A1 * | 7/2007 | Newton et al. ............... 726/2 |
| 2007/0250930 A1 | 10/2007 | Aziz et al. |
| 2007/0271614 A1 | 11/2007 | Capalik |
| 2007/0283434 A1 * | 12/2007 | Cohen et al. ............... 726/22 |
| 2007/0283435 A1 * | 12/2007 | Cohen et al. ............... 726/22 |
| 2007/0291043 A1 | 12/2007 | Bruderlin et al. |
| 2008/0022400 A1 * | 1/2008 | Cohen et al. ............... 726/22 |
| 2009/0007270 A1 | 1/2009 | Futoransky et al. |
| 2009/0028135 A1 | 1/2009 | Mantripragada et al. |
| 2009/0044042 A1 | 2/2009 | Fujiwara et al. |
| 2009/0083855 A1 | 3/2009 | Apap et al. |
| 2009/0227281 A1 | 9/2009 | Hammad et al. |
| 2009/0292696 A1 | 11/2009 | Shuster |
| 2009/0293121 A1 | 11/2009 | Bigus et al. |
| 2010/0064370 A1 | 3/2010 | Thiebeauld de la Crouee et al. |
| 2010/0077483 A1 | 3/2010 | Stolfo et al. |
| 2010/0269175 A1 | 10/2010 | Stolfo et al. |
| 2011/0010470 A1 | 1/2011 | Hulbert et al. |
| 2011/0093630 A1 | 4/2011 | Arnholt, Jr. et al. |
| 2011/0167493 A1 * | 7/2011 | Song et al. ............... 726/23 |

OTHER PUBLICATIONS

International Preliminary Report on Patentability in International Patent Application No. PCT/US2007/012811, filed May 31, 2007.
"A Visual Data Hash Method" Air Force Research Report, Oct. 2004.
Abou-Assaleh, T., et al., "Detection of New Malicious Code Using N-grams Signatures" Proceedings of Second Annual Conference on Privacy, Security and Trust, Oct. 13-15, 2004.
Abou-Assaleh, T., et al., "N-Gram-Based Detection of New Malicious Code", in Proceedings of the 28th IEEE Annual International Computer Software and Applications Conference, COMPSAC 2004. Hong Kong. Sep. 28-30, 2004.
Aha, D.W., et al., Instance-Based Learning Algorithms, "Machine Learning", vol. 6, Issue 1, 1991, pp. 37-66.
Akritidis, P., et al., "Proximity Breeds Danger: Emerging Threats in Metro-Area Wireless Networks", Proceedings of the 16th USENIX Security Symposium, pp. 323-338 (Aug. 2007).
Antisniff, http://packetstormsecurity.org/sniffers/antisniff/.
Arbaugh, W.A., "Chaining Layered Integrity Checks", PhD thesis, University of Pennsylvania, 1999.
Arbaugh, W.A., et al., "A Secure and Reliable Bootstrap Architecture", in IEEE Security and Privacy Conference, pp. 65-71, May 1997.
Bailey, M., et al., "The Blaster Worm: Then and Now", IEEE Security & Privacy, 3(4):26-31, Jul./Aug. 2005.
Barham, P., et al., "Xen and the Art of Virtualization", Proceedings of the 19th ACM Symposium on Operating Systems Principles, Bolton Landing, NY, Oct. 2003.
Beck, M., and Tews, E., "Practical Attacks Against WEP and WPA", Proceedings of the 2nd ACM Conference on Wireless Network Security, pp. 79-85 (Mar. 2009).
Bell, D. and LaPadula, L., "Secure Computer Systems: Mathematical Foundations and Model", Technical Report ESD-TR-74-244, Mitre Corp, Bedford, MA, May 1973.
Bellard, F., "Qemu, a Fast and Portable Dynamic Translator", in Proceedings of USENIX Annual Technical Conference, Anaheim, CA, USA, Apr. 2005, pp. 41-46.
Bittau, A., et al., "The Final Nail in WEP's Coffin", Proceedings of the 2006 IEEE Symposium on Security and Privacy, pp. 386-400 (May 2006).
Bloom B.H., "Space/Time Trade-Offs in Hash Coding with Allowable Errors", Communications of the ACM, v.13 n. 7, p. 422-426, Jul. 1970.
Bond, M. and Danezis, G., "A Pact with the Devil", in Proceedings of the New Security Paradigms Workshop (NSPW), Dagstuhl, Germany, Sep. 2006, pp. 77-83.
Borders, K., et al., "Siren: Catching evasive malware," in Proc. of the IEEE Symposium on Security and Privacy (S&P), Oakland, CA, USA, May 2006, pp. 78-85.
Bowen B, Kemerlis VP, Prabhu P, Keromytis AD, Stolfo SJ, Automating the injection of believable decoys to detect snooping. In: Proceedings of the third ACM Conference on Wireless Network Security (WiSec). pp. 81 {86 (2010).
Bowen, B. et al., "Baiting Inside Attackers Using Decoy Documents", Proc. 5th International ICST Conference on Security and Privacy in Communication Networks, (SecureComm 2009), Sep. 2009.
Bowen, B.M., et al., "Designing Host and Network Sensors to Mitigate the Insider Threat", in IEEE Security & Privacy Magaize, 7(6):22-29, Nov./Dec. 2009.
Butler, J., and Sherri, S., "Security: Spyware and Rootkits", Login, vol. 29, No. 6, Dec. 2004.
CERT Advisory CA-2001-19, "Code Red Worm Exploiting Buffer Overflow in IIS Indexing Service DLL," http://www.cert.org/advisories/CA-2001-19.html, Jul. 2001.
CERT Advisory CA-2001-26, "Nimda Worm," http://www.cert.org/advisories/CA-2001-26.html, Sep. 2001.
CERT Advisory CA-2003-04: MS-SQL Server Worm. http://www.cert.org/advisories/CA-2003-04.html, Jan. 2003.
CERT Advisory CA-2003-2o: W32/Blaster Worm. http://www.cert.org/advisories/CA-2003-20.html, Aug. 2003.
Chandrasekaran, M., et al., "Spycon: Emulating User Activities to Detect Evasive Spyware", in Proceedings of the Performance, Com-

(56) References Cited

OTHER PUBLICATIONS puting, and Communications Conference (IPCCC), New Orleans, LA, USA, May 2007, pp. 502-509.

Chen, P.M. and Noble, B.D., "When Virtual is Better Than Real," in Proceedings of the 8th Workshop on Hot Topics in Operating System (HotOS), Washington, DC, USA, May 2001, pp. 133-138.

Cheswick, "An Evening with Berferd in Which a Cracker is Lured, Endured, and Studied," AT&T Bell Laboratories, www.cheswick.com/ches/papers/berferd.pdf, Jan. 7, 1991.

Chinchani, R., et al., "RACOON: Rapidly Generating User Command Data for Anomaly Detection from Customizable Templates", Computer Security Applications Conference, 2004. 20th Annual Volume, Issue, Dec. 6-10, 2004.

Chou, N., et al., "Client-Side Defense Against Web-Based Identity Theft", in Proceedings of the ISOC Symposium on Network and Distributed Systems Security (SNDSS), Feb. 2004.

Christodorescu, M. and Jha, S., "Static Analysis of Executables to Detect Malicious Patterns", in Proceedings of the 12th USENIX Security Symposium, pp. 169-186, Aug. 2003. Washington, D.C.

Christodorescu, M. and Jha, S., "Testing Malware Detectors", in Proceedings of the International Symposium on Software Testing and Analysis (ISSTA), Jul. 2004.

Clark, D.D. and Wilson, D.R., "A Comparison of Commercial and Military Computer Security Policies", in Proceedings of the IEEE Symposium on Security and Privacy, 1987.

Costa, P.C.G., et al., "DTB Project: A Behavioral Model for Detecting insider Threats", International Conference on Intelligence Analysis. McLean, VA, 2005.

Coull, S., et al., "Intrusion Detection: A Bioinformatics Approach", Proceedings of the 19th Annual Computer Security Applications Conference, 2003.

Cover, T.M. and Hart, P.E., "Nearest Neighbor Pattern Classification", IEEE Trans. On Information Theory, 1967.

Cracknell, P., et al., "The Wireless Security Survey of New York City", Technical Report, RSA, The Secuirty division of EMC (2008).

Cui, W., et al., "Protocol-Independent Adaptive Replay of Application Dialog", in Proceedings of the 13 Symposium on Network and Distributed System Security (SNDSS), Feb. 2006.

Cully, B., et al., "Remus: High Availability via Asynchronous Virtual Machine Replication", in Proceedings of the USENIX Symposium on Networked Systems Design and Implementation (NSDI), San Francisco, CA, USA, Apr. 2008, pp. 161-174.

Dagon, D., et al., "HoneyStat: Local Worm Detection Using Honeypots." in Proceedings of the 7th International Symposium on Recent Advances in Intrusion Detection (RAID), pp. 39-58, Oct. 2004.

Damashek, M., "Gauging Similarity with N-Grams: Language-Independent Categorization of Text", Science, 267(5199): 843-848. (1995).

Dark Reading, "Researcher uncovers massive, sophisticated trojan targeting top businesses", Darkreading, Jul. 29, 2009 [Online]. Available: http://www.darkreading.com/database_security/security/privacy/showArticle.jhtml?articleID=218800077.

Dash SK, Rawat S, Vijaya Kumari G, Pujari AK, "Masquarade Detection Using IA Network", Computer Security Applications Conference, 2005.

Davison BD, Hirsh H, "Predicting Sequences of User Actions", AAAI-98/ICML-98 Workshop :5-12, 1998.

De Maesschalck, R., et al., "The Mahalanobis Distance", Chemometrics and Intelligent Laboratory Conference Systems, 50 (1), 2000, pp. 1-18.

Demers, A. et al. "Cayuga: A General Purpose Event Monitoring System" CIDR 2007.

Detristan, T., et al., "Polymorphic Shellcode Engine Using Spectrum Analysis", Phrack 2003 [cited Mar. 28, 2006]; Available from: http://www.phrack.org/issues.html?issue=61&id=9.

Dovrolis, C., et al., "Packet-Dispersion Techniques and a Capacity-Estimation Methodology", IEEE/ACM Transactions on Networking 12(6), 963-977 (2004).

Dubendorfer, T., et al., "Flow-Level Traffic Analysis of the Blaster and Sobig Worm Outbreaks in an Internet Backbone", in Proceedings of the Conference on Detection of Intrusions and Malware & Vulnerability Assessment (DIMVA), Jul. 2005.

DuMouchel, W., "Computer Intrusion Detection Based on Bayes Factors for Comparing Command Transition Probabilities", Technical Report TR91: National Institute of Statistical Sciences,1999.

Egele, M., et al., "Dynamic Spyware Analysis," in Proceedings of the USENIX Annual Technical Conference, Santa Clara, CA, USA, Jun. 2007, pp. 233-246.

Forrest, S., et al., "A Sense of Self for Unix Processes", IEEE Symposium on Research in Security and Privacy: 120-128, 1996.

Frias-Martinez, V., et al., "Behavior-Based Network Access Control: A Proof-of-Concept", in the Proceedings of the 11th Information Security Conference (ISC) (2008).

Friess, N. and Aycock, J., "Black Market Botnets", Deperatment of Computer Science, University of Calgary, TR 2007-873-25, Jul. 2007.

Garfinkel, T., et al. "A Virtual Machine Introspection Based Architecture for Intrusion Detection", Proceedings of the 10th Network and Distributed System Security Symposium (NDSS), 191-206, Feb. 2003.

Gartner, Press Release: "Gartner Survey Shows Phishing Attacks Escalated in 2007; More than $3 Billion Lost to These Attacks", Dec. 17, 2009, Available at: http://www.gartner.com/it/page.jsp?id=565125.

Ghosh, A.K., et al., "Learning Program Behavior Profiles for Intrusion Detection", USENIX Workshop on Intrusion Detection and Network Monitoring, 1999.

Goel, S., "Kolmogorov Complexity Estimates for Detection of Viruses", Complexity Journal, vol. 9, issue 2, Nov.-Dec. 2003.

Goldring, T., "User Profiling for Intrusion Detection in Windows NT", 35th Symposium on the Interface, 2003.

Gordon, L.A., et al., "CSI/FBI Computer Crime and Security Survey", 2006.

Graham, R., "SideJacking with Hamster", Technical Report, Errata Security (2007).

Harmon, D., et al., "Robust Treatment of Simultaneous Collisions", SIGGRAPH (ACM Transactions on Graphics) (2008) pp. 1-4.

Higgins, K.J., "Up to 9 Percent of Machines in an Enterprise are Botinfected", Sep. 24, 2009, Darkreading, [Online]. Available: http://www.darkreading.com/insiderthreat/security/client/showArticle.jhtml?articleID=220200118.

Holz, T., "A Short Visit to the Bot Zoo", IEEE Security & Privacy, 3(3):76-79, May/Jun. 2005.

Holz, T., et al., "Learning More About the Underground Economy: A Case-Study of Keyloggers and Dropzones", ser. Lecture Notes in Computer Science (LNCS). Springer Berlin/ Heidelberg, Sep. 2009, vol. 5789, pp. 1-18.

Hong, S.S., and Wu, S.F., "On Interactive Internet Traffic Replay", in Proceedings of the 8th International Symposium on Recent Advances in Intrusion Detection (RAID), pp. 247-264, Sep. 2005.

Hping—Active Network Security Tool, http://www.hping.org.

Ilett, D., "Trojan Attacks Microsoft's Anti-Spyware", Feb. 9, 2005, CNET News.

International Patent Application No. PCT/US07/12811, filed May 31, 2007.

International Preliminary Report on Patentability in International Patent Applicaiton No. PCT/US2007/012784, filied May 31, 2007.

International Preliminary Report on patentability in International Patent Application No. PCT/US08/66623, filed Jun. 12, 2008, mailed Dec. 30, 2009.

International Search Report in International Patent Application No. PCT/US07/12811, filed May 31, 2007, mailed Jul. 17, 2008.

Yuill, J., et al., "Using Deception to Hide Things from Hackers: Processes, Principles, and Techniques", Journal of Information Warfare, 5(3):26-40, Nov. 2006.

Jagatic, T., "Social Phishing", School of Informatics, Indiana University, Bloomington, Dec. 12, 2005.

Jha, S., et al, "A Filtering Approach to Anomaly and Masquerade Detection", 2004.

Jiang, X., and Wang, X., ""Out-of-the-Box" Monitoring of VM-Based High-Interaction Honeypots", in Proc. of the 10th Interna-

(56) References Cited

OTHER PUBLICATIONS tional Symposium on Recent Advances in Intrusion Detection (RAID), Cambridge, MA, USA, Sep. 2007, pp. 198-218.
Jones, A.K., and Sielken, R.S., "Computer System Intrusion Detection: A Survey", University of Virginia, Computer Science Technical Report, 2000.
Jones, S.T., et al., "Antfarm: Tracking Processes in a Virtual Machine Environment", in Proceedings of the USENIX Annual Technical Conference, Boston, MA, USA, Mar. 2006, pp. 1-14.
Ju, W.H. and Vardi, Y., "A Hybrid High-Order Markov Chain Model for Computer Intrusion Detection", Technical Report Number 92, National Institute of Statistical Sciences, 1999.
Karim, M.E., et al., "Malware Phylogeny Generation using Permutations of Code", Journal in Computer Virology, 2005.
Killourhy, K. and Maxion, R., "Investigating a Possible Flaw in a Masquerade Detection System", Technical Reports of the University Newcastle University, No. 869, 2004.
Klimt, B. and Yang, Y., "Introducing the Enron Corpus", in Proceedings of Third Conference on Email and Anti-Spam (CEAS 2006), Jul. 27-28, 2006, Mountain View, California.
Kolesnikov, O. and Lee, W., "Advanced Polymorphic Worms: Evading IDS by Blending in with Normal Traffic", in USENIX Security Symposium. 2006, Georgia Tech: Vancouver, BC, Canada.
Kravets, D., "From Riches to Prison: Hackers Rig Stock Prices", Wired Blog Network, Sep. 2008.
Krebs, B., "Web Fraud 2.0: Validating Your Stolen Goods", The Washington Post, Aug. 20, 2008.
Lane, T. and Brodley, C., "Sequence Matching and Learning in Anomaly Detection for Computer Security", AAAI-97 Workshop on AI Approaches to Fraud Detection and Risk Management, pp. 43-49, 1997.
Laskey, K., et al., "Detecting Threatening Behavior Using Bayesian Networks", Proceedings of the Conference on Behavioral Representation in Modeling and Simulation, 2004.
Li, L. and Manikopoulos C.N., "Windows NT One-Class Masquerade Detection", Information Assurance Workshop, Proceedings from the Fifth Annual IEEE SMC :82-87, 2004.
Li, M., et al., "WBest: a Bandwidth Estimation Tool for IEEE 802.11 Wireless Networks", Proceedings of the 33rd IEEE Conference on Local Computer Networks (LCN), pp. 374-381 (Oct. 2008).
Li, W., et al., "A Study of Malcode-Bearing Documents", DIMVA. 2007.
Li, W.J., et al., "Fileprints: Identifying File Types by N-Gram Analysis." 2005 IEEE Information Assurance Workshop.
Lindahl, G., "MS Outlook to Unix Mailbox Conversion Mini Howto", Aug. 1, 2004, Available at: http://tldp.org/HOWTO/pdf/Outlook-to-Unix-Mailbox.pdf.
Lippmann, R.P., et al., "Evaluating Intrusion Detection Systems: the 1998 DARPA Off-Line Intrusion Detection Evaluation", in Proceedings of the 2000 DARPA Information Survivability Conference and Exposition, 2000, vol. 2.
Maloof, M. and Stephens, G.D., "ELICIT: A System for Detecting Insiders Who Violate Need-to-Know" Recent Advances in Intrusion Detection (RAID), 2007.
Masquerading User Data, Available at: http://www.schonlau.net/intrusion.html.
Maxion, R.A. and Townsend T.N., "Masquerade Detection Using Truncated Command Lines", International Conference on Dependable Systems and Networks :219-228, 2002.
Maxion, R.A. and Townsend, T.N., "Masquerade Detection Augmented with Error Analysis", IEEE Transactions on Reliability 53, 2004.
Maxion, R.A., "Masquerade Detection Using Enriched Command Lines", International Conference on Dependable Systems & Networks, 2003.
Maybury, M., et al., "Analysis and Detection of Malicious Insiders", International Conference on Intelligence Analysis, 2005.
McDaniel, M. and Hossain, H.M., "Content Based File Type Detection Algorithms", 6th Annual Hawaii International Conference on System Sciences (HICSS'03).
McGlasson, L., "TJX Update: Breach Worse Than Reported", Technical Report, Bank Info Security (2007).
McRae, C.M. and Vaughn, R.B., "Phighting the Phisher: Using Web Bugs and Honeytokens to Investigate the Source of Phishing Attacks", Proceedings of the 40th Hawaii International Conference on System Sciences, 2007.
Medina, A., et al., "Traffic Matrix Estimation: Existing Techniques and New Directions", ACM SIGCOMM Computer Communication Review 32(4), 161-174 (2002).
Messmer, E., "America's 10 most wanted botnets", Jul. 22, 2009, NETWORKWORLD. [Online]. Available: http://www.networkworld.com/news/2009/072209-botnets.html.
Michael J.B., et al., "Software Decoys: Intrusion Detection and Countermeasures", Proceedings of the 2002 IEEE Workshop on Information Assurance.
Microsoft Security Bulletin. http://www.microsoft.com/technet/security/advisory/912840.mspx.
Monterio Jr., V., "How Intrusion Detection Can Improve Software Decoy Applications".
Moore, D., et al., "Code-Red: a case study on the spread and victims of an Internet worm", in Proceedings of the 2nd Internet Measurement Workshop (IMW), pp. 273-284, Nov. 2002.
Morse, A., "Google's Gmail Service Suffers Another Shutdown" Technical Report, Wall Street Journal, (Mar. 2009), http://online.wsj.com/article/SB123673492963090721.html.
Moshchuk, A., et al., "A Crawler-based Study of Spyware in the Web," in Proceedings of the ISOC Symposium on Network and Distributed System Security (SNDSS), Feb. 2006.
Naor, M. and Yung, M., "Universal One-Way Hash Functions and their Cryptographic Applications", in ACM Symposium on Theory of Computing. 1989. Seattle, WA.
Nguyen, N.T., et al., "Detecting Insider Threats by Monitoring System Call Activity", IEEE Workshop on Information Assurance :45-52, 2003.
Office Action dated Mar. 21, 2012 in U.S. Appl. No. 12/628,587.
Office Action dated Mar. 28, 2012 in U.S. Appl. No. 12/302,774.
Oka, M., et al, "Anomaly Detection Using Layered Networks Based on Eigen Co-occurrence Matrix", RAID 2004, 223-237.
Oka, M., et al., "Eigen Co-occurrence Matrix Method for Masquerade Detection", 2004.
Oudot, L., "Wireless Honeypot Countermeasures", Technical Report, Security Focus (2004).
P. Szor and P. Ferrie. "Hunting for Metamorphic Technical Report," Symantec Corporation, Jun. 2003.
Pappas, V., et al., "Crimeware Swindling Without Virtual Machines", in Proceedings of the 13th Information Security Conference (ISC), 2010.
Pappas, V., et al., "Evaluation of Spyware Detection System Using Thin Client Computing", in ICISC, 2010, pp. 222-232.
Pereira, J., "How Credit-Card Data Went out Wireless Door", Technical Report, Wall Street Journal (2007).
Petroni, Jr., N.L., et al., "Copilot-a Coprocessor-Based Kernel Runtime Integrity Monitor", in Proceedings of the 13th USENIX Security Symposium, pp. 179-194, Aug. 2004.
Phyo, A.H. and Furnell, S.M., "A Detection-Oriented Classification of Insider IT Misuse", Proceedings of the 3rd Security Conference, 2004.
Prevelakis, V. and Spinellis, D., "The Athens Affair", IEEE Spectrum, 44:7:26-33, 2007.
Provos, N., "A Virtual Honeypot Framework", in Proceedings of the 13th USENIX Security Symposium, pp. 1-14, Aug. 2004.
Randazzo, M.R., et al., "Insider Threat Study: Illicit Cyber Activity in the Banking and Finance Sector", 2004.
Richardson, R., "CSI/FBI Computer Crime and Security Survey," 2008.
Rivest, R.L., "Chaffing and Winnowing: Confidentiality without Encryption", MIT Lab for Computer Science, Mar. 18, 1998.
Sailer, R., et al., "Design and Implementation of a TCG-based Integrity Measurement Architecture", in Proceedings of the 13 USENIX Security Symposium, pp. 223-238, Aug. 2004.
Salem MB, Stolfo SJ, "Masquerade Attack Detection Using a Search-Behavior Modeling Approach", Tech. Report CUCS-027-09, Dept. of Computer Science, Columbia Univ., 2009.

(56) References Cited

OTHER PUBLICATIONS

Salem, M.B. and Stolfo, S.J., "Masquerade Detection Using a Taxonomy-Based Multinomial Modeling Approach in UNIX Systems", 2008.
Salem, M.B., et al. "A Survey of Insider Attack Detection Research", in Insider Attack and Cyber Security: Beyond the Hacker, (Eds., Stolfo, Bellovin, Hershkop, Keromytis, Sinclaire, and Smith), pp. 69-90, Springer, 2008.
Salem, M.B., et al., "Modeling User Search-Behavior for Masquerade Detection", Technical report #CUCS-014-10, Columbia University Department of Computer Science, 2010.
Saroiu, S., et al., "Measurement and Analysis of Spyware in a University Environment", in Proceedings of the A CMIUSENIX Symposium on Networked Systems Design and Implementation (NSDI), pp. 141-153, Mar. 2004.
Schonlau, M., et al., "Computer Intrusion: Detecting Masquerades", Statistical Science 16:1:58-74, 2001.
Schultz, E.E., "A Framework for Understanding and Predicting Insider Attacks", Journal of Computers and Security 21:526-531, 2002.
Schultz, M.G., et al., "Data Mining Methods for Detection of New Malicious Executables", Proceedings of the IEEE Symposium on Security and Privacy, Oakland, CA, May 200.
Seo, J. and Cha, S., "Masquerade Detection Based on SVM and Sequence-Based User Commands Profile", ACM Symposium on Information, Computer and Communications Security, pp. 398-400, 2007.
Shavlik, J. and Shavlik, M., "Selection, Combination, and Evaluation of Effective Software Sensors for Detecting Abnormal Computer Usage", KDD '04 Proceedings of the Tenth ACM SIGKDD International Conference on Knowledge Discovery and Data Mining pp. 276-285, 2004.
Smith, S., "Magic Boxes and Boots: Security in Hardware", IEEE Computer, 37(10):106-109, Oct. 2004.
Sommers, J. and Barford, P., "Self-Configuring Network Traffic Generation", Proceedings of the 4th ACM SIGCOMM Conference on Internet Measurement, pp. 68-81 (Oct. 2004).
Song, Y., et al., "On the infeasibility of modeling polymorphic shellcode," in Proc. of the 14th ACM conference on Computer and Communications Security (CCS), Alexandria, VA, USA, 2007, pp. 541-551.
Spitzner L, "Honeypots: Catching the Insider Threat", Computer Security Applications Conference, 2003.
Spitzner, L., "Honeytokens: The Other Honeypot", Technical Report, Security Focus (Jul. 2003).
Srivastava, A. and Giffin, J., "Tamper-Resistant, Application-Aware Blocking of Malicious Network Connections", in Proceedings of the 11th International Symposium on Recent Advances in Intrusion Detection (RAID), Cambridge, MA, USA, Sep. 2008, pp. 39-58.
Stahlberg, M., "The Trojan Money Spinner", F-Secure Corporation, Technical report, Sep. 2007. [Online]. Available: http://www.f-secure.com/weblog/archives/VB2007_TheTrojanMoneySpinner.pdf.
Stolfo, S., et al., "A Comparative Evaluation of Two Algorithms for Windows Registry Anomaly Detection", Journal of Computer Security 13:4, 2005.
Stolfo, S., et al., "Towards Stealthy Malware Detection", Malware Detection Book, Springer Verlag, (Jha, Christodorescu, Wang, Eds.), 2006.
Stolfo, S.J., et al., "Fileprint analysis for Malware Detection", 2005.
Stoll, C., "Stalking the Wily Hacker", Communications of hte ACM, 31(5): 484-497, May 1988.
Symantec. Global Internet Security Threat Report, Apr. 2008. Trends for Jul.-Dec. 2007.
Szymanski, B.K. and Zhang, Y., "Recursive Data Mining for Masquerade Detection and Author Identification", Information Assurance Workshop :424-431, 2004.
Tan, K. and Maxion, R.A., "'Why 6?' Defining the Operational Limits of Stide, and Anomaly-Based Intrusion Detector", IEEE Symposium on Security and Privacy, 2002.

The Honeynet Project, "Know Your Enemy: Sebek, A Kernel based data capture tool", Nov. 2003.
The XFree86 Project. http://www.xfree86.org.
Trusteer, "Measuring the In-the-Wild Effectiveness of Antivirus Against Zeus", Technical report, Sep. 14, 2009, [Online]. Available: www.trusteer.com/files/Zeus_and_Antivirus.pdf.
Tsow, A., et al., "Warkitting: The Drive-by Subversion of Wireless Home Routers", Journal of Digital Forensic Practice 1(3), 179-192 (2006).
Turing, A.M., "Computing machinery and intelligence", Mind, New Series, vol. 59, No. 236, pp. 433-460, Oct. 1950.
Tygar, J.D. and Yee, B., "DYAD: A System for Using Physically Secure Coprocessors", Technical Report CMU-CS-91-140R, Carnegie Mellon University, May 1991.
U.S. Appl. No. 12/628,587, filed Dec. 1, 2009.
U.S. Appl. No. 12/302,774, filed Nov. 26, 2008.
U.S. Appl. No. 12/982,984, filed Dec. 31, 2010.
U.S. Appl. No. 60/291,712, filed Dec. 31, 2009.
U.S. Appl. No. 61/044,376, filed Apr. 11, 2008.
U.S. Appl. No. 61/357,481, filed Jun. 22, 2010.
U.S. Appl. No. 60/809,898, filed May 31, 2006.
U.S. Appl. No. 60/934,307, filed Jun. 12, 2007.
U.S. Appl. No. 61/119,294, filed Dec. 2, 2008.
U.S. Appl. No. 61/119,540, filed Dec. 3, 2008.
Vahdat, A., et al., "Scalability and Accuracy in a Large-Scale Network Emulator", Proceedings of the 5th Symposium on Operating Systems Design and Implementation (OSDI), pp. 261-284 (Dec. 2002).
Vargiya, R., et al., "Boundary Detection in Tokenizing Network Application Payload for Anomaly Detection," Department of Computer Sciences, Florida Institute of Technology, 2003.
Vasudevan, A. and Yerraballi, R., "Cobra: Fine-grained Malware Analysis using Stealth Localized-Executions", in Proceedings of the IEEE Security & Privacy Symposium, May 2006.
Vishwanath, K.V. and Vahdat, A., "Realistic and Responsive Network Traffic Generation", ACM SIGCOMM Computer Communication Review 36(4), 111-122 (2006).
VMware, Inc., http://www.vmware.com/.
Walsh, T.J. and Kuhn, D.R., "Challenges in Securing Voice over IP", IEEE Security & Privacy Magazine, 3(3):44-49, May/Jun. 2005.
Wang, K. and Stolfo, S.J., "One-Class Training for Masquerade Detection", ICDM Workshop on Data Mining for Computer Security (DMSEC), 2003.
Wang, K., et al., "Anagram: A Content Anomaly Detector Resistant to Mimicry Attack", Proc. Int. Conf. on Recent Advanced in Intrusion Detection, RAID '06, Sept. 2006 (CU Tech Report 020-06).
Wang, K., et al., "Anomalous Payload-Based Worm Detection and Signature Generation", in Proceedings of the 8th International Symposium on Recent Advances in Intrusion Detection (RAID), pp. 227-246, Sep. 2005.
Wang, Y.M., et al., "Automated Web Patrol with Strider HoneyMonkeys: Finding Web Sites That Exploit Browser Vulnerabilities" Proceedings of the 13th Annual Network and Distributed System Security Symposium (NDSS 2006), San Diego, CA, Feb. 2006.
Watson, D., et al., "Know Your Enemy: Phishing", Technical Report, May 16, 2005, Available at: http://www.honeynet.org/papers/phishing/.
Willems, C., et al., "Toward Automated Dynamic Malware Analysis Using CWSandbox", in Proceedings of the IEEE Symposium on Security and Privacy (S&P), Oakland, CA, USA, Mar. 2007, pp. 32-39.
Written Opinion in International Patent Application No. PCT/US07/12811, filed May 31, 2007, mailed Aug. 29, 2006.
Written Opinion in International Patent Application No. PCT/US8/66623, filed Jun. 12, 2008, mailed Feb. 13, 2009.
Yang, J., et al., "Automatically Generating Malicious Disks using Symbolic Execution", in Proceedings of the IEEE Security & Privacy Symposium, May 2006.
Ye, N., "A Markov Chain Model of Temporal Behavior for Anomaly Detection", in Proceedings of the 2000 IEEE Workshop on Information Assurance and Security, United States Military Academy, West Point, NY, Jun. 6-7, 2000.

(56) References Cited

OTHER PUBLICATIONS

Ye, N., et al., "Probabilistic Techniques for Intrusion Detection Based on Computer Audit Data", Systems, Man and Cybernetics, Part A 31:4:266-274, 2001.

Ye, Z., et al., "Trusted Paths for Browsers", ACM Transactions on Information and System Security (TISSEC), 8(2):153-186, May 2005.

Yee, B., "Using Secure Coprocessors", PhD thesis, Carnegie Mellon University, 1994.

Yegneswaran, V., et al., "On the Design and Use of Internet Sinks for Network Abuse Monitoring", in Proceedings of the 7th International Symposium on Recent Advances in Intrusion Detection (RAID), pp. 146-165, Oct. 2004.

Yin, H., et al., "Panorama: Capturing System-Wide Information Flow for Malware Detection and Analysis", in Proceedings of the 14th ACM Conference on Computer and Communications Security (CCS), Alexandria, VA, USA, 2007, pp. 116-127.

Yuill, J., et al., "Honeyfiles: Deceptive Files for Intrusion Detection", Proceedings of the 5th Annual IEEE Workshop on Information Assurance, pp. 116-122 (Jun. 2004).

Stolfo, S.J., et al., "Insider Attack and Cyber Security: Beyond the Hacker", Springer, 2008.

Yung, K.H., "Using Self-Consistent Naïve-Bayes to Detect Masqueraders", in Stanford Electrical Engineering and Computer Science Research Journal, Spring 2004, pp. 14-21.

Coull, S.E. and Szymanski, B.K., "Sequence Alignment for Masquerade Detection", in Computational Statistics & Data Analysis, vol. 52, No. 8, Apr. 15, 2008, pp. 4116-4131.

Garfinkel, T., et al., "Compatibility is Not Transparency: VMM Detection Myths and Realities", in Proceedings of the 11th USENIX Workshop on Hot Topics in Operating Systems (HOTOS'07), San Diego, CA, USA, May 7-9, 2007.

Hall, M., et al., "The WEKA Data Mining Software: An Update", in ACM SIGKDD Explorations Newsletter, vol. 11, No. 1, Jun. 2009, pp. 10-18.

Hirschberg, D.S., "A Linear Space Algorithm for Computing Maximal Common Subsequences", in Communications of the ACM, vol. 18, No. 6, Jun. 1975, pp. 341-343.

Killourhy, K.S. and Maxion, R.A., "Comparing Anomaly Detectors for Keystroke Dynamics", in IEEE/IFIP International Conference on Dependable Systems & Networks (DSN '09), Jun. 29-Jul. 2, 2009, pp. 125-134.

Lee, W. and Xiang, D., "Information-Theoretic Measures for Anomaly Detection", S&P 2001. Proceedings of the IEEE Symposium on in Security and Privacy (S&P 2001), 2001, pp. 130-143.

Monrose, F. and Rubin, A., "Authentication via Keystroke Dynamics", in Proceedings of the 4th ACM Conference on Computer and Communications Security (CCS '97), Zurich, Switzerland, 1997, pp. 48-56.

Stolfo, S.J., et al., "Anomaly Detection in Computer Security and an Application to File System Accesses", in Lecture Notes in Computer Science, vol. 3488, 2005, pp. 14-28.

U.S. Appl. No. 61/099,526, filed Sep. 23, 2008.

U.S. Appl. No. 13/166,723, filed Jun. 22, 2011.

U.S. Appl. No. 61/165,634, filed Apr. 1, 2009.

Wang, K. and Stolfo, S.J., "Anomalous Payload-Based Network Intrusion Detection", in Proceedings of the 7th International Symposium on Recent Advances in Intrusion Detection (RAID), Sep. 2004, pp. 203-222.

Attenberg, J., et al., "Modeling and Predicting User Behavior in Sponsored Search", in Proceedings of the 15th ACM SIGKDD International Conference on Knowledge Discovery and Data Mining (KDD '09), Paris, FR, Jun. 28-Jul. 1, 2009, pp. 1067-1076.

Baeza-Yates, R., et al., "Modeling User Search Behavior,", in Proceedings of the 3rd Latin American Web Congress (LA-WEB '05), Buenos Aires, AR, Oct. 31-Nov. 2, 2005, pp. 242-251.

Chang, C.C. and Lin, C.J., "LIBSVM: A Library for Support Vector Machines", Technical Report, Jan. 2008, available at: http://www.csie.ntu.tv/cjlin/libsvm.pdf.

Davison, B.D. and Hirsh, H., "Toward an Adaptive Command Line Interface", in Proceedings of the Seventh International Conference on Human-Computer Interaction (HCI '97), San Francisco, CA, US, Aug. 24-29, 1997, pp. 505-508.

Dhamija, R., et al., "Why Phishing Works", in Proceedings of the 2006 Conference on Human Factors in Computing Systems (CHI '06), Montréal, QC, CA, Apr. 22-27, 2006, pp. 581-590.

Hoang, M., "Handling Today's Tough Security Threats", in Symantec Official Blog, Nov. 2, 2006, available at: http://www.symantec.com/connect/blogs/handling-todays-tough-security-threats-rootkits.

O'Brien, M., and Keane, M.T., "Modeling User Behavior Using a Search Engine", in Proceedings of the 12th International Conference on Intelligent User Interfaces (IUI '07), Honolulu, HI, US, Jan. 28-31, 2007, pp. 357-360.

Office Action dated Feb. 23, 2012 in U.S. Appl. No. 12/565,394.

Office Action dated Jul. 17, 2013 in U.S. Appl. No. 13/166,723.

Office Action dated Oct. 16, 2012 in U.S. Appl. No. 12/982,984.

Office Action dated Nov. 15, 2012 in U.S. Appl. No. 12/302,774.

Office Action dated Nov. 29, 2012 in U.S. Appl. No. 12/628,587.

Plummer, D. and Greenwood, W., "The History of Nuclear Weapon Safety Devices", in Proceedings of the 34th AIAA/ASME/SAE/ASEE Joint Propulsion Conference, Cleveland, OH, US, Jul. 13-15, 1998, pp. 1-8.

Scholkopf, B., et al., "Estimating the Support of a High-Dimensional Distribution", Technical Report MSR-TR-99-87, Microsoft Research, Sep. 18, 2000, pp. 1-30.

Spray, S. and Cooper, A., "The Unique Signal Concept for Detonation Safety in Nuclear Devices", Technical Report UC-706, Sandia National Laboratories, Dec. 1992, pp. 1-73.

Teng, H.S., et al., "Adaptive Real-Time Anomaly Detection Using Inductively Generated Sequential Patterns", in Proceedings of the IEEE Symposium on Security and Privacy (S&P '90), Oakland, CA, US, May 7-9, 1990, pp. 278-284.

The Honeynet Project, "Know Your Enemy: Sebek, A Kernel Based Data Capture Tool", Technical Report, Nov. 17, 2003, pp. 1-21, available at: http://old.honeynet.org/papers/sebek.pdf.

Yung, K.H., "Using Self-Consistent Naïve-Bayes to Detect Masqueraders", in Proceedings of the Advances in Knowledge Discovery and Data Mining, 8th Pacific-Asia Conference (PAKDD '04), Sydney, AU, May 26-28, 2004, pp. 329-340.

Balajinath, B. and Raghavan, S.V., "Intrusion Detection Through Learning Behavior Model", in Computer Communications, vol. 24, No. 12, Jul. 2001, pp. 1202-1212.

Mahoney et al., "Learning Nonstationary Models of Normal Network Traffic for Detecting Novel Attacks", in Proceedings of the Eighth ACM SIGKDD International Conference on Knowledge Discovery and Data Mining (SIGKDD '02), Edmonton, Alberta, CA, Jul. 23-26, 2002, pp. 376-385.

Notice of Allowance dated Dec. 23, 2013 in U.S. Appl. No. 12/628,587.

Notice of Allowance dated Apr. 29, 2013 in U.S. Appl. No. 12/982,984.

Office Action dated Mar. 7, 2014 in U.S. Appl. No. 13/166,723.

Office Action dated Nov. 7, 2013 in U.S. Appl. No. 12/302,774.

Sekar, R., et al., "A Fast Automaton-Based Method for Detecting Anomalous Program Behaviors", in Proceedings of the IEEE Symposium on Security & Privacy (S&P '01), Oakland, CA, US, May 14-16, 2001, pp. 144-155.

Office Action dated Jul. 7, 2014 in U.S. Appl. No. 13/965,619.

* cited by examiner

THE UNIVERSITY OF CHICAGO MEDICAL CENTER
The University of Chicago Medical Center
5841 S. Maryland AvenueChicago, IL 60637

Medical Billing Summary

| Patricia Resler<br>3116 Scheuvront Drive<br>Denver, CO 80202 | Medical Record Number: 1273624<br>SSN: 653-24-1601 |
|---|---|

| Date | Description | Amount |
|---|---|---|
| April 8, 2009 | Emergency Treatment Costs | 1587.55 |
|  | Prescription | 498.26 |
|  |  | 2085.82 |

Signed by: Martha Markowski

METHODS, SYSTEMS, AND MEDIA FOR BAITING INSIDE ATTACKERS

CROSS REFERENCE TO RELATED APPLICATIONS

This application is a continuation-in-part of International Application No. PCT/US2008/066623, filed Jun. 12, 2008, which claims the benefit of U.S. Provisional Patent Application No. 60/934,307, filed Jun. 12, 2007 and U.S. Provisional Patent Application No. 61/044,376, filed Apr. 11, 2008, which are hereby incorporated by reference herein in their entireties. This application also claims the benefit of U.S. Provisional Patent Application No. 61/099,526, filed Sep. 23, 2008 and U.S. Provisional Application No. 61/165,634, filed Apr. 1, 2009, which are hereby incorporated by reference herein in their entireties.

This application is also related to International Application No. PCT/US2007/012811, filed May 31, 2007, which is hereby incorporated by reference herein in its entirety.

STATEMENT REGARDING FEDERALLY SPONSORED RESEARCH OR DEVELOPMENT

The invention was made with government support under Grant No. 60NANB1D0127 awarded by the U.S. Department of Homeland Security through the Institute for Information Infrastructure Protection (I3P), under Grant No. W911NF-06-1-0151-49626-C1 awarded by the Army Research Office (ARO), and under Grant No. CNS-07-14647 awarded by the National Science Foundation (NSF). The government has certain rights in the invention.

TECHNICAL FIELD

The disclosed subject matter relates to methods, systems, and media for baiting inside attackers.

BACKGROUND

Much research in computer security has focused on approaches for preventing unauthorized and illegitimate access to systems and information. However, one of the most damaging malicious activities is the result of internal misuse within an organization. This may be because much of the attention has been focused on preventative measures against computer viruses, worms, trojans, hackers, rootkits, spyware, key recovery attacks, denial-of-service attacks, malicious software (or malware), probes, etc. such that far less attention has been focused inward.

Insider threats generally include masqueraders and/or traitors. Masqueraders generally include attackers that impersonate another inside user, while traitors generally include inside attackers that use their own legitimate credentials to attain illegitimate goals. In addition, some external attackers can become inside attackers when, for example, an external attacker gains internal network access. For example, external attackers can gain access to an internal network with the use of spyware or rootkits. Such software can be easily installed on computer systems from physical or digital media (e.g., email, downloads, etc.) and can provide an attacker with administrator or "root" access on a machine along with the capability of gathering sensitive data. In particular, the attacker can snoop or eavesdrop on a computer or a network, download and exfiltrate data, steal assets and information, destroy critical assets and information, and/or modify information. Rootkits have the ability to conceal themselves and elude detection, especially when the rootkit is previously unknown, as is the case with zero-day attacks. An external attacker that manages to install a rootkit internally in effect becomes an insider, thereby multiplying the ability to inflict harm.

One approach to prevent inside attacks generally involves policy-based access control techniques that limit the scope of systems and information an insider is authorized to use, thereby limiting the damage the organization can incur when an insider goes awry. Despite these general operating system security mechanisms and the specification of security and access control policies, such as the Bell-LaPadula model and the Clark-Wilson model, the insider attacker problem is extensive. For example, in many cases, formal security policies are incomplete and implicit or they are purposely ignored in order to achieve business goals. In fact, the annual Computer Crime and Security Survey for 2007, which surveyed 494 security personnel members from corporations and government agencies within the United States, found that insider incidents were cited by about 59 percent of respondents, while only about 52 percent had encountered a conventional virus in the previous year. Other approaches have been made that attempt to address these problems. However, these approaches merely perform a forensics analysis after an insider attack has occurred.

It should also be noted that, with the advent of wireless networking, the ubiquity of wireless networking exposes information to threats that are difficult to detect and defend against. Even with the latest advances aimed at securing wireless communications and the efforts put forth into protecting wireless networking, compromises still occur that allow sensitive information to be recorded, exfiltrated, and/or absconded. Secure protocols exist, such as WiFi Protected Access 2 (WPA2), that can help in preventing network compromise, but, in many cases, such protocols are not used for reasons that may include cost, complexity, and/or overhead. In fact, the 2008 RSA Wireless Security Survey reported that only 49% of corporate access points in New York, N.Y. and 48% in London, England used advanced security. Accordingly, many wireless networks remain exposed despite the existence of these secure protocols.

Moreover, one of the benefits of WiFi is the seemingly boundless, omnipresent signal. However, this broad transmission radius is also one of its greatest risks. The broadcast medium on which the suite of 802.11 protocols are based makes then particularly difficult to secure. In general, there is little than can be done to detect passive eavesdropping on networks. This problem is exacerbated with WiFi due to the range of the signal.

There is therefore a need in the art for approaches that bait inside attackers using decoy information. Accordingly, it is desirable to provide methods, systems and media that overcome these and other deficiencies of the prior art.

SUMMARY

Methods, systems, and media for providing trap-based defenses are provided. In accordance with some embodiments, a method for providing trap-based defenses are provided, the method comprising: generating decoy information based at least in part on actual information in a computing environment, wherein the decoy information is generated to comply with one or more document properties; embedding a beacon into the decoy information; and inserting the decoy information with the embedded beacon into the computing environment, wherein the embedded beacon provides a first indication that the decoy information has been accessed by an attacker and wherein the embedded beacon provides a second indication that differentiates between the decoy information and the actual information.

In accordance with some embodiments, a method for providing trap-based defenses are provided, the method comprising: generating a decoy document based at least in part on an actual document in a computing environment, wherein the decoy document is generated to comply with one or more document properties; embedding a beacon into the decoy document; inserting the decoy document with the embedded beacon into the computing environment; and, in response to accessing the decoy document, using the embedded beacon to generate a pattern that is displayed to a user, wherein the embedded beacon differentiates between the decoy document and the actual document in response to accessing the decoy document.

In some embodiments, in response to placing a physical mask over the generated pattern, an index is presented to the user, wherein the physical mask decodes the generated pattern into the index.

In accordance with some embodiments, a method for providing trap-based defenses are provided, the method comprising: receiving trace data; determining protocol types of the received trace data based at least in part on the content of application layer headers contained in the received trace data; generating one or more candidate flows for each protocol type from the received trace data; modifying the one or more candidate flows with decoy information; and inserting the modified candidate tows into a communications network.

In accordance with some embodiments, a system for providing trap-based defenses are provided, the system comprising a processor that: generates decoy information based at least in part on actual information in a computing environment, wherein the decoy information is generated to comply with one or more document properties; embeds a beacon into the decoy information; and inserts the decoy information with the embedded beacon into the computing environment, wherein the embedded beacon provides a first indication that the decoy information has been accessed by an attacker and wherein the embedded beacon provides a second indication that differentiates between the decoy information and the actual information.

In accordance with some embodiments, a system for providing trap-based defenses are provided, the system comprising a processor that: receives trace data; determines protocol types of the received trace data based at least in part on the content of application layer headers contained in the received trace data; generates one or more candidate flows for each protocol type from the received trace data; modifies the one or more candidate flows with decoy information; and inserts the modified candidate flows into a communications network.

In accordance with some embodiments, a non-transitory computer-readable medium containing computer-executable instructions that, when executed by a processor, cause the processor to perform a method for providing trap-based defenses is provided. The method comprises: generating decoy information based at least in part on actual information in a computing environment, wherein the decoy information is generated to comply with one or more document properties; embedding a beacon into the decoy information; and inserting the decoy information with the embedded beacon into the computing environment, wherein the embedded beacon provides a first indication that the decoy information has been accessed by an attacker and wherein the embedded beacon provides a second indication that differentiates between the decoy information and the actual information.

In accordance with some embodiments, a non-transitory computer-readable medium containing computer-executable instructions that, when executed by a processor, cause the processor to perform a method for providing trap-based defenses is provided. The method comprises: receiving trace data; determining protocol types of the received trace data based at least in part on the content of application layer headers contained in the received trace data; generating one or more candidate flows for each protocol type from the received trace data; modifying the one or more candidate flows with decoy information; and inserting the modified candidate flows into a communications network.

BRIEF DESCRIPTION OF THE DRAWINGS

FIG. 4 is a diagram showing examples of actual information (e.g., network traffic) in an operating environment in accordance with some embodiments.

FIG. 5 is a diagram showing examples of decoy information (e.g., decoy network traffic) generated using actual information and inserted into an operating environment in accordance with some embodiments of the disclosed subject matter.

FIG. 17 is a diagram showing an example of a generated decoy document in the form of a medical billing summary in accordance with some embodiments of the disclosed subject matter.

FIG. 18 is a diagram showing an example of a generated decoy document in the form of a tax document in accordance with some embodiments of the disclosed subject matter.

DETAILED DESCRIPTION

Figure 1:
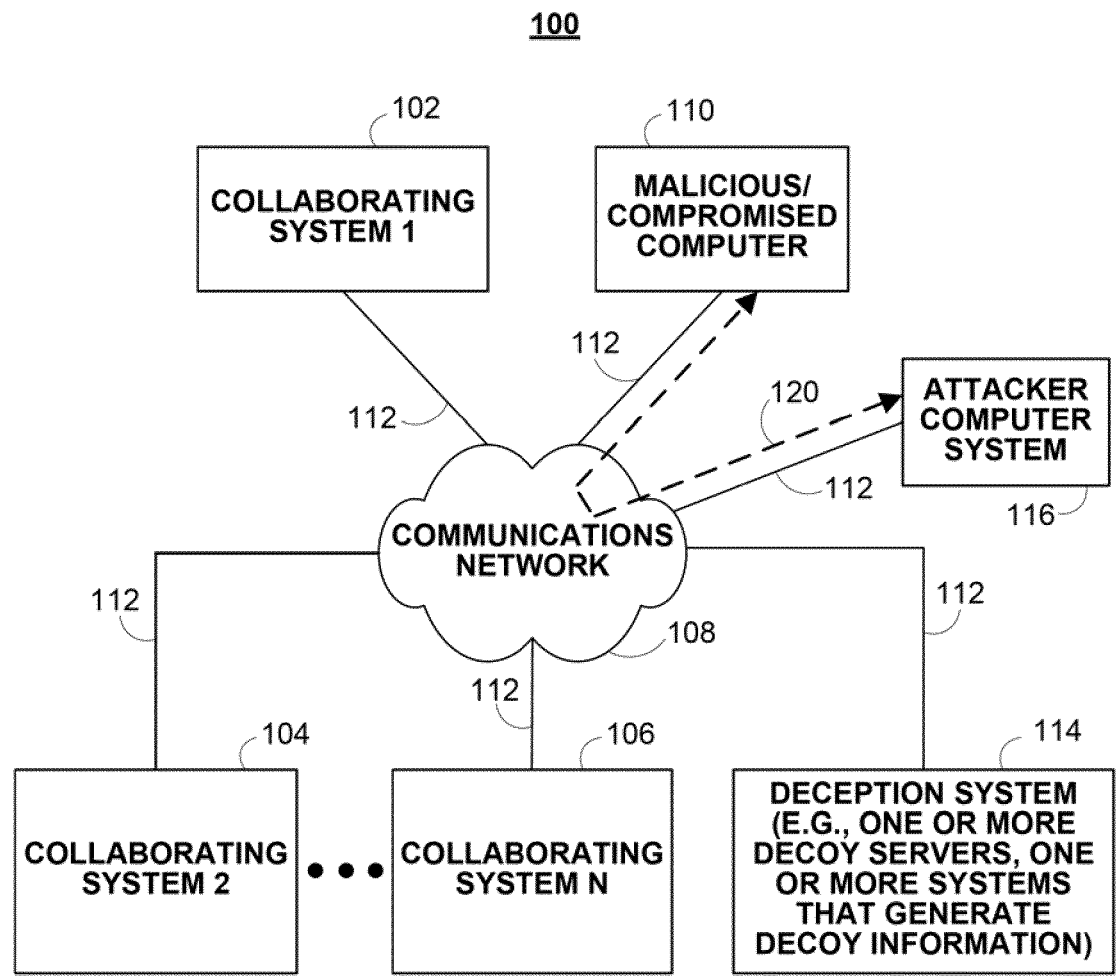
FIG. 1 is a diagram of a system suitable for implementing an application that inserts decoy information with embedded beacons in accordance with some embodiments of the disclosed subject matter.

In accordance with various embodiments, as described in more detail below, mechanisms for baiting inside attackers are provided. In some embodiments, systems and methods are provided that implement trap-based defensive mechanisms that can be used to confuse, deceive, and/or detect nefarious inside attackers that attempt to exfiltrate and/or use information. These traps use decoy information (sometimes referred to herein as "bait information," "bait traffic," "decoy media", or "decoy documents") to attract, deceive, and/or confuse attackers (e.g., inside attackers, external attackers, etc.) and/or malware. For example, large amounts of decoy information can be generated and inserted into the network flows and large amount of decoy documents, or documents containing decoy information, can be generated and placed within a file system to lure potential attackers. In another example, decoy documents can be generated that are machine-generated documents containing content to entice an inside attacker into stealing bogus information. Among other things, decoy information can be used to reduce the level of system knowledge of an attacker, entice the attacker to perform actions that reveal their presence and/or identities, and uncover and track the unauthorized activities of the attacker.

In some embodiments, decoy information can be combined with any suitable number of monitoring or alerting approaches, either internal or external, to detect inside attackers. For example, a beacon can be embedded in a document or any other suitable decoy information. As used herein, a beacon can be any suitable code or data that assist in the differentiation of decoy information from actual information and/or assists in indicating the malfeasance of an attacker illicitly accessing the decoy information. In some embodiments, these stealthy beacons can cause a signal to be transmitted to a server indicating when and/or where the particular decoy information was opened, executed, etc.

In one example, the decoy information, such as a decoy document, can be associated and/or embedded with one or more active beacons, where the active beacons transmit signals to a remote website upon opening the document that contains the decoy information. The signals can indicate that the decoy information has been accessed, transmitted, opened, executed, and/or misused. Generally, these signals indicate the malfeasance of an insider illicitly reading decoy information. In some embodiments, the use of decoy information with the embedded active beacon can indicate that the decoy information has been exfiltrated, where the beacon signals can include information sufficient to identify and/or trace the attacker and/or malware.

In another example, the decoy information, such as a decoy document, can be associated and/or embedded with one or more passive beacons. In a more particular example, a passive beacon in the form of a watermark can be embedded in the binary format of the document file or any other suitable location of the document file format. The watermark is detected when the decoy information is loaded in memory or transmitted in the open over a network. In some embodiments, a host-based monitoring application can be configured to transmit signals or an alert when it detects the passive beacon in documents.

Alternatively, a passive beacon can be code that assists a legitimate user in differentiating decoy information from authentic information. For example, in response to opening a decoy document containing decoy information and an embedded passive beacon, the passive beacon generates a pattern along with the decoy document. Upon placing a physical mask over the generated pattern, an indicator (e.g., a code, a sequence of letters or numbers, an image, etc.) can be displayed that allows the legitimate user to determine whether the document is a decoy document or a legitimate document.

In yet another example, the decoy information can be associated with a beacon that is both active and passive. In a more particular example, a beacon can generate a pattern, where a legitimate user can place a physical mask over the pattern to determine whether the information is decoy information or actual information, and the beacon can transmit a signal to a remote website indicating that the decoy information has been accessed.

In a further example, the content of the decoy information itself can be used to detect an insider attack. The content of the decoy information can include a bogus login (e.g., a bogus login and password for Google Mail). The bogus login to a website can be created in a decoy document and monitored by external approaches (e.g., polling a website or using a custom script that accesses mail.google.com and parses the bait account pages to gather account activity information).

As shown above, beacons can be used to detect the malfeasance of an inside attacker at any suitable time. For example, at the time of application start-up, the decoy document causes the transmission of a beacon alert to a remote server. In another example, at the time of memory load, a host-based monitoring application, such as an antivirus software application, can detect embedded beacons placed in a clandestine location of the document file format (e.g., the binary file format). In yet another example, at the time of exfiltration, a network intrusion detection system, such as Snort, can be used to detect embedded beacons during the egress or transmission of the decoy document or decoy information in network traffic. In a further example, at the time of information exploitation and/or credential misuse, monitoring of decoy logins and other credentials embedded in the document content by external systems can generate an alert that is correlated with the decoy document in which the credential was placed.

As a more particular example, in some embodiments, a deception mechanism can be provided that creates, distributes, and manages potentially large amounts of decoy information for detecting nefarious acts as well as for increasing the workload of an attacker to identify real information from bogus information. For example, the deception mechanism may create decoy documents based on documents found in the file system, based on user information (e.g., login information, password information, etc.), based on the types of documents generally used by the user of the computer (e.g., Microsoft Word documents, Adobe portable document format (PDF) files, based on the operating system (e.g., Windows, Linux, etc.), based on any other suitable approach, or any suitable combination thereof. In another suitable example, the deception mechanism may allow a user to create particular decoy documents, where the user is provided with the opportunity to select particular types of documents and particular types of decoy information. The automated creation and management of decoy information for detecting the presence and/or identity of malicious inside attackers or malicious insider activity is further described below.

As another example, in some embodiments, additionally or alternatively to creating, distributing, and/or managing decoy documents, decoy information can also be inserted into network flows. For example, the deception mechanism can analyze traffic flowing on a network, generate decoy traffic based on the analysis, and insert the decoy traffic into the network flow. The deception mechanism can also refresh the decoy traffic such that the decoy traffic remains believable and indistinguishable to inside attackers. The generation, dissemination, and management of decoy traffic of various different types throughout an operational network to create indistinguishable honeyflows are further described below.

It should be noted that, while preventive defense mechanisms generally attempt to inhibit malware from infiltrating into a network, trap-based defenses are directed towards confusing, deceiving, and detecting inside attackers within the network or external attackers and malware that have succeeded in infiltrating the network.

In some embodiments, generated decoy information can be tested to ensure that the decoy information complies with document properties that enhance the deception for different classes or types of inside attackers that vary by level of knowledge and sophistication. For example, decoy information can be generated to appear realistic and indistinguishable from actual information used in the system. If the actual information is in the English language, the decoy information is generated in the English language and the decoy information looks and sounds like properly written or spoken English. In another example, to entice a sophisticated and knowledgeable attacker, the decoy information can be a login (e.g., an email login, a system login, a network login, a website username) that appears and functions like an actual login such that it is capable of entrapping a rogue system administrator or a network security staff member. In another example, decoy information can appear to contain believable, sensitive personal information and seemingly valuable information. As described further below, decoy information can be generated such that the documents are believable, variable (e.g., not repetitive, updatable such that attackers do not identify decoy information, etc.), enticing (e.g., decoy information with particular keywords or matching particular search terms), conspicuous (e.g., located in particular folders or files), detectable, differentiable from actual information, non-interfering with legitimate users, etc.

These mechanisms can be used in a variety of applications. For example, a host agent (e.g., an ActiveX control, a Javascript control, etc.) can insert decoy password information with an embedded active beacon among data in Microsoft Outlook (e.g., in the address book, in the notes section, etc.). In another example, the accessing or misuse of decoy information can provide a detection mechanism for attacks and, in response to accessing or misusing decoy information, the embedded beacon can transmit a signal to an application (e.g., a monitoring application, a parsing application, etc.) that identifies the location of the attacker or malware (e.g., a zero day worm) embedded within a document. In some embodiments, the malware can be extracted to update signatures in an antivirus application or in a host-based monitoring application, search for other documents that include the same malware, etc. In yet another example, a legitimate user at a digital processing device can select and submit documents for the insertion of decoy information and beacons in order to detect and/or capture inside attackers on the digital processing device, where the beacons allow the legitimate user to differentiate between decoy information and actual information.

Turning to FIG. 1, an example of a system 100 in which the trap-based defense can be implemented. As illustrated, system 100 includes multiple collaborating computer systems 102, 104, and 106, a communication network 108, a malicious/compromised computer 110, communication links 112, a deception system 114, and an attacker computer system 116.

Collaborating systems 102, 104, and 106 can be systems owned, operated, and/or used by universities, businesses, governments, non-profit organizations, families, individuals, and/or any other suitable person and/or entity. Collaborating systems 102, 104, and 106 can include any number of user computers, servers, firewalls, routers, switches, gateways, wireless networks, wired networks, intrusion detection systems, and any other suitable devices. Collaborating systems 102, 104, and 106 can include one or more processors, such as a general-purpose computer, a special-purpose computer, a digital processing device, a server, a workstation, and/or various other suitable devices. Collaborating systems 102, 104, and 106 can run programs, such as operating systems (OS), software applications, a library of functions and/or procedures, background daemon processes, and/or various other suitable programs. In some embodiments, collaborating systems 102, 104, and 106 can support one or more virtual machines. Any number (including only one) of collaborating systems 102, 104, and 106 can be present in system 100, and collaborating systems 102, 104, and 106 can be identical or different.

Communication network 108 can be any suitable network for facilitating communication among computers, servers, etc. For example, communication network 108 can include private computer networks, public computer networks (such as the Internet), telephone communication systems, cable television systems, satellite communication systems, wireless communication systems, any other suitable networks or systems, and/or any combination of such networks and/or systems.

Malicious/compromised computer 110 can be any computer, server, or other suitable device for launching a computer threat, such as a virus, worm, trojan, rootkit, spyware, key recovery attack, denial-of-service attack, malware, probe, etc. The owner of malicious/compromised computer 110 can be any university, business, government, non-profit organization, family, individual, and/or any other suitable person and/or entity.

Generally speaking, a user of malicious/compromised computer 110 is an inside attacker that legitimately has access to communications network 108 and/or one or more systems 102, 104, and 106, but uses his or her access to attain illegitimate goals. For example, a user of malicious/compromised computer 110 can be a traitor that uses his or her own legitimate credentials to gain access to communications network 108 and/or one or more systems 102, 104, and 106, but uses his or her access to attain illegitimate goals. In another example, a user of malicious/compromised computer 110 can be a masquerader that impersonates another inside user.

It should be noted that, in some embodiments, an external attacker can become an inside attacker when the external attacker attains internal network access. For example, using spyware or rootkits, external attackers can gain access to communications network 108. Such software can easily be installed on computer systems from physical or digital media (e.g., email, downloads, etc.) that provides an external attacker with administrator or "root" access on a machine along with the capability of gathering sensitive data. The external attacker can also snoop or eavesdrop on one or more systems 102, 104, and 106 or communications network 108, download and exfiltrate data, steal assets and information, destroy critical assets and information, and/or modify information. Rootkits have the ability to conceal themselves and elude detection, especially when the rootkit is previously unknown, as is the case with zero-day attacks. An external attacker that manages to install rootkits internally in effect becomes an insider, thereby multiplying the ability to inflict harm.

In some embodiments, the owner of malicious/compromised computer 110 may not be aware of what operations malicious/compromised computer 110 is performing or may not be in control of malicious/compromised computer 110. Malicious/compromised computer 110 can be acting under the control of another computer (e.g., attacking computer system 116) or autonomously based upon a previous computer attack which infected computer 110 with a virus, worm, trojan, spyware, malware, probe, etc. For example, some malware can passively collect information that passes through malicious/compromised computer 110. In another example, some malware can take advantage of trusted relationships between malicious/compromised computer 110 and other systems 102, 104, and 106 to expand network access by infecting other systems. In yet another example, some malware can communicate with attacking computer system 116 through an exfiltration channel 120 to transmit confidential information (e.g., IP addresses, passwords, credit card numbers, etc.).

It should be noted that malicious code can be injected into an object that appears as an icon in a document. In response to manually selecting the icon, the malicious code can launch an attack against a third-party vulnerable application. Malicious code can also be embedded in a document, where the malicious code does not execute automatically. Rather, the malicious code lies dormant in the file store of the environment awaiting a future attack that extracts the hidden malicious code.

Alternatively, in some embodiments, malicious/compromised computer 110 and/or attacking computer system 116 can be operated by an individual or organization with nefarious intent. For example, with the use of malicious code and/or exfiltration channel 120, a user of malicious/compromised computer 110 or a user of attacking computer system 116 can perform can perform unauthorized activities (e.g., exfiltrate data without the use of channel 120, steal information from one of the collaborating systems 102, 104, and 106), etc.

It should be noted that any number of malicious/compromised computers 110 and attacking computer systems 116 can be present in system 100, but only one is shown in FIG. 1 to avoid overcomplicating the drawing.

More particularly, for example, each of the one or more collaborating or client computers 102, 104, and 106, malicious/compromised computer 110, deception system 114, and attacking computer system 116, can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client computer 1010 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 1, communication links 112 can be any suitable mechanism for connecting collaborating systems 102, 104, 106, malicious/compromised computer 110, deception system 114, and attacking computer system 116 to communication network 108. Links 112 can be any suitable wired or wireless communication link, such as a T1 or T3 connection, a cable modem connection, a digital subscriber line connection, a Wi-Fi or 802.11(a), (b), (g), or (n) connection, a dial-up connection, and/or any other suitable communication link. Alternatively, communication links 112 can be omitted from system 100 when appropriate, in which case systems 102, 104, and/or 106, computer 110, and/or deception system 114 can be connected directly to communication network 108.

Deception system 114 can be any computer, server, router, or other suitable device for modeling, generating, inserting, distributing, and/or managing decoy information into system 100. Similar to collaborating systems 102, 104, and 106, deception system 114 can run programs, such as operating systems (OS), software applications, a library of functions and/or procedures, background daemon processes, and/or various other suitable programs. In some embodiments, deception system 114 can support one or more virtual machines.

For example, deception system 114 can include a decoy information broadcaster to inject decoy traffic information into a communications network. Decoy information broadcaster can be a wireless router that has the capability to support monitor mode operation (e.g., RFMON mode) and has the capability of supporting virtual interfaces (e.g., a Virtual Access Points (VAPs) feature). It should be noted that, in some embodiments, since ACK frames are recorded as part of the decoy traffic, the decoy information broadcaster can be modified to suppress 802.11 ACK frames. It should also be noted that, in some embodiments, since whole sessions are generally injected (e.g., traffic from all communicating parties including ACK frames, retransmissions, etc.), the decoy information broadcaster can be modified to ignore ACK timeouts in injected frames.

In another example, deception system 114 can be a designated server or a dedicated workstation that analyzes the information, events, and network flow in system 100, generates decoy information based on that analysis, and inserts the deception information into the system 100. In yet another example, deception system can operate in connection with Symantec Decoy Server, a honeypot intrusion detection system that detects the unauthorized access of information on system 100. In yet another example, deception system 114 can be multiple servers or workstations that simulate the information, events, and traffic between collaborating systems 102, 104, and 106.

In some embodiments, deception system 114 can also include one or more decoy servers and workstations that are created on-demand on actual servers and workstations (e.g., collaborating systems 102, 104, and 106) to create a realistic target environment. For example, deception infrastructure 114 can include dedicated virtual machines that can run on actual end-user workstations (e.g., one of collaborating systems 102, 104, and 106) by using hardware virtualization techniques.

In some embodiments, deception system 114 can include a surrogate user bot that appears to the operating system, applications, and embedded malicious code as an actual user on system 100. Using a surrogate user bot along with a virtualization layer beneath each operating system and a monitoring environment, the surrogate user bot can follow scripts to send events through virtualized keyboard and mouse drivers, open applications, search for messages, input responses, navigate an intranet, cut and paste information, etc. The surrogate user bot can display the results of these events to virtualized screens, virtualized printers, or any other suitable virtualized output device. In some embodiments, the surrogate user bot can be used to post decoy information to blog-style web pages on a decoy service such that the blog, while visible to malware, potential intruders, and potential attackers, is not visible to risers of system 100 that do not look for the decoy information using inappropriate approaches.

In some embodiments, deception system 114 can be modeled based on different levels of insider sophistication and capability. For example, some inside attackers have tools available to assist in determining whether a document is a decoy document or a legitimate document, while other inside attackers are equipped with their own observations and thoughts. Deception system 114 can be designed to confuse, deceive, and/or detect low threat level inside attackers having direct observation as the tool available. The low threat level indicates that the inside attackers largely depends on what can be gleaned from a first glance. Deception system 114 can be designed to confuse, deceive, and/or detect medium threat level inside attackers that have the opportunity to perform a more thorough investigation. For example, if a decoy document contains a decoy account credential for a particular identity, the inside attacker can verify that the particular identity is real or not by querying an external system, such as a website (e.g., www.whitepages.com, www.google.com, etc.). Deception system 114 can also be designed to confuse, deceive, and/or detect high threat level inside attackers that have multiple tools available (e.g., super computers, access to informed people with organizational information). Deception system 114 can further be designed to confuse, deceive, and/or detect highly privileged threat level inside attackers that may be aware that the system is baited with decoy information and uses tools to analyze, disable, and/or avoid decoy information.

Deception system 114 can generate decoy information and decoy documents that comply with particular properties that enhance the deception for these different classes or threat levels of inside attackers. Decoy information can be generated such that the documents are believable, enticing, conspicuous, detectable, variable, differentiable from actual or authentic information, non-interfering with legitimate users, etc.

Deception system 114 can generate decoy information that is believable. That is, decoy documents are generated such that it is difficult for an inside attacker to discern whether the decoy document is an authentic document from a legitimate source or if the inside attacker is indeed looking at a decoy document. For example, decoy information can be generated to appear realistic and indistinguishable from actual information used in the system. If the actual information is in the English language, the decoy information is generated in the English language and the decoy information looks and sounds like properly written or spoken English.

In some embodiments, deception system 114 can record information, events, and network flow in system 100. For example, deception system 114 can monitor the execution of scripts containing sequences of traffic and events to observe natural performance deviations of communications network 108 and collaborating systems 102, 104, and 106 from the scripts, as well as the ability to distinguish such natural performance deviations from artificially induced deviations. In response, deception system 114 can generate believable decoy information.

It should be noted that, in some embodiments, deception system 114 can search through files on a computer (e.g., one or more of collaborating systems 102, 104, and 106), receive templates, files, or any other suitable input from a legitimate user (e.g., an administrator user) of a computer, monitor traffic on communications network 108, or use any other suitable approach to create believable decoy information. For example, deception system 114 can determine which files are generally accessed by a particular user (e.g., top ten, last twenty, etc.) and generate decoy information similar to those files. In another example, deception system 114 can perform a search and determine various usernames, passwords, credit card information, and/or any other sensitive information that may be stored on one or more of collaborating system 102, 104, and 106. Deception system 114 can then create receipts, tax documents, and other form-based documents with decoy credentials, realistic names, addresses, and logins. In some embodiments, deception system 114 can monitor the file system and generate decoy documents with file names similar to the files accessed on the file system (e.g., a tax document with the file name "2009 Tax Form-1099-1") or with file types similar to the files accessed on the file system (e.g., PDF file, DOC file, URL link, HTML file, JPG file, etc.).

It should also be noted that, in accordance with some embodiments, decoy information can include any suitable data that is used to entrap attackers (e.g., human agents or their system, software proxies, etc.) and/or the malware. Decoy information can include user behavior at the level of network flows, application use, keystroke dynamics, network flows (e.g., collaborating system 102 often communicates with collaborating system 104), registry-based activity, shared memory activity, etc. For example, decoy information can be a copy of an actual document on the system but with changed dates and times. In another example, decoy information can be a copy of a password file on the system with changed pass codes. Decoy information that is generated based on actual information, events, and flows can steer malware that is seeking to access and/or misuse the decoy information to deception system 114. Decoy information can assist in the identification of malicious/compromised computers (e.g., malicious/compromised computer 110), internal intruders (e.g., rogue users), or external intruders (e.g., external system 116).

It should be noted that, in some embodiments, deception system 114 does not request, gather, or store personally identifiable information about the user (e.g., a user of one of collaborating systems 102, 104, and 106). For example, deception system 114 does not gather and store actual password information associated with a legitimate user.

In some embodiments, deception system 114 can determine whether decoy information, such as a decoy document, complies with a believability property. Deception system 114 can test generated decoy documents to measure the believability of the document. For example, deception system 114 can perform a decoy Turing test, where two documents are selected—one document is a decoy document and the other document is randomly selected from a collection of authentic documents (e.g., an authentic document on a computer, one of multiple authentic documents selected by a user of the computer, etc.). The two documents can be presented to a volunteer or any other suitable user and the volunteer can be tasked to determine which of the two documents is authentic. In some embodiments, in response to testing the believability of a decoy document and receiving a particular response rate, deception system 114 can consider decoy document to comply with the believability property. For example, deception system 114 can determine whether a particular decoy document is selected as an authentic document at least 50% of the time, which is the probability if the volunteer user selected at random. In another example, deception system 114 can allow a user, such as an administrator user, to select a particular response rate for the particular type of decoy document. If the decoy document is tested for compliance with the believability property and receives an outcome less than the predefined response rate, deception system 114 can discard the decoy document and not insert the decoy document in the file system or the communications network.

In another example, a decoy Turing test can be conducted on generated decoy traffic, which relies upon users to distinguish between authentic and machine-generated decoy network traffic. An inability to reliably discern one traffic source from the other attests to decoy believability. For the decoy Turing test, traffic from multiple hosts on a private network can be recorded. The test users can be instructed to access the private network and engage one another in email conversations, use the Internet, conduct file transfer protocol (FTP) transactions, etc. The recorded traffic can include, for example, HTTP traffic, Gmail account activity, POP, and SMTP traffic. Deception system 114 can then scrub non-TCP traffic to reduce the volume of data and the resulting trace is passed to the decoy traffic generation process described below. Honeyflows were loaded with decoy credentials, given their own MAC and IP addresses, and then interwoven with the authentic flows to create a file containing all of the network trace data. Each user is then asked to determine whether traffic is authentic traffic or decoy traffic.

Alternatively, deception system 114 can decrease the response rate for a decoy document as an inside attacker generally has to open the decoy document to determine whether the document is an authentic document or not. The inside attackers can be detected or trapped in response to opening, transmitting, and/or executing the decoy document prior to determining the believability of the document.

Deception system 114 can also generate decoy information that is enticing. That is, decoy documents are generated such that it attracts inside attackers to access, transmit, open, execute, and/or misuse the decoy document. For example, deception system 114 can generate decoy documents containing information with monetary value, such as passwords or credit card numbers. In another example, to entice a sophisticated and knowledgeable inside attacker, the decoy information can be a login (e.g., an email login, a system login, a network login, a website username) that appears and functions like an actual login such that it is capable of entrapping a system administrator or a network security staff member. In yet another example, deception system 114 can monitor the file system and generate decoy documents with file names containing particular keywords (e.g., stolen, credit card, private data, Gmail account information, tax, receipt, statement, record, medical, financial, password, etc.).

In some embodiments, in addition to modifying the content of the actual information, additional content can be inserted into the decoy information to entice attackers and/or malware. For example, keywords or attractive words, such as "confidential," "top secret," and "privileged," can be inserted into the decoy information to attract attackers and/or malware (e.g., a network sniffer) that are searching for particular keywords.

In some embodiments, deception system 114 can create categories of interest for inside attackers and generate decoy documents containing decoy information assigned to one or more of the categories of interest. Categories on interest can include, for example, financial, medical record, shopping list, credit card, budget, personal, bank statement, vacation note, or any other suitable category. For an inside attacker interested in financial information, deception system 114 can create enticing decoy documents that mentions or describes information that provides access to money. In another example, the user of a computer can select one or more categories of interest that the user desires protection from inside attackers, such as login information, financial information, and/or personal photographs. In response, deception system 114 can generate, for example, a "password" note in Microsoft Outlook that contains decoy usernames and passwords for various websites, a W-2 tax document in Adobe PDF format that contains decoy tax and personal information, and a series of images obtained from Google Images with enticing filenames. In yet another example, deception system 114 can determine frequently occurring search terms associated with particular categories of interest (e.g., the terms "account" and "password" for the login information category).

In some embodiments, deception system 114 can create enticing documents for insertion into a file system. For example, deception system 114 can monitor the file system and generate decoy documents with file names similar to the files accessed on the file system (e.g., a tax document with the file name "2009 Tax Form-1099-1").

In some embodiments, deception system 114 can determine whether decoy information, such as a decoy document, complies with the enticing property. Deception system 114 can test generated decoy documents to determine whether the document is enticing to an inside attacker. For example, deception system 114 can perform content searches on a file system or network that contains decoy documents and count the number of times decoy documents appear in the top ten list of documents. In response to testing how enticing a decoy document is and receiving a particular count, deception system 114 can consider the decoy document to comply with the enticing property. For example, deception system 114 can determine whether a particular decoy document appears as one of the first ten search results. In another example, deception system 114 can allow a user, such as an administrator user, to select a particular count for the particular type of decoy document or category of interest. If the decoy document is tested for compliance with the enticing property and receives an outcome less than the particular count, deception system 114 can discard the decoy document and not insert the decoy document in the file system or the communications network.

It should be noted that, as enticement can depend upon the attacker's intent or preference, enticing information can be defined in terms of the likelihood of an adversary's preference and enticing decoy information are those decoys that are chosen with the same likelihood.

It should be also noted that, in some embodiments, these enticing decoy documents can be difficult to distinguish from actual information used in the system. For example, decoy information can be generated to appear realistic and indistinguishable from actual information used in the system. To entice a sophisticated and knowledgeable attacker, the decoy information is emulated or modeled such that a threat or an attacker (e.g., rootkits, malicious bots, keyloggers, spyware, malware, inside attacker, etc.) cannot discern the decoy information from actual information, events, and traffic on system 100.

Deception system 114 can also generate decoy information that is conspicuous. That is, decoy document are generated such that it is easily found or observed on a file system or a communications network. For example, deception system 114 can place decoy documents on the desktop of a computer. In another example, deception system 114 can place decoy documents such that the document is viewable after a targeted search action.

In some embodiments, deception system 114 can place the decoy document in a particular location selected from a list of locations associated with the category of decoy document. For example, a decoy tax document can be placed in a "Tax" folder or in the "My Documents" folder. Alternatively, deception system 114 can insert the decoy document in a randomly selected location in the file system.

In some embodiments, deception system 114 can determine whether decoy information, such as a decoy document, complies with the conspicuous property. Deception system 114 can test generated decoy documents to determine whether the document is easily visible to an inside attacker. For example, deception system 114 can perform a query and count the number of search actions needed, on average, for the decoy document to appear. The query can be a search for a location (e.g., a search for a directory named "Tax" in which the decoy document appears) and/or a content query (e.g., using Google Desktop Search for documents containing the word "Tax").

Based on the count, deception system 114 can determine whether the decoy document is to be placed at a particular location (e.g., a folder on the desktop named "Tax") or stored anywhere in the file system (e.g., not in a specific folder). For example, deception system 114 determines that the decoy document can be stored anywhere in the file system if a content-based search locates the decoy document in a single step.

It should be noted that, for the document space M, deception system 114 can create a variable V as the set of documents defined by the minimum number of user actions required to enable their view. A user action can be any suitable command or function that displays files and documents (e.g., ls, dir, search, etc.). A subscript can be used to denote the number of user actions required to view some set of documents. For example, documents that are in view at logon or on the desktop, which require no user actions, are labeled $V_0$. In another example, documents requiring one user action are labeled $V_1$. A view $V_i$ of a set of documents can be defined as a function of a number of user actions applied to a prior view, $V_{i-1}$, or:

$$V_i = \text{Action}(V_{i-1}), \text{ where } V_j \neq V_i, j<i$$

In some embodiments, in response to testing the conspicuous property of a decoy document and receiving a particular probability, deception system 114 can consider decoy document to comply with the conspicuous property. For example, if a decoy document is placed on the desktop, deception system 114 can consider such a document in full view as highly conspicuous. In another example, deception system 114 can allow a user, such as an administrator user, to select a particular probability (e.g., P=75%) or view (e.g., only $V_0$ and $V_1$ documents) for the particular type of decoy document.

Deception system 114 can also generate decoy information that is detectable. Deception system 114 can combine decoy information with any suitable number of monitoring or alerting approaches, either internal or external, to detect inside attackers.

In one suitable embodiment, deception system 114 can associate and/or embed a decoy document with one or more beacons. As described above, a beacon can be any suitable code or data that assists in the differentiation of decoy information from actual information and/or assists in indicating the malfeasance of an attacker illicitly accessing the decoy information. For example, at the time the application starts up and opens a decoy document, the beacon in the decoy document can transmit an alert to a remote server. The beacon can transmit a signal that includes information on the inside attacker to a remote website upon accessing the document that contains the decoy information. The signal can also indicate that the decoy information has been transmitted, opened, executed, and/or misused. In another example, the embedded beacon can indicate that the decoy information has been exfiltrated, where the beacon signals can include information sufficient to identify and/or trace the attacker and/or malware.

In another suitable embodiment, deception system 114 can implement one or more beacons in connection with a host sensor or a host-based monitoring application, such as an antivirus software application, that monitors the beacons or beacon signatures. For example, the host-based monitoring application can be configured to transmit signals or an alert when it detects specific signatures in documents. In another example, the host-based monitoring application can detect embedded passive beacons or tokens placed in a clandestine location of the document file format. In particular, a passive beacon, such as a watermark, can be embedded in the binary format of the document file to detect when the decoy information is loaded into memory. By embedding specific beacon signatures in the decoy documents, the host-based monitoring application can detect and/or receive beacon signals each time the decoy documents are accessed, opened, etc. Information about the purloined document can be uploaded to the host-based monitoring application. In yet another example, deception system 114 can implement a beacon that is both active and passive. That is, in one example, a passive portion of a beacon can generate a pattern, where a legitimate user can place a physical mask over the pattern to determine whether the information is decoy information or actual information, and an active portion of the beacon can transmit a signal to a remote website indicating that the decoy information has been accessed.

Figure 2:
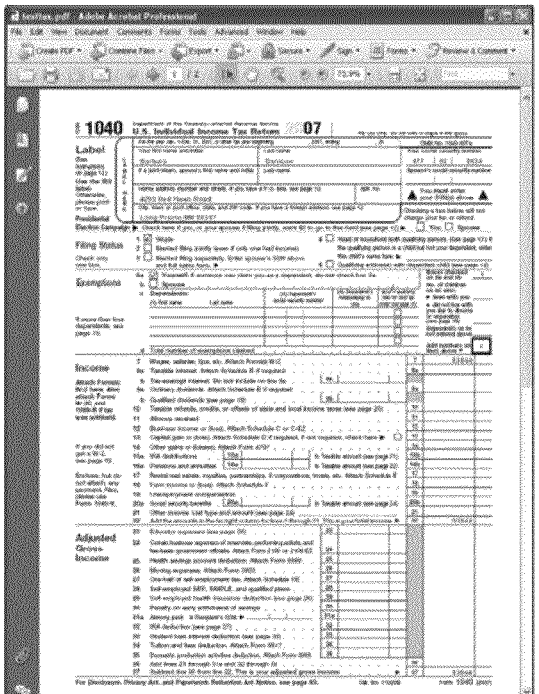
FIG. 2 is a diagram showing an original document and a decoy document with one or more embedded beacons in accordance with some embodiments of the disclosed subject matter.
Figure 2:
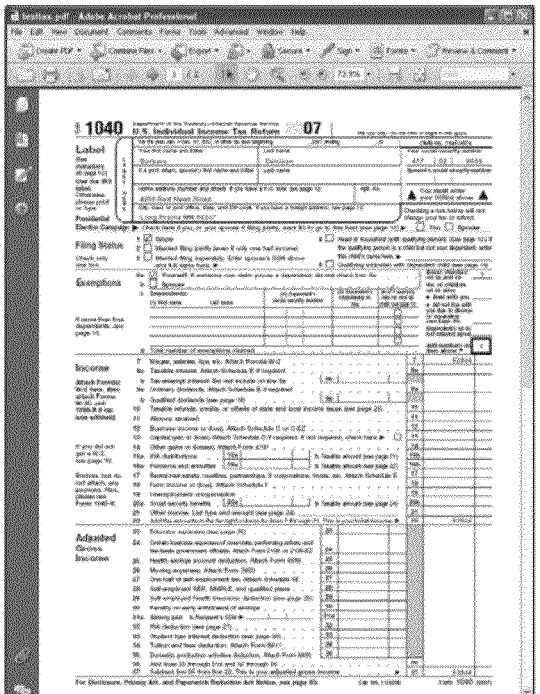

For example, as shown in FIG. 2, an original document 202 and a decoy document with an embedded beacon 204 are provided. Although document 204 is embedded with a hidden beacon (e.g., embedded code, watermark code, executable code, etc.), there are no discernable changes between the original document 202 and the decoy document 204. In some embodiments, some of the content within decoy document 204 can be altered. For example, to ensure that the decoy document is enticing without including personally identifying information, private information, such as name, address, and social security number, can be altered such that decoy document 204 is harmless if accessed and/or retrieved by an attacker.

In yet another suitable embodiment, deception system 114 can implement one or more beacons in connection with a network intrusion detection system. A network intrusion detection system, such as Snort, can be used to detect these embedded beacons or tokens during the egress or exfiltration of the decoy document in network traffic.

In some embodiments, the decoy document itself can be used to detect inside attackers at the time of information exploitation and/or credential misuse. For example, the content of the decoy information can include a decoy login (e.g., a decoy login and password for Google Mail) and/or other credentials embedded in the document content. The bogus login to a website can be created in a decoy document and can be monitored by external approaches (e.g., using a custom script that accesses mail.google.com and parses the bait account pages to gather account activity information). Monitoring the use of decoy information by external systems (e.g., a local IT system, at Gmail, at an external bank, etc.) can be used to generate an alert that is correlated with the decoy document in which the credential was placed. For example, an alert can be generated in response to an attacker logging in using the decoy login and/or performing any other suitable action (e.g., changing the password on a bogus Gmail account).

For example, if deception system 114 creates unique decoy usernames for each computer in system 100, the use of a unique decoy username can assist deception system 114 to determine which computer has been compromised, the identity of the inside attacker, etc. Deception system 114 can discover the identity and/or the location of attacking computer systems (e.g., attacking computer system 116). Deception system 114 can also discover the identity and/or the location of attackers or external attacking systems that are in communication with and/or in control of the malware. For example, a single computer can contain embedded decoy information, such as a document with a decoy username and password. A server, such as a web server, that identifies failed login attempts using the decoy username and password can receive the IP address and/or other identifying information relating to the attacking computer system along with the decoy username and password. Alternatively, the server can inform the single computer that the document containing the decoy username and password has been exfiltrated.

It should be noted that, in some embodiments, however, deception system 114 can be designed to defer making public the identity of a potential attacker or a user suspected of conducting unauthorized activities until sufficient evidence connecting the user with the suspected activities is collected. Such privacy preservation can be used to ensure that users are not falsely accused of conducting unauthorized activities. For example, if a user mistakenly opens a document containing decoy information, the user can be flagged as a potential attacker. In addition, the deception system or any other suitable monitoring application can monitor the potential attacker to determine whether the potential attacker performs any other unauthorized activities. Alternatively, a profile can be created that models the intent of the potential attacker. The profile can include information on, for example, registry-based activities, shared memory (DLL) activities, user commands, etc.

In some embodiments, deception system 114 can be used to educate and/or train users to reduce user errors or user mistakes. For example, an organization can routinely or at random present to its employee users a stream of decoy information to test whether one of the employee users accesses one or more pieces of decoy information, thereby violating the organization's policy. In response to accessing decoy information, any suitable action can be performed, such as contacting the IT department, sending an email notification to the employee user that accessed the decoy information, direct the employee user for additional training, etc. In another example, the transmission of emails with decoy URLs or emails with decoy documents that, if opened, sound an alarm or embedded decoy data in databases that, upon extraction, reveal a policy violation can be used to educate users, refresh decoy information, and refresh or restate organizational policies, thereby reducing accidental insider threats.

Deception system 114 can also generate decoy information that is variable. That is, decoy documents are generated such that they are not easily identifiable due to some common invariant information shared between decoy documents. For example, decoy documents that are varied are those in which a single search or test function does not easily distinguish actual documents from decoy documents. In particular, if the same sentence appears in 100 decoy documents, decoy documents with such repetitive information may not be considered to comply with the variability property.

Deception system 114 can also generate decoy information that does not interfere with regular operations of a legitimate user and is differentiable. That is, deception system 114 can generate decoy documents that, for an inside attacker, are indistinguishable from actual documents, but also do not ensnare the legitimate user. To comply with the non-interfering property, deception system 114 creates decoy documents that the legitimate user does not accidentally misuse the bogus information contained within the decoy document.

In some embodiments, deception system 114 can determine whether decoy information, such as a decoy document, complies with the non-interfering property. Deception system 114 can determine the number of times a legitimate user accidentally accesses, executes, transmits, and/or misuses the decoy document. For example, deception system 114 can include an alert component that transmits an email to the legitimate user each time a decoy document is accessed, executed, transmitted, etc. In response to receiving the alert (e.g., an email message), the user can be prompted to indicate whether the alert is a false alarm such that the legitimate user accidentally accessed, executed, transmitted, and/or misused the decoy document. Deception system 114 can then monitor the number of times a false alarm is created and, based on the monitoring, determine whether a particular decoy document complies with the non-interfering property. For example, in response to receiving more than three false alarms for a particular decoy document, deception system 114 can perform a suitable action—e.g., rename the decoy document, remove the decoy document from the file system, request that the legitimate user provide suggestions to modify the decoy document (e.g., to not ensnare the legitimate user again), etc.

In some embodiments, a computational object (e.g., a function) can be embedded in each document on a file system and each decoy document inserted in the file system. When a document is executed (e.g., in response to a mouse click), deception system 114 generates and displays a pattern on the display monitor in a bounded box. Alternatively, the pattern generated by the embedded computational object can be rendered or produced by the application associated with the document. For each decoy document and each actual document, the display can vary in such a way that can distinguish between real and decoy documents using a physical mask, such as a uniquely patterned transparent screen. When the physical mask is overlaid on the displayed window containing the generated pattern, a derived word, picture, icon, or any other suitable indicia can be revealed that allows the legitimate user to discriminate between real and bogus decoys. Accordingly, the attacker has to steal the user's document files stored on a hard drive or file system and the physical mask.

It should be noted that the execution of the embedded computational objects in each document produce randomly appearing patterns in windows that are not differentiable without the user's physical mask. For example, if one hundred decoy documents for each real document are stored on the file system, the attacker's task is daunting as the attacker needs to test embedded information in the documents to decide what is real and what is bogus, thereby thwarting these nefarious acts.

It should also be noted that the physical mask can be associated with a code unique to the particular user or to the particular application. For example, the physical mask can have a pattern imprinted on it that is keyed by a unique code (e.g., derived or linked to the serial number of the document application used to create the real documents). In response to placing that physical mask over the display window, information that indicates the document is real can be revealed.

Alternatively, in some embodiments, a legitimate user can differentiate between legitimate documents and decoy documents using an authentication or integrity code and a keycode. For example, each document, whether a legitimate document or a decoy document, can be associated with an authentication code or integrity code. The keycode or another suitable secret key assists the legitimate user in determining whether a document is legitimate or a decoy document. In some embodiments, one or more codes can be placed in a document (e.g., hidden in the document, conspicuous, etc.).

For example, a function can be defined that generates a secret regular language described by a regular expression, R. R can be defined by some alphabet over 36 symbols (26 letters, 10 numbers). In addition, R can be randomly generated and can be used as a pattern to decide whether a token is a member of the language or not. Deception system 114 can randomly generate strings from L(R) each time a decoy document is created. Each random string is embedded in the decoy document. In another example, the interface that generates the decoy documents and the document generation application (e.g., an Adobe PDF generator) can be coordinated to embed documents generated by the user's machine tokens from the language ~L(R) and randomly generate tokens from this language ~L(R) to be embedded in each legitimate document. Accordingly, to determine whether a document is a legitimate document or a decoy document, the embedded token can be tested to determine whether it is a member of L(R) or its complement ~L(R).

In another example, hash functions can be used in connection with the decoy and legitimate documents. For example, watermarks can appear as a hash of pseudo-randomly selected parts of the document and a secret key known only to the legitimate user. For the decoy documents, an invalid hash (e.g., that does not verify) is also computed. With a cryptographically strong hash function and with a secret key known only to the legitimate user, there is little for the inside attacker to learn.

Although some embodiments are described as decoding a generated pattern with a physical mask, it should be noted that this is merely illustrative. To allow a legitimate user to differentiate decoy information from actual information, the legitimate user can use a scanning or decoding device (e.g., a camera phone) or any other suitable device that is associated with the legitimate user. For example, the legitimate user can register a particular cellular telephone with deception system 114. In response to the legitimate user accessing a decoy document, the passive beacon associated with the decoy document can generate a pattern, such as a unique three-dimensional bar code or a machine-readable number that identifies the particular document. Upon using an application on the device to capture an image of the pattern and transmit at least a portion of the image (or corresponding data) to a server (e.g., deception system 114), the legitimate user can be provided with an indication as to whether the document is a decoy document or an actual document (e.g., a graphic displayed on the camera phone, a text message, etc.). Accordingly, similar to the physical mask, the attacker has to steal the user's document files stored on a hard drive or file system and the decoding device associated with the user.

Accordingly, decoy information that complies with one or more of the above-mentioned properties can be used to confuse and/or slow down an inside attacker or an attacker using attacking computer system 116. For example, an inside attacker or an attacker at attacking computer system 116 can be forced to spend time and energy obtaining information and then sorting through the collected information to determine actual information from decoy information. In another example, the decoy information can be modeled to contradict the actual or authentic data on system 100, thereby confusing attacking computer system 116 or the user of attacking computer system 116 and luring the user of attacking computer system 116 to risk further actions to clear the confusion.

Figure 3:
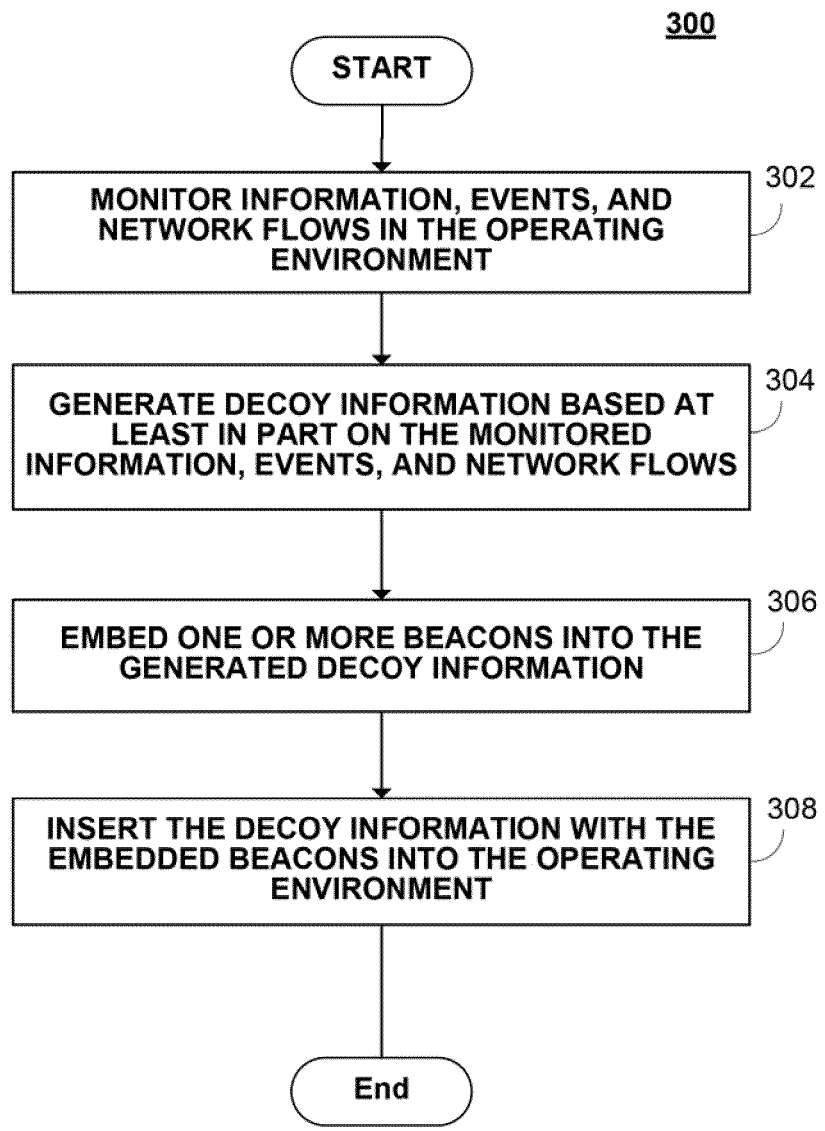
FIG. 3 is a diagram showing an example of a process for generating and inserting decoy information into an operating environment in accordance with some embodiments of the disclosed subject matter.
Figure 4:
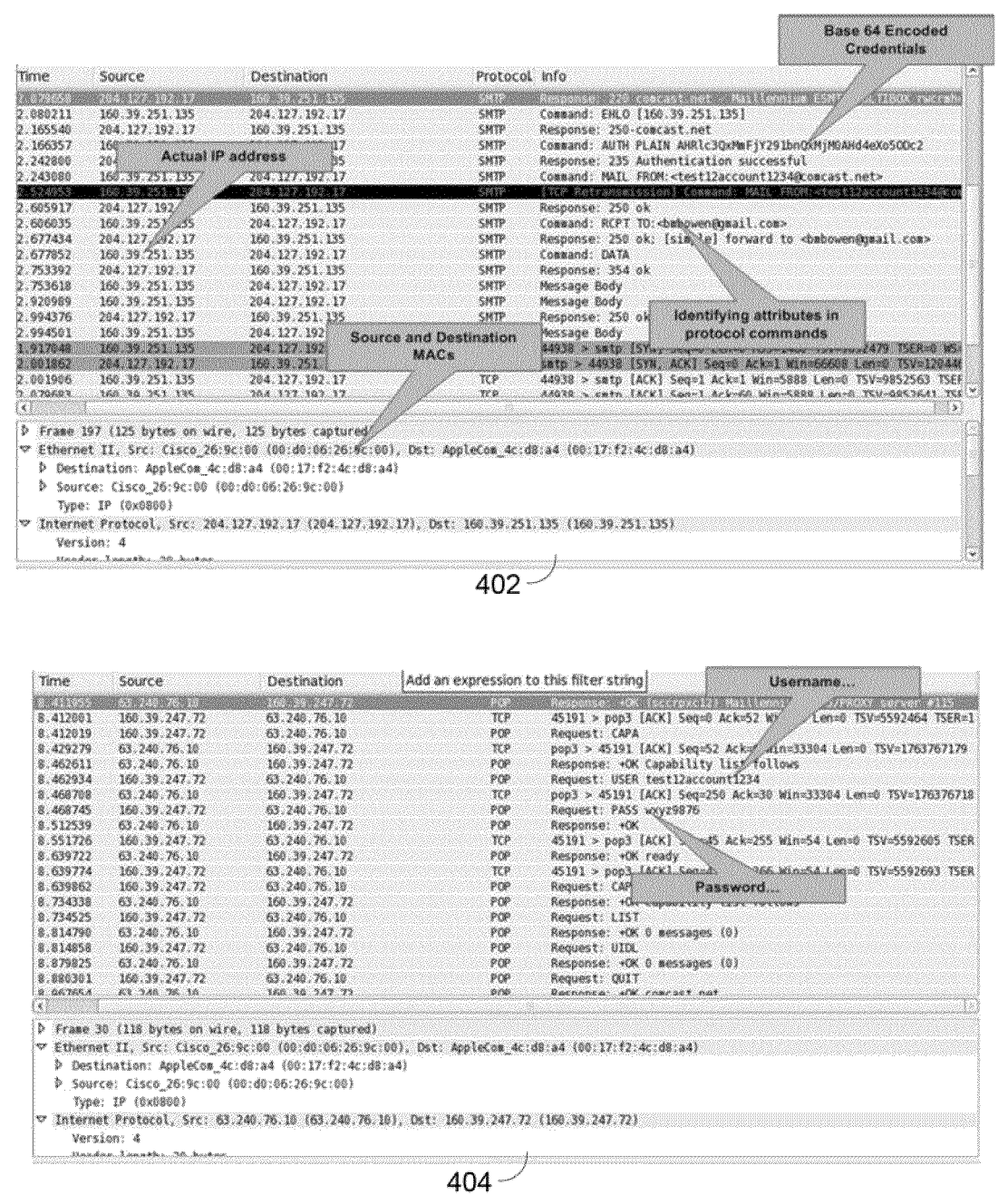

As described above, trap-based defenses using decoy information can be provided to users of collaborating systems 102, 104, and/or 106, malicious/compromised computer 110, and/or communications network 108 of FIG. 1. FIG. 3 illustrates an example 300 of a process for providing trap-based defenses in accordance with some embodiments of the disclosed subject matter. As shown, information, events, and network flows in the operating environment can be monitored at 302. For example, deception system 114 of FIG. 1 monitors user behavior at the level of network flows, application use, keystroke dynamics, network flows (e.g., collaborating system 102 often communicates with collaborating system 104), registry-based activity, shared memory activity, etc. FIG. 4 shows examples of actual Simple Mail Transfer Protocol (SMTP) traffic 402 and Post Office Protocol (POP) traffic 404 that can be monitored. As shown, IP addresses, source and destination MAC IP addresses, identifying attributes, credentials, usernames, passwords, and other suitable information are monitored. In some embodiments, deception system 114 uses a monitoring application (e.g., a network protocol analyzer application, such as Wireshark) to monitor and/or analyze network traffic.

Referring back to FIG. 3, at 304, decoy information that is based at least in part on the monitored information, events, and network flows is generated. As described previously, decoy information can include any suitable data that is used to entrap attackers and/or the malware. Decoy information can include user behavior at the level of network flows, application use, keystroke dynamics, network flows (e.g., collaborating system 102 often communicates with collaborating system 104), a sequence of activities performed by users on a collaborating system, a characterization of how the user performed the activities on the collaborating system, etc. For example, decoy information can be a copy of an actual document on the system but with changed dates and times. In another example, decoy information can be a copy of a password file on the system with changed passwords.

Illustrative examples of decoy traffic information and honeyflows are shown in FIG. 5. As shown in FIG. 5, decoy SMTP traffic 502 and decoy POP traffic 404 based upon the actual SMTP traffic 402 and actual POP traffic 404 of FIG. 4, respectively, are generated. The decoy traffic shows that decoy account usernames, decoy account passwords, decoy media access control (MAC) addresses, modified IP addresses, modified protocol commands, etc. have been generated and inserted into the communications network. The decoy information can be used to entice attackers and/or malware seeking to access and/or misuse the decoy information.

Figure 6:
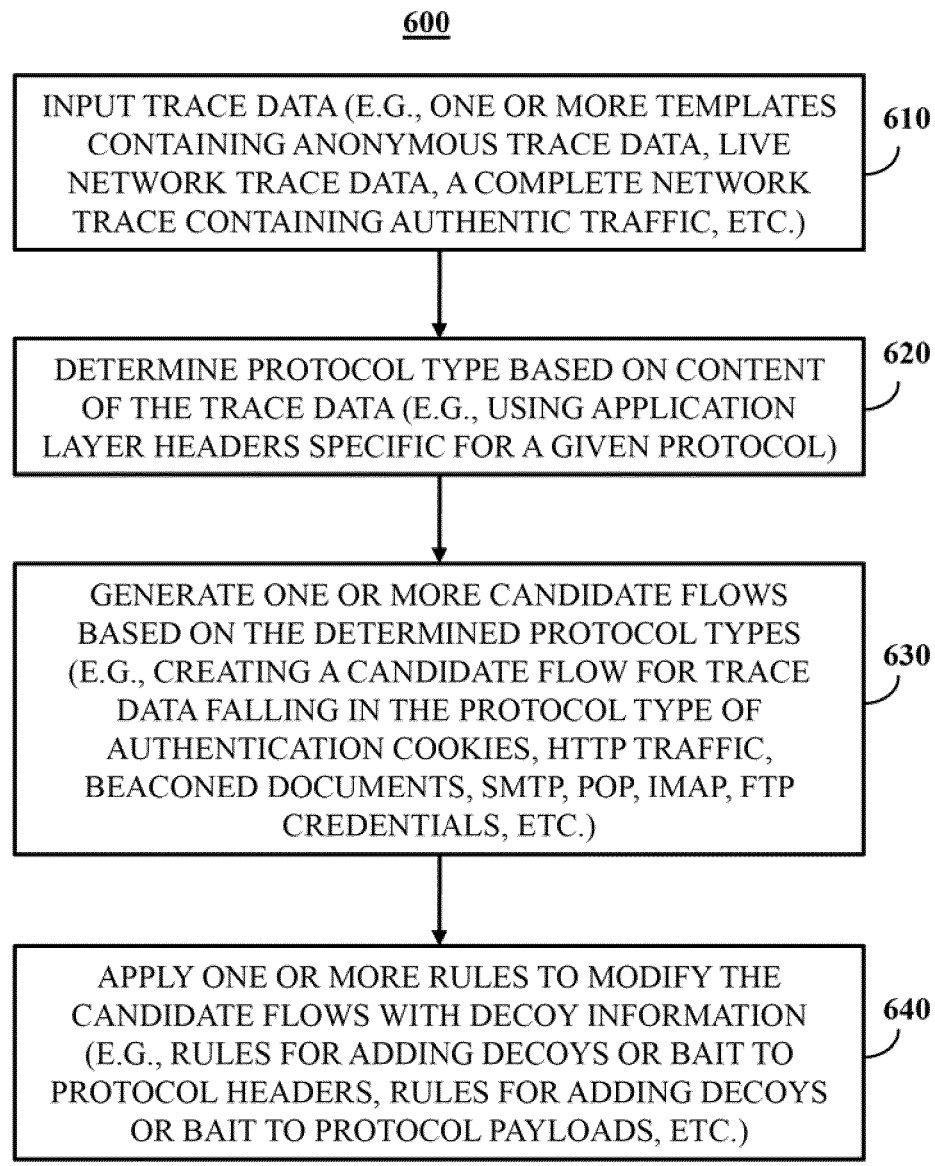
FIG. 6 is a diagram showing an example of a process for generating decoy traffic in accordance with some embodiments of the disclosed subject matter.

As a more particular example, an example 600 of a process for generating decoy traffic is shown in FIG. 6 in accordance with some embodiments of the disclosed subject matter. As shown, monitored and/or recorded trace data can be inputted into deception system 114 at 610. For example, one or more templates, each containing anonymous trace data, can be provided to deception system 114. In another example, a complete network trace containing authentic network traffic can be provided to deception system 114.

It should be noted that, regarding the recordation of network traffic, deception system 114 can receive either anonymous trace data or authentic network traffic. For example, within a university environment or any other suitable environment in which there may be concerns (e.g., ethical and/or legal) regarding the recordation of network traffic, one or more templates containing anonymous trace data can be created. These can be protocol-specific templates that contain TCP session samples for protocols used by the decoys. Alternatively, in environments having privacy concerns, deception system 114 can record a specific sample of information, events, and traffic (e.g., information that does not include personally identifying information).

In environments in which there are no concerns regarding the recordation of network traffic (e.g., enterprise environments), live network traces can be provided to deception system 114. In these situations, domain name server (DNS) name, Internet Protocol (IP) addresses of collaborating systems 102, 104, and 106 (FIG. 1), authentication credentials (e.g., a password), and the data content of the traffic (e.g., documents and email messages) are recorded. In another example, keyboard events related to an application (e.g., web browser) that indicates the input of a username and a password combination or a URL to a web server are recorded. In yet another example, network traffic containing particular protocols of interest (e.g., SMTP, POP, File Transfer Protocol (FTP), Internet Message Access Protocol (IMAP), Hypertext Transfer Protocol (HTTP), etc.) can be recorded.

At 620, in response to receiving the inputted network data, the protocol type of the trace data is determined based at least in part on the content of the trace data. Deception system 114 can, using one or more pre-defined rules, analyze the inputted trace data to determine protocol types based on the content of application layer headers. That is, deception system 114 can examine header identifiers within the trace data, where the header identifiers are specific for a given protocol. For example, application layer headers, such as "AUTH PLAIN", "EHLO", "MAIL FROM:", "RCPT TO:", "From:", "Reply-To:", "Date:", "Message-Id:", "250", "220", and "221", can be used to identify that the particular portion of trace data uses the Simple Mail Transfer Protocol (SMTP).

At 630, one or more candidate flows for each protocol type is generated. For example, if the inputted network data matches criteria of pre-defined rule sets, deception system 114 separates the inputted network data and creates a set of candidate flows including authentication cookies, HTTP traffic, documents, and/or SMTP, POP, IMAP, or FTP credentials. At 640, one or more rules are applied to modify the candidate flows with decoy information. For example, deception system 114 supports rules for adding decoy information or bait into protocol headers (e.g., IP addresses, SMTP passwords, etc.) and protocol payloads (e.g., the body of emails, web page content, etc.). Different types of decoy traffic can be created, such as Gmail authentication cookies, URLs, passwords for unencrypted protocols as SMTP, POP, and IMP, and beaconed documents as email attachments. The generation of decoy documents is described in further detail below.

In some embodiments, the decoy information can be a modified version of the actual information, where the actual information is replicated and then the original content of the actual information is modified. For example, the date, time, names of specific persons, geographic places, IP addresses, passwords, and/or other suitable content can be modified (e.g., changed, deleted, etc.) from the actual information. In another example, the source and destination MAC addresses, the source and destination IP addresses, and particular tagged credentials and protocol commands can be modified from the actual information. Such modified content renders the content in the decoy information harmless when the decoy information is accessed and/or executed by a potential attacker.

In some embodiments, deception system 114 and/or the decoy information broadcaster can refresh the decoy traffic such that the decoy traffic remains believable and indistinguishable to inside attackers. For example, one type of decoy traffic is authentication cookies, which are generally valid for a finite amount of time. In response, decoy traffic is refreshed after a predetermined amount of time has elapsed (e.g., every minute, every day, etc.). It should be noted that, if the same decoy traffic were continuously replayed within the communications network, an inside attacker would be able to distinguish the decoy traffic from authentic traffic based on the retransmissions of protocol header portions (e.g., TCP sequence numbers, IP time to live (TTL), TCP/UDP source port numbers, IP identifiers (ID), etc.). In one example, new honeyflows containing new and/or refreshed decoy traffic information are generated at deception system 114 and transmitted to one or more decoy information broadcasters for insertion into their associated communications network. Alternatively, in another example, each decoy information broadcaster generates new honeyflows containing new and/or refreshed decoy traffic information are generated and inserted into its associated communications network.

In addition to inserting decoy information, these honeyflows or traffic containing decoy information are modified to create variability and randomness. Deception system 114 performs a rule-driven replacement of MAC addresses and IP addresses to those from predefined set (e.g., a list of decoy MAC addresses, a list of decoy IP addresses, etc.). Deception system 114 can also use natural language programming heuristics to ensure that content matches throughout the decoy traffic or decoy document. For example, deception system 114 can ensure that content, such as names, addresses, and dates, match those of the decoy identities.

In some embodiments, deception system 114 can support the parameterization of temporal features of the communications network (e.g., total flow time, inter-packet time, etc.). That is, deception system 114 can extract network statistics from the network data (e.g., the inputted trace data) or obtain network statistics using any suitable application. Using these network statistics, deception system 114 can modify the decoy traffic such that is appears statistically similar to normal traffic.

In some embodiments, deception system 114 can obtain additional information relating to collaborating systems 102, 104, and/or 106, malicious/compromised computer 110, and/or communications network 108 of FIG. 1 that deception system 114 is generating decoy traffic. For example, deception system 114 can determine the operating system of the computer (e.g., using OS fingerprint models) to generate decoy information that is accurately modeled for a given host operating system. To generate decoy traffic that appears to emanate from a Linux host, email traffic can be generated that appears to have come from the Evolution email client, as opposed to Microsoft Outlook that is generally used on devices where Microsoft Windows is the operating system.

In some embodiments, existing historical information, such as previously recorded network data flows, can be used to create traceable, synthetic decoy information. Using existing historical information can mitigate the risk of detection by attackers and/or malware, such as network sniffers, because the flow of the decoy information generated using the historical information can be similar to prior traffic that the network sniffers have seen. It should be noted that use of the historical information is localized to specific collaborating system or specific network segments to inhibit the exposure of sensitive information. For example, recorded historical information in one subnet is not used in another subnet to avoid exposing sensitive information that would otherwise remain hidden from malware located in one of the subnets.

In some embodiments, snapshots of the collaborating system's environment can be taken at given times (e.g., every month) to replicate the environment, including any hidden malware therein. The snapshots can be used to generate decoy information for the collaborating system.

Upon generating decoy traffic, deception system 114 can inject the decoy traffic into a communications network. As described above, deception system 114 can include a decoy information broadcaster to inject decoy traffic information into a communications network. Decoy information broadcaster can be a wireless router that has the capability to support monitor mode operation (e.g., RFMON mode) and has the capability of supporting virtual interfaces (e.g., a Virtual Access Points (VAPs) feature). It should be noted that, in some embodiments, since ACK frames are recorded as part of the decoy traffic, the decoy information broadcaster can be configured to suppress 802.11 ACK frames. It should also be noted that, in some embodiments, since whole sessions are generally injected (e.g., traffic from all communicating parties including ACK frames, retransmissions, etc.), the decoy information broadcaster can also be configured to ignore ACK timeouts in injected frames.

In response to configuring the decoy information broadcaster, a virtual access point is created and the created virtual access point is set to monitor mode. The generated decoy traffic is transferred to the decoy information broadcaster, where tcpreplay or any other suitable tool is used to playback or disperse the decoy traffic inside the communication network associated with the decoy information broadcaster.

As mentioned above, deception system 114 and/or the decoy information broadcaster can refresh the decoy traffic such that the decoy traffic remains believable and indistinguishable to inside attackers. For example, one type of decoy traffic is authentication cookies, which are generally valid for a finite amount of time. In response, decoy traffic is refreshed after a predetermined amount of time has elapsed (e.g., every minute, every day, etc.). It should be noted that, if the same decoy traffic were continuously replayed Within the communications network, an inside attacker would be able to distinguish the decoy traffic from authentic traffic based on the retransmissions of protocol header portions (e.g., TCP sequence numbers, IP time to live (TTL), TCP/UDP source port numbers, IP identifiers (ID), etc.). In one example, new honeyflows containing new and/or refreshed decoy traffic information are generated at deception system 114 and transmitted to one or more decoy information broadcasters for insertion into their associated communications network. Alternatively, in another example, each decoy information broadcaster generates new honeyflows containing new and/or refreshed decoy traffic information are generated and inserted into its associated communications network. The determination between using deception system 114 or the decoy information broadcaster to generate and/or refresh the decoy traffic may be based on, for example, the processing power of the decoy information broadcaster, the delay between the time that deception system 114 decides to generate and transmit decoy traffic and the time that the actual injection into the communications network takes place, etc.

In some embodiments, deception system 114 can support the parameterization of temporal features of the communications network (e.g., total flow time, inter-packet time, etc.). That is, deception system 114 can extract network statistics from the inputted network data or obtain network statistics using any suitable application. Using these network statistics, deception system 114 can modify the decoy traffic such that is appears statistically similar to normal traffic.

In some embodiments, deception system 114 can embed beacons along with the decoy traffic or portions of the decoy traffic. For example, passive beacons can be used that allow a monitoring application to detect the transmission of decoy traffic over the network. In another example, decoy documents that are generated as a portion of the decoy traffic can be embedded with active beacons, where the active beacons transmit a signal to a remote website or the monitoring application in response to an attacker accessing the decoy document from the decoy traffic.

As another example, in some embodiments, additionally or alternatively to generating, inserting, and/or managing honeyflows and decoy information in network flows, a deception mechanism can be provided that creates, distributes, and manages decoy information for detecting nefarious acts as well as to increase the workload of an attacker to identify real information from bogus information. For example, the deception mechanism may create decoy documents based on documents found in the file system, based on user information (e.g., login information, password information, etc.), based on the types of documents generally used by the user of the computer (e.g., Microsoft Word documents, Adobe portable document format (PDF) files, based on the operating system (e.g., Windows, Linux, etc.), based on any other suitable approach, or any suitable combination thereof. In another suitable example, the deception mechanism may allow a user to create particular decoy documents, where the user is provided with the opportunity to select particular types of documents and particular types of decoy information.

FIGS. 7-18 show a deception mechanism for creating, distributing, and/or managing decoy documents in accordance with some embodiments of the disclosed subject matter. In some embodiments, decoy information and, more particularly, decoy documents can be generated in response to a request by the user. For example, a system administrator or a government intelligence officer can fabricate decoy information (e.g., decoy documents) that is attractive to malware or potential attackers. Malware that is designed to spy on the network of a government intelligence agency can be attracted to different types of information in comparison to malware that is designed to spy on the corporate network of a business competitor. In another example, a user of a computer can provide documents, whether exemplary documents or templates, for the creation of decoy documents. Accordingly, using an interface, a user (e.g., government intelligence officer, an information technology professional, etc.) can create tailored decoy information, such as a top secret jet fighter design document or a document that includes a list of intelligence agents.

Figure 7:
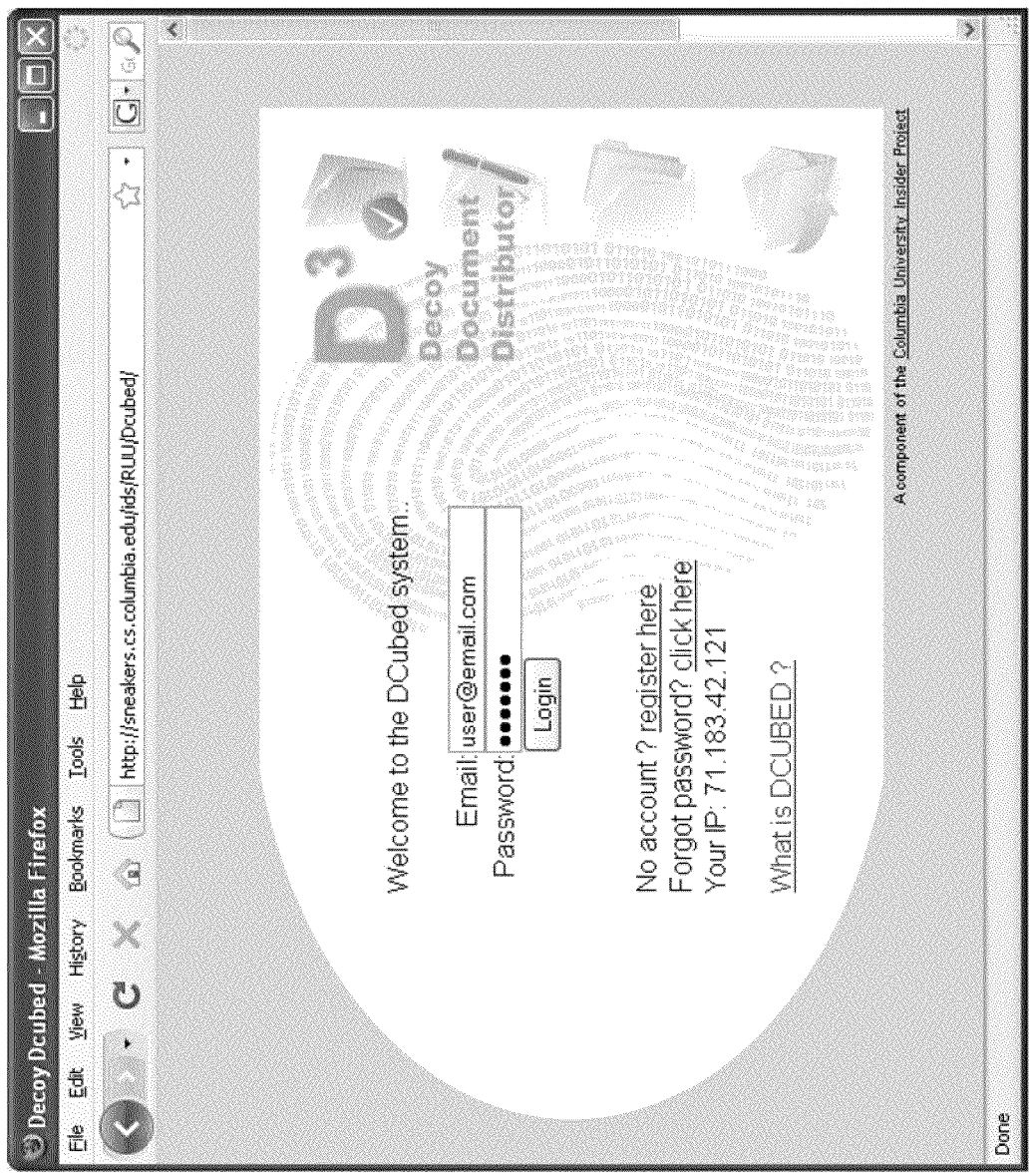
FIGS. 7-8 are diagrams showing an example of an interface for managing documents containing decoy information in accordance with some embodiments of the disclosed subject matter.
Figure 8:
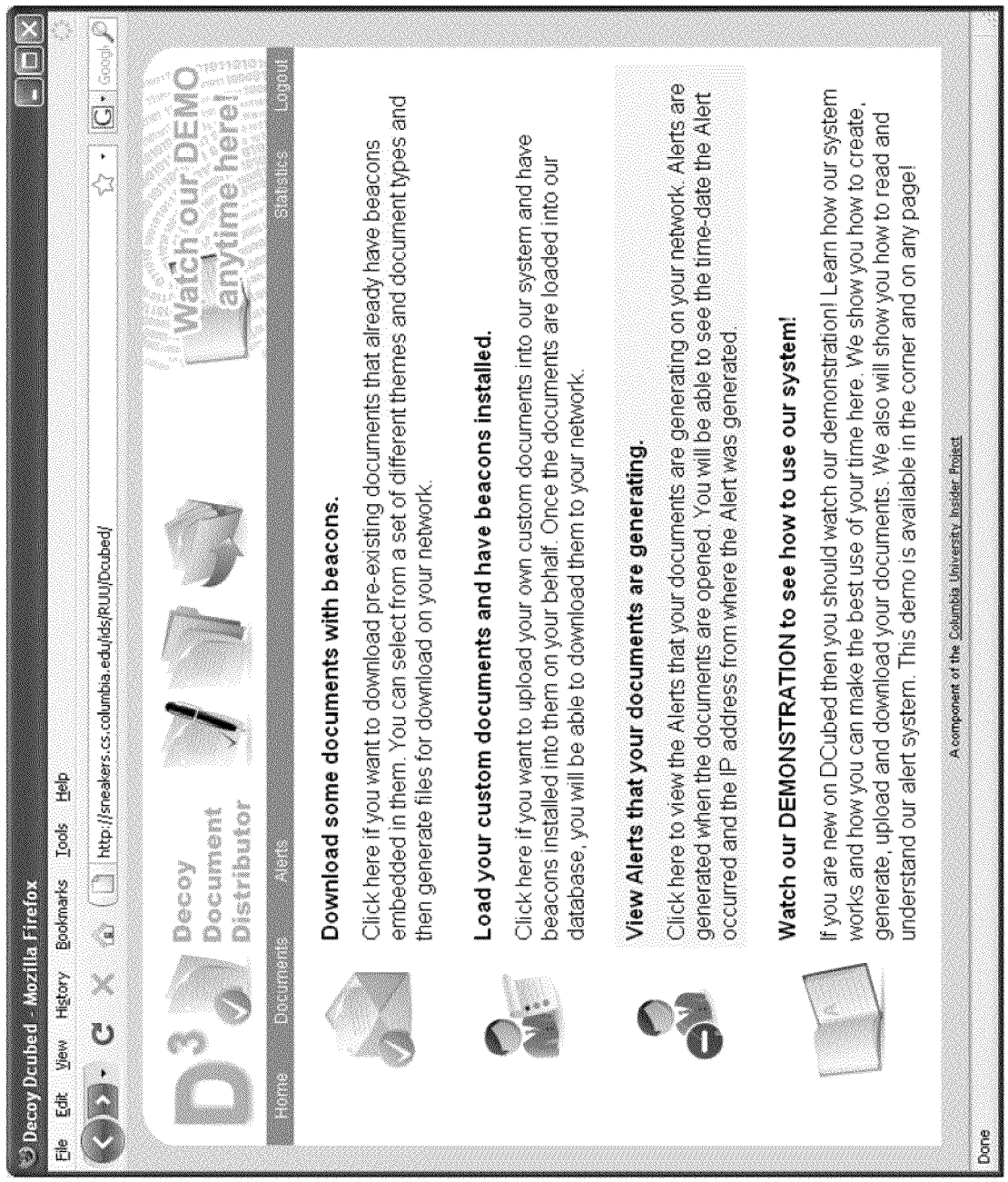

Turning to FIG. 7, a website or any other suitable interface can be provided to a user for generating, obtaining (e.g., downloading), and managing decoy documents in accordance with some embodiments. As shown in FIG. 7, the website requests that the user register with a legitimate email address (e.g., user@email.com). In response to registering with the website and entering in the legitimate email along with a password, the website provides the user with the opportunity to create and/or download decoy documents, load user-selected documents or customized documents for the insertion of one or more beacons, and/or view alerts from beacons embedded in generated decoy documents, as shown in FIG. 8.

Figure 9:
FIGS. 9-11 are diagrams showing an example of an interface for generating and managing documents containing decoy information in accordance with some embodiments of the disclosed subject matter.
Figure 10:
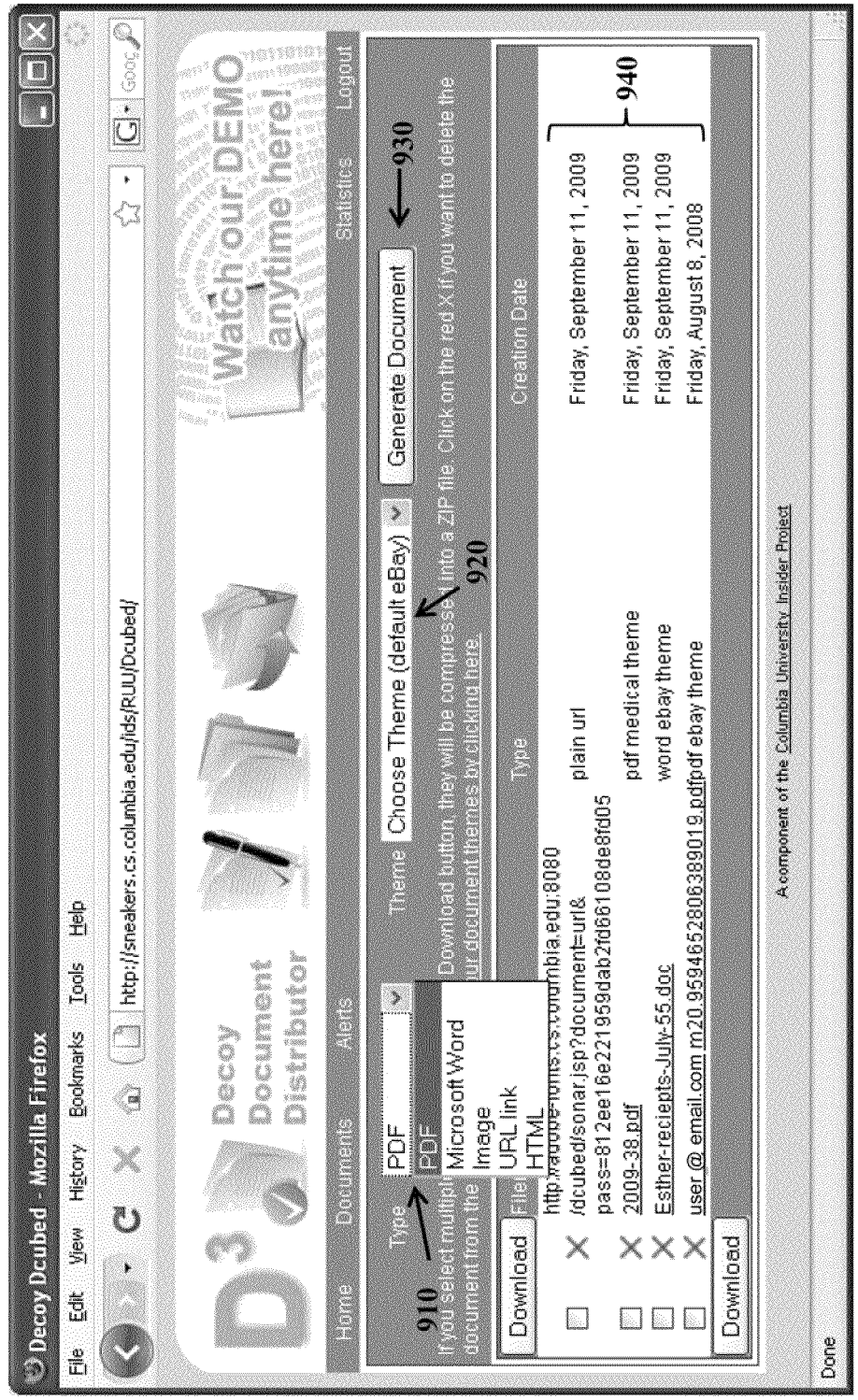
Figure 11:
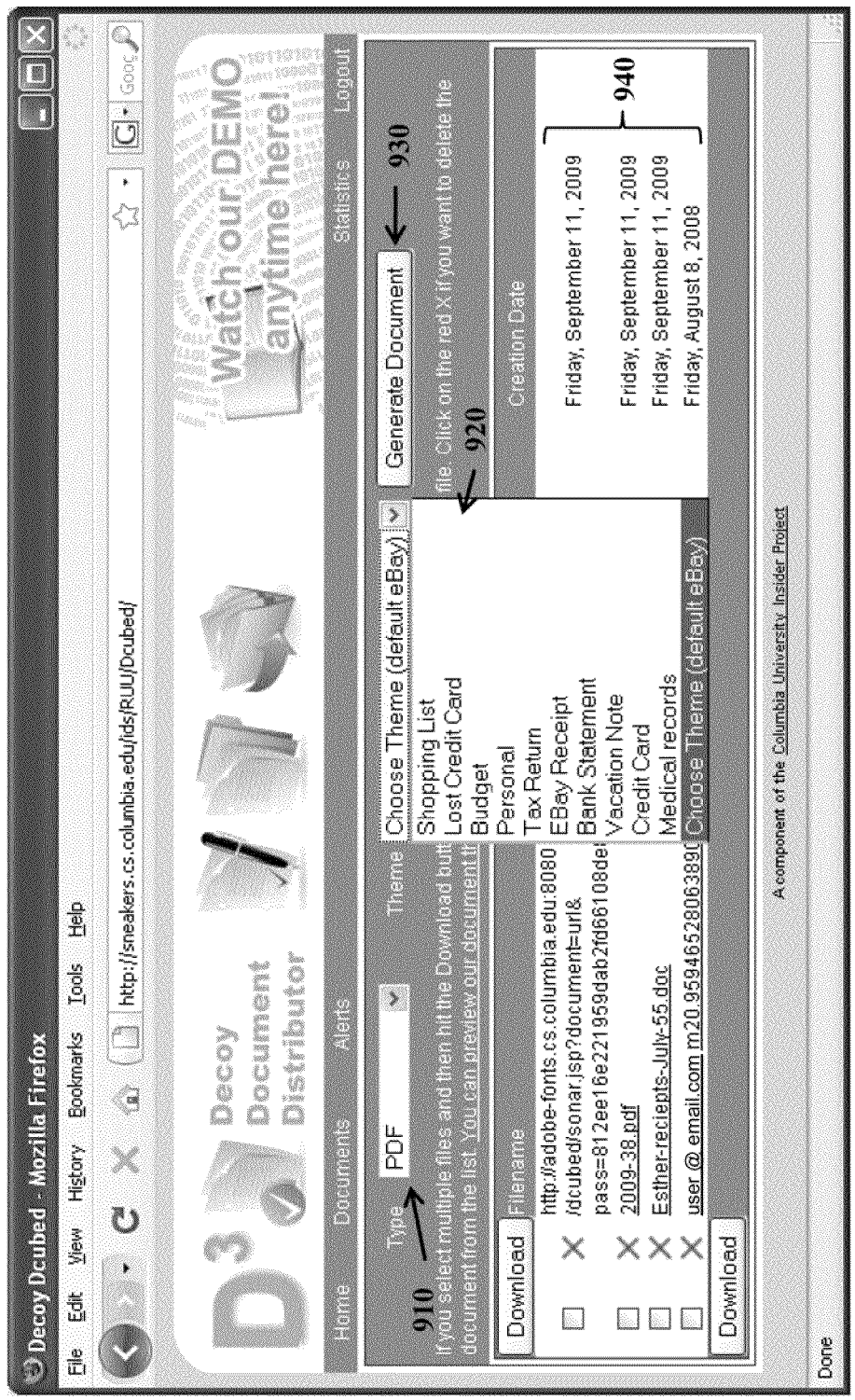
Figure 12:
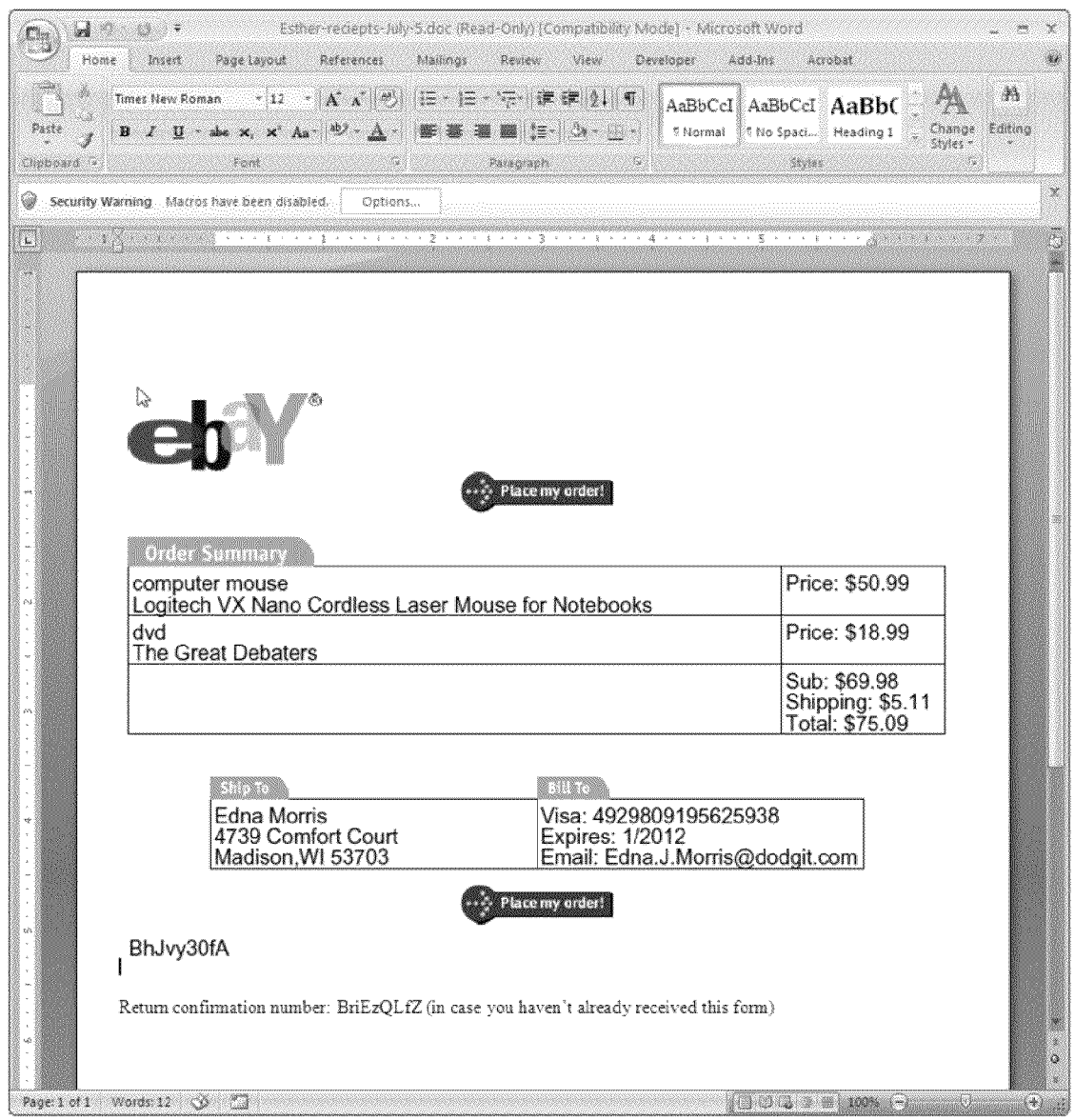
FIG. 12 is a diagram showing an example of a generated decoy document in the form of an eBay receipt in Microsoft Word format in accordance with some embodiments of the disclosed subject matter.
Figure 13:
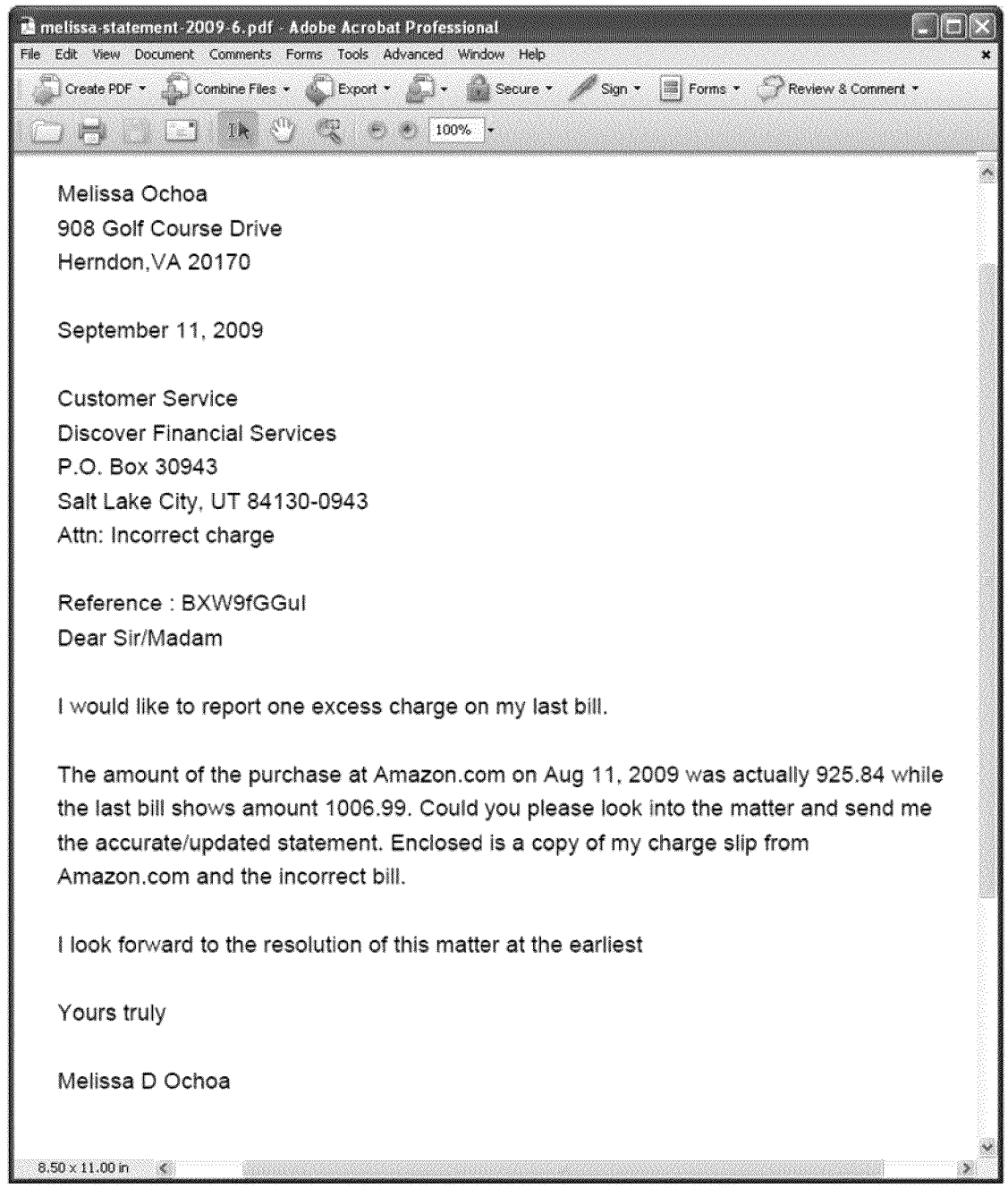
FIG. 13 is a diagram showing an example of a generated decoy document in the form of a credit card letter in Adobe PDF format in accordance with some embodiments of the disclosed subject matter.
Figure 14:
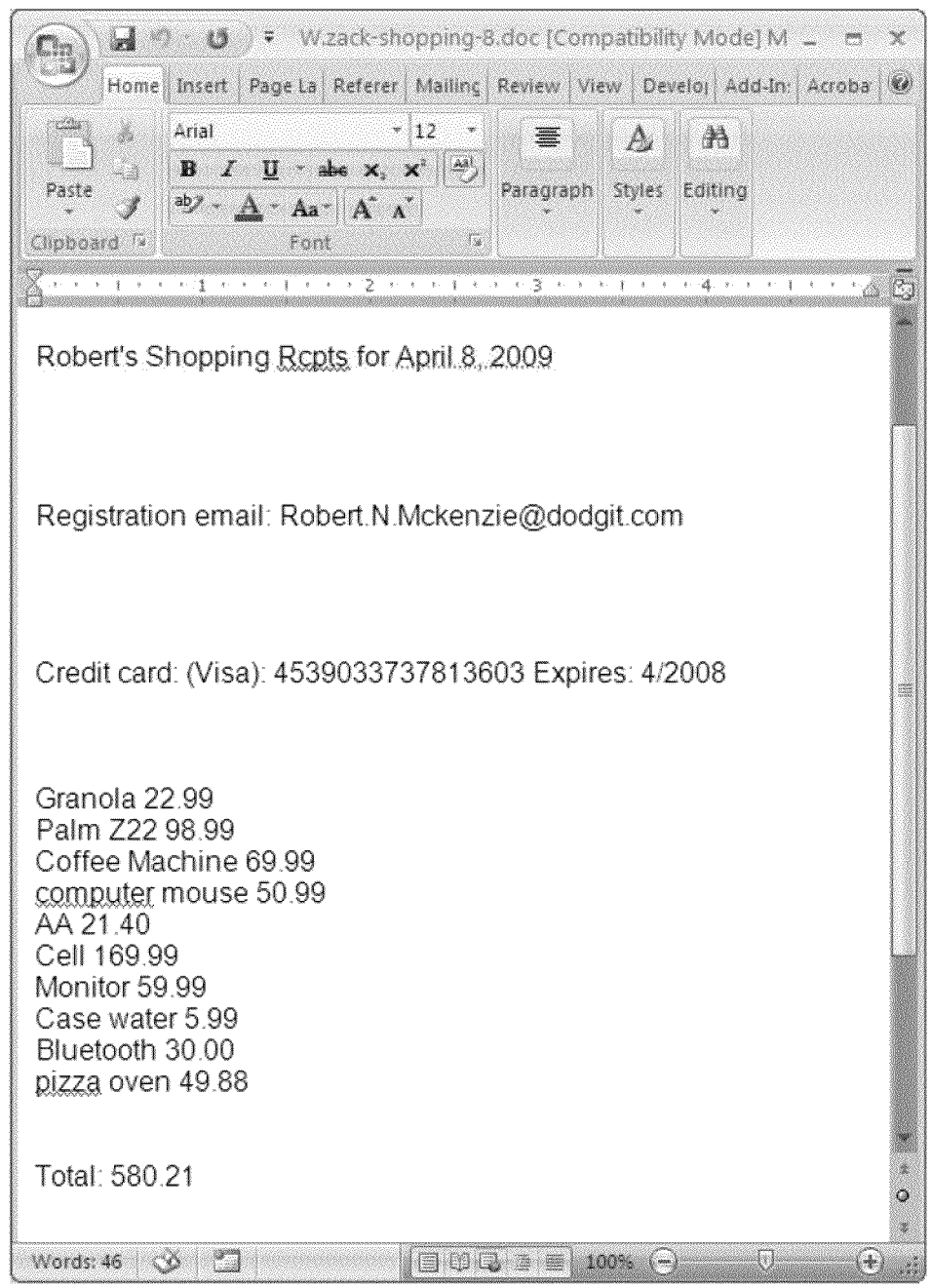
FIG. 14 is a diagram showing an example of a generated decoy document in the form of a shopping list in accordance with some embodiments of the disclosed subject matter.
Figure 15:
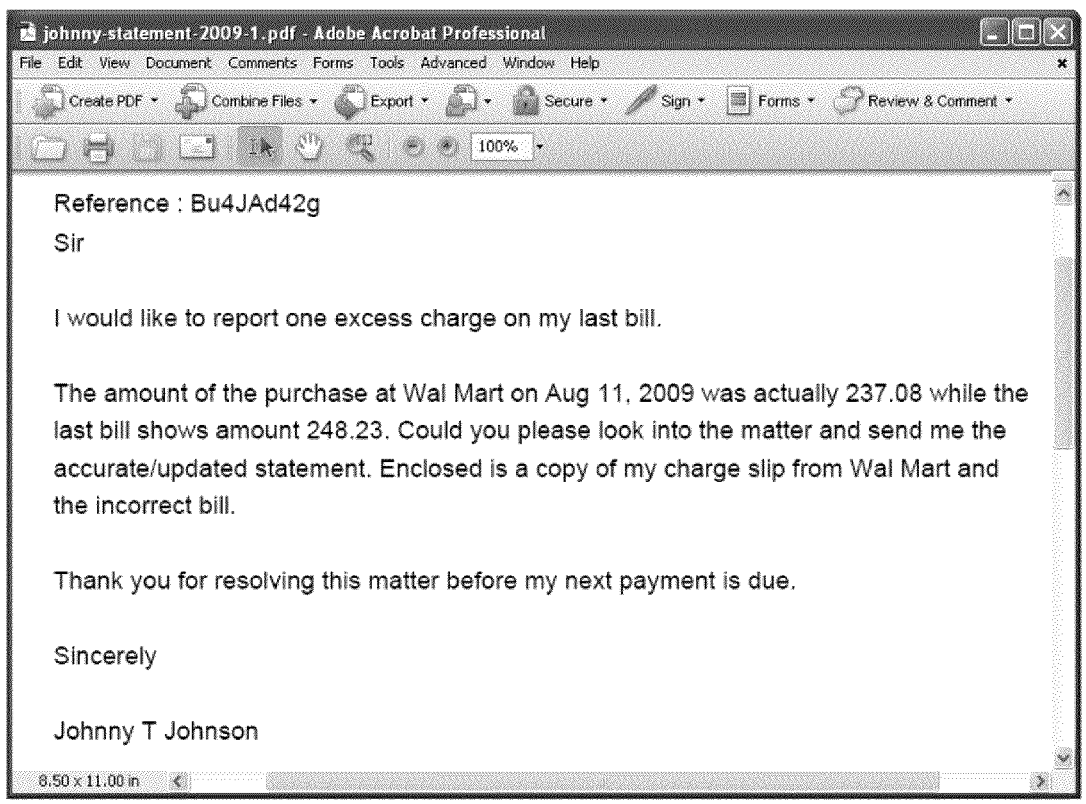
FIG. 15 is a diagram showing an example of a generated decoy document in the form of a credit card letter in Microsoft Word format in accordance with some embodiments of the disclosed subject matter.
Figure 16:
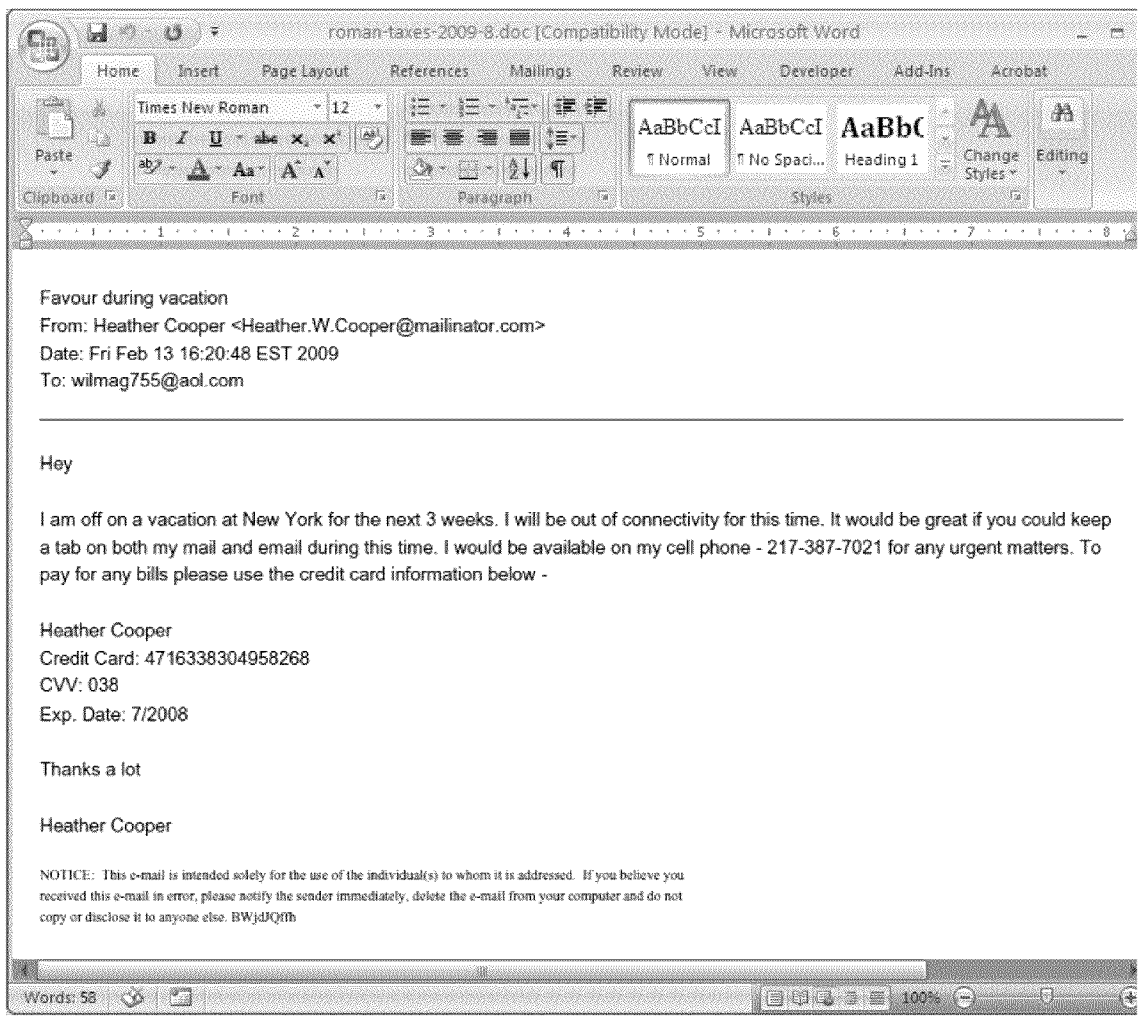
FIG. 16 is a diagram showing an example of a generated decoy document in the form of a vacation note in accordance with some embodiments of the disclosed subject matter.

In response to the user selecting to generate a decoy document (e.g., pre-existing decoy documents that have embedded beacons, using decoy document templates), deception system 114 can provide an interface that allows the user to generate customized decoy documents for insertion into the file system. An exemplary interface is shown in FIGS. 9-11. As shown, display 900 provides the user with fields 910 and 920 for generating decoy documents. Field 910 allows the user to select a particular type of decoy document to generate (e.g., a Word document, a PDF document, an image document, a URL link, an HTML file, etc.) (See, e.g., FIG. 10). Field 920 allows the user to select a particular theme for the decoy document (e.g., a shopping list, a lost credit card document, a budget report, a personal document, a tax return document, an eBay receipt, a bank statement, a vacation note, a credit card statement, a medical record, etc.) (See, e.g., FIG. 11).

In some embodiments, the exemplary interface shown in FIGS. 9-11 can allow the user to input suggested content for insertion in the decoy documents. For example, the user can input a particular user name and/or company name for use in the decoy document. In another example, the user can input a particular file name or portion of a file name for naming the decoy document. Alternatively, the user can indicate that a random user and/or company for inclusion in the decoy document can be selected.

In some embodiments, the exemplary interface shown in FIGS. 9-11 can access publicly available documents that can be obtained using search engines, such as www.google.com and www.yahoo.com, to generate decoy information. For example, the user can select that the interface of deception system 114 obtain one or more PDF-Tillable tax forms from the www.irs.gov website. In another example, the user can select that the interface of deception system 114 search one or more computers for exemplary documents and/or information for conversion into decoy documents.

In response to the user selecting one or more options (e.g., type, theme, etc.) and selecting, for example, a generate button 930 (or any other suitable user interface), the interface generates a decoy document and provides the decoy document to the user. For example, the above-mentioned decoy document properties assist the interface to design decoy document templates and the decoy document templates are used to generate decoy documents. The content of each decoy documents includes one or more types of bait or decoy information, such as online banking logins provided by a collaborating financial institution, login accounts for online servers, and web-based email accounts. As shown in FIGS. 9-11, the generated decoy documents are provided in a list 940, where the user is provided with the opportunity to download one or more decoy documents. Upon obtaining the generated decoy documents, the user can insert the decoy documents into the user's local machine, another user's local machine, place the document on a networked drive, etc.

Figure 18:
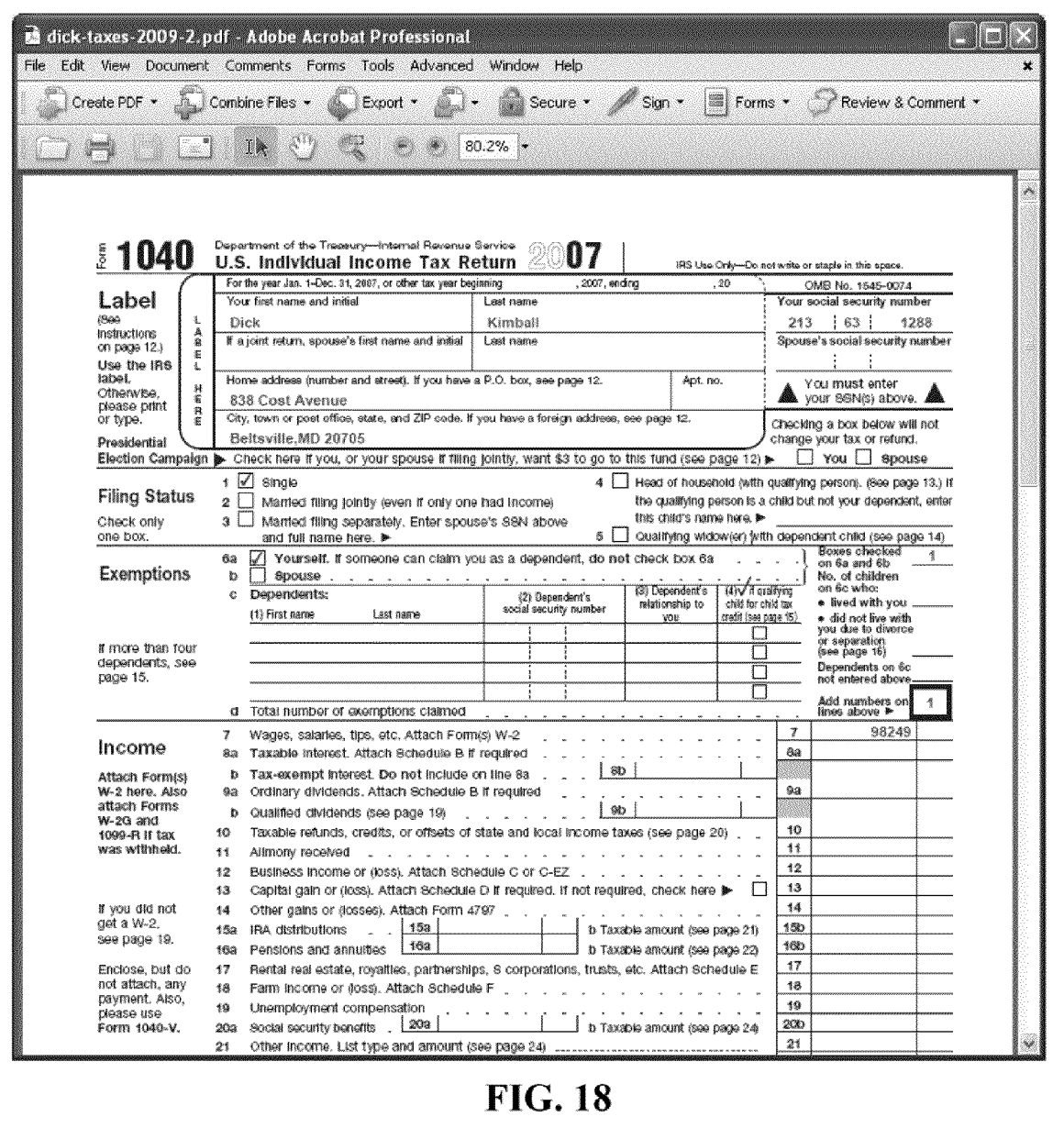

Illustrative examples of generated decoy documents are shown in FIGS. 12-18. As shown, decoy documents can include an eBay receipt in Word format (FIG. 12), a credit card letter in PDF format (FIG. 13) and in Word format (FIG. 15), a shopping list (FIG. 14), a vacation note in Word format (FIG. 16), a medical billing summary (FIG. 17), and an internal Revenue Service Form 1040 tax document (FIG. 18). As shown in FIGS. 12-18, the interface has generated multiple decoy documents that include decoy customer information (e.g., names, addresses, credit card numbers, tracking numbers, credit card expiration dates, salary numbers, tax information, social security numbers, payment amounts, email addresses, etc.).

Referring back to FIG. 8, the exemplary interface provides a user with the opportunity to load user-selected or customized documents. For example, the user can select forms (e.g., blank PDF Tillable forms), templates, actual documents, and/or any other suitable document for use in generating decoy documents.

It should be noted that, although the embodiments described herein generate decoy documents based on user-selected document type, user-selected theme, and/or user-identified documents on a file system, these are illustrative. For example, in some embodiments, deception system 114 can generate decoy documents based on a search of the user computer. For example, deception system 114 may search and/or monitor a computer to determine documents found on the system, top ten documents accessed by a particular user, etc.

It should also be noted that, in some embodiments, the interface of deception system 114 can monitor the amount of time that a particular decoy documents remains on a file system and, after a particular amount of time has elapsed, refresh the decoy documents and/or send a reminder to the user to generate new decoy documents. For example, in response to a medical record decoy document remaining on a particular file system for over 90 days, deception system 114 can generate a reminder (e.g., a pop-up message, an email message, etc.) that requests that the user allow the deception system 114 to refresh the decoy document or requests that the user remove the particular decoy document and generate a new decoy document.

In some embodiments, alternatively or additionally to allowing the user to download the decoy documents into the file system, the interface can instruct the user to place the decoy document in a particular folder. For example, the interface can recommend that the user place the document in a location, such as the "My Documents" folder or any other suitable folder (e.g., a "Tax" folder, a "Personal" folder, a "Private" folder, etc.). Alternatively, the interface can insert one or more decoy documents into particular locations on the file system.

In some embodiments, the interface can provide a user with information that assists the user to more effectively deploy the decoy documents. The interface can prompt the user to input information suggestive of where the deception system or any other suitable application can place the decoy documents to better attract potential attackers. For example, the user can indicate that the decoy information or decoy document be placed in the "My Documents" folder on collaborating system. In another example, the interface can instruct the user to create a folder for the insertion of decoy document, such as a "My Finances" folder or a "Top Secret" folder.

In some embodiments, the interface can request to analyze the system for placement of decoy information. In response to the user allowing the website to analyze the user's computer, the website can provide the user with a list of locations on the user's computer to place decoy information (e.g., the "My Documents" folder, the "Tax Returns" folder, the "Temp" folder associated with the web browser, a password file, etc.). In some embodiments, in response to the user allowing the interface to analyze the user's computer, the website can record particular documents from the user's computer and generate customized decoy documents. In some embodiments, in response to the user allowing the interface to analyze the user's computer, the interface can provide a list of recommended folders to place decoy media.

In some embodiments, each collaborative system (e.g., collaborating systems 102, 104, and 106) can designate a particular amount of storage capacity available for decoy information. For example, a collaborative system can indicate that 50 megabytes of storage space is available for decoy information. In some embodiments, decoy information can be distributed even among the collaborative systems in the network. For example, in response to generating 30 megabytes of decoy information, each of the three collaborative systems in the network receives 10 megabytes of decoy information. Alternatively, collaborative systems can receive any suitable amount of decoy information such that the decoy information appears believable and cannot be distinguished from actual information. For example, deception system 114 of FIG. 1 can generate decoy information based on the actual information (e.g., documents, files, e-mails, etc.) on each collaborative system. In another example, deception system 114 can generate a particular amount of decoy information for each collaborative system based on the amount of actual information is stored on each collaborative system (e.g., 10% of the actual information).

In some embodiments, the interface can transmit notifications to the user in response to discovering that the decoy media has been accessed, transmitted, opened, executed, and/or misused. For example, in response to an attacker locating and opening a decoy document that includes decoy credit card numbers, the interface can monitor for attempts by users to input a decoy credit card number. In response to receiving a decoy credit card number, the interface can transmit an email, text message, or any other suitable notification to the user. In another example, the decoy information can include decoy usernames and/or decoy passwords. The interface can monitor for failed login attempts and transmit an email, text message, or any other suitable notification to the user when an attacker uses a decoy username located on the user's computer.

In some embodiments, decoy information can combined with any suitable number of monitoring or alerting approaches, either internal or external, to detect inside attackers. Referring back to FIG. 3, in some embodiments, one or more beacons (e.g., active beacons, passive beacons, watermarks, a code that generates a pattern, etc.) can be associated with and/or embedded into the generated decoy information at 306. Generally speaking, a beacon can be any suitable code (executable or non-executable) or data that can be inserted or embedded into decoy information and that assists in indicating that decoy information has been accessed, transmitted, opened, executed, and/or misused and/or that assists in the differentiation of decoy information from actual information. Next, at 308, the decoy information along with the embedded beacons are inserted into the operating environment.

In some embodiments, the beacon is executable code that can be configured to transmit signals (e.g., a ping) to indicate that the decoy information has been accessed, transmitted, opened, executed, and/or misused. For example, in response to an attacker opening a decoy document, the embedded beacon transmits information about the attacker to a website. In a more particular example, in response to an attacker opening a decoy Microsoft Word document entitled "2009 Tax 1099," the Microsoft Word document opens the decoy document, where a beacon in the form of a macro is automatically triggered upon opening the document and transmits a signal to a remote website. More particularly, the local browser application can be invoked from within a Word macro and information, such as local machine directories, user's credentials, and the machine's IP address can be encoded and passed through a firewall by the local browser agent. The website can then, for example, transmit an email notification to the legitimate user associated with the opened decoy document. In yet another example, the Adobe Acrobat application includes a Javascript interpreter that can issue a data request upon the opening of the document through the use of Javascript code. The beacon contains the token to identify the document so that deception system 114 can track individual documents as they are read across different systems.

In some embodiments, the beacon is a passive beacon, such as embedded code or watermark code that is detected upon attempted use. For example, the beacon is embedded mark or code hidden in the decoy media or document that is scanned during the egress or transmission of the decoy media or document in network traffic. In another example, the beacon is an embedded mark or code hidden in the decoy media or document that is scanned for in memory whenever a file is loaded into an application, such as an encryption application.

In some embodiments, the beacon is both an active beacon and a passive beacon. For example, a passive portion of the beacon can generate a pattern, where a legitimate user can place a physical mask over the pattern to determine whether the information is decoy information or actual information, and the active portion of the beacon can transmit a signal to a remote website indicating that the decoy information has been accessed.

The signals emitted from a beacon (or from an application that executes the decoy information containing the beacon) can indicate that the decoy information has been accessed, transmitted, opened, executed, and/or misused. Alternatively, the use of the decoy information with the embedded beacon can indicate that the decoy information has been exfiltrated, where the beacon signals can include information sufficient to identify and/or trace the attacker and/or malware. In yet another suitable example, the content of the decoy information itself can be used to detect an insider attack. The content of the decoy information can include a bogus login (e.g., a bogus login and password for Google Mail). The bogus login to a website can be created in a decoy document and monitored by external approaches (e.g., using a custom script that accesses mail.google.com and parses the bait account pages to gather account activity information).

In another suitable embodiment, deception system 114 can implement one or more beacons in connection with a host sensor or a host-based monitoring application, such as an antivirus software application, that monitors the beacons or beacon signatures. For example, the host-based monitoring application can be configured to transmit signals or an alert when it detects specific signatures in documents. In another example, the host-based monitoring application can detect embedded beacons or tokens placed in a clandestine location of the document file format. In particular, a watermark can be embedded in the binary format of the document file to detect when the decoy information is loaded into memory. By embedding specific beacon signatures in the decoy documents, the host-based monitoring application can detect and receive beacon signals each time the decoy documents are accessed, opened, etc. Information about the purloined document can be uploaded to the host-based monitoring application.

In yet another suitable embodiment, deception system 114 can implement one or more beacons in connection with a network intrusion detection system. A network intrusion detection system, such as Snort, can be used to detect these embedded beacons or tokens during the egress or exfiltration of the decoy document in network traffic.

In some embodiments, the decoy document itself can be used to detect inside attackers at the time of information exploitation and/or credential misuse. For example, the content of the decoy information can include a decoy login (e.g., a decoy login and password for Google Mail) and/or other credentials embedded in the document content. The bogus login to a website can be created in a decoy document and can be monitored by external approaches (e.g., using a custom script that accesses mail.google.com and parses the bait account pages to gather account activity information). Monitoring the use of decoy information by external systems (e.g., a local IT system, at Gmail, at an external bank) can be used to generate an alert that is correlated with the decoy document in which the credential was placed.

For example, if deception system 114 creates unique decoy usernames for each computer in system 100, the use of a unique decoy username can assist deception system 114 to determine which computer has been compromised, the identity of the inside attacker, etc. Deception system 114 can discover the identity and/or the location of attacking computer systems (e.g., attacking computer system 116). Deception system 114 can also discover the identity and/or the location of attackers or external attacking systems that are in communication with and/or in control of the malware. For example, a single computer can contain embedded decoy information, such as a document with a decoy username and password. A server, such as a web server, that identifies failed login attempts using the decoy username and password can receive the IP address and/or other identifying information relating to the attacking computer system along with the decoy username and password. Alternatively, the server can inform the single computer that the document containing the decoy username and password has been exfiltrated.

It should be noted that, in some embodiments, the beacon can use routines (e.g., a Common Gateway Interface (CGI) script) to instruct another application on the attacker computer system to transmit a signal to indicate that the decoy information has been accessed, transmitted, opened, executed, and/or misused. For example, when the decoy document is opened by an attacker, the embedded beacon causes the attacker computer system to launch a CGI script that notifies a beacon website. In another example, when a decoy Microsoft Word document is opened by an attacker, the embedded beacon uses a CGI route to request that Microsoft Explorer transmit a signal over the Internet to indicate that the decoy document has been exfiltrated.

It should also be noted that document formats generally consist of a structured set of objects of any type. The beacon can be implemented using obfuscation techniques that share the appearance of the code implementing the beacon to appear with the same statistical distribution as the object within which it is embedded. Obtaining the statistical distribution of files is described in greater detail in, for example, Stolfo et al., U.S. Patent Publication No. 2005/0265311 A1, published Dec. 1, 2005, Stolfo et al., U.S. Patent Publication No. 2005/0281291 A1, published Dec. 22, 2005, and Stolfo et al., U.S. Patent Publication No. 2006/0015630 A1, published Jan. 19, 2006, which are hereby incorporated by reference herein in their entireties.

Figure 19:
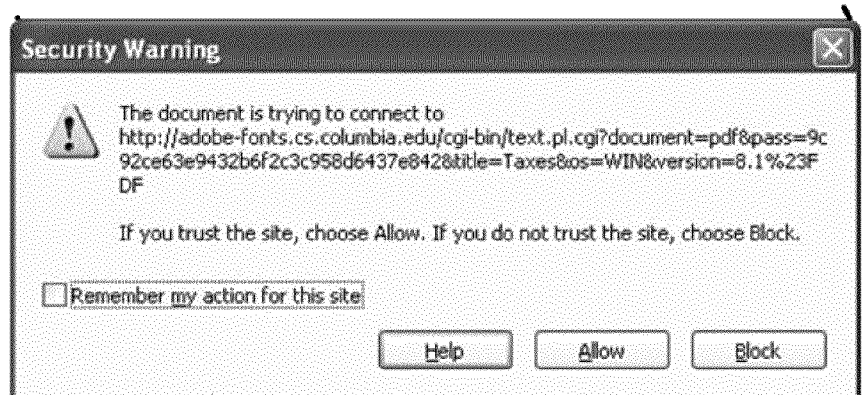
FIG. 19 is a diagram showing an embedded beacon in accordance with some embodiments of the disclosed subject matter.
Figure 20:
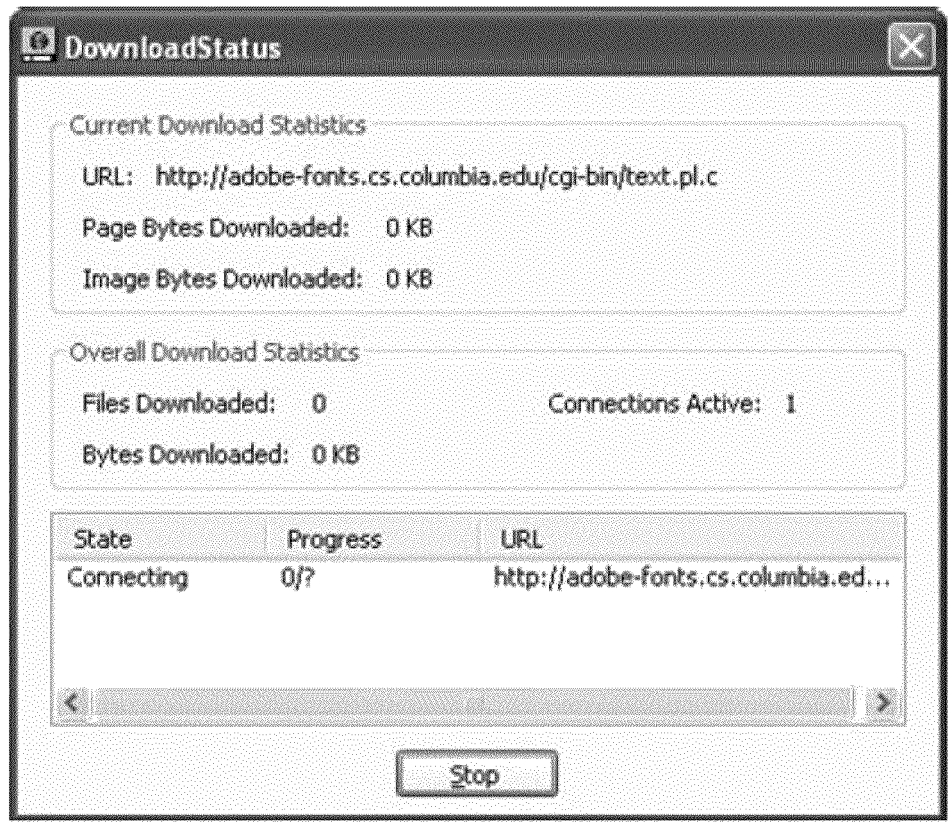
FIG. 20 is a diagram showing the connection opened to an external website by an embedded beacon in accordance with some embodiments of the disclosed subject matter.

An illustrative example of the execution of an embedded active beacon in a decoy document is shown in FIG. 19. As shown, in response to the attacker opening decoy tax document 204 (FIG. 2), the Adobe Acrobat software application runs a Javascript function that displays window 1902. Window 1902 requests that the attacker allow a connection to a particular website. In response to selecting the "Allow" button or any other suitable user interface, the beacon causes a signal to be transmitted to the website (adobe-fonts.cs.columbia.edu) with information relating to the exfiltrated document and/or information relating to the attacker (as shown in FIG. 20).

In some embodiments, the beacon can be a portion of code embedded in documents or other media in a manner that is not obvious to malware or an attacker. The beacon can be embedded such that an attacker is not aware that the attacker has been detected. For example, referring back to FIG. 19, the Javascript function is used to hide the embedded beacon, where the displayed Javascript window requests that the attacker execute the beacon code. In another example, the beacon can be embedded as a believable decoy token.

In some embodiments, deception system 114 can instruct the legitimate user to configure the local machine to allow the one or more beacons to silently transmit signals to a remote website. For example, the first time a decoy document, such as tax document 204 of FIG. 2, is downloaded, deception system 114 can instruct the legitimate user to open the decoy document for review. In response to opening the decoy document, the application, such as Adobe Acrobat, runs a Javascript function that displays window 1902 that warns the user that the document is attempting to make a network connection with a remote server. Deception system 114 can instruct the user to configure the application to allow the beacons embedded in the decoy document to silently transmit signals to the remote website. For example, deception system 114 can instruct the user to selects a "Remember this action" box and an "Allow" box such that subsequently opening the decoy document does not generate the warning message. The warning message can indicate to the inside attacker that the document is a decoy document.

It should be noted that, in some embodiments, the creator or the producer of the application that opens the decoy information may provide the capability within the application to execute embedded beacons. For example, an application creator that develops a word processing application may configure the word processing application to automatically execute embedded beacons in decoy information opened by the word processing application. Accordingly, the application automatically executes the beacon code and does not request that the attacker execute the beacon code.

Figure 21:
FIG. 21 is a diagram showing an example of a website that collects beacon signals in accordance with some embodiments of the disclosed subject matter.

In some embodiments, beacon signals can include information sufficient to identify and/or trace the inside attacker, external attacker, or malware. Beacon signals can include the location of the attacker, the trail of the attacker, the unauthorized actions that the attacker has taken, etc. For example, in response to opening a decoy document, the embedded beacon can automatically execute and transmit a signal to a monitoring website. FIG. 21 provides an example of a website that collects signals from one or more beacons. As shown, the signal (e.g., the beacon ping) can include information relating to the attacker, such as the IP address, the exfiltrated document, and the time that the attacker opened the document. In another example, decoy login identifiers to particular servers can be generated and embedded in decoy documents. In response to monitoring a daily feed list of failed login attempts, the server can identify exfiltrated documents.

In some embodiments, beacon signals are transmitted to deception system 114, where deception system 114 provides the legitimate user with an interface showing each alert received from beacons embedded in decoy documents associated with the legitimate user. In response, the legitimate user can review particular IP addresses, review which documents are being accessed and/or misused by inside attackers, etc. Generally speaking, the legitimate user can gain an understanding of what an inside attacker may be searching for on the legitimate user's device.

Figure 22:
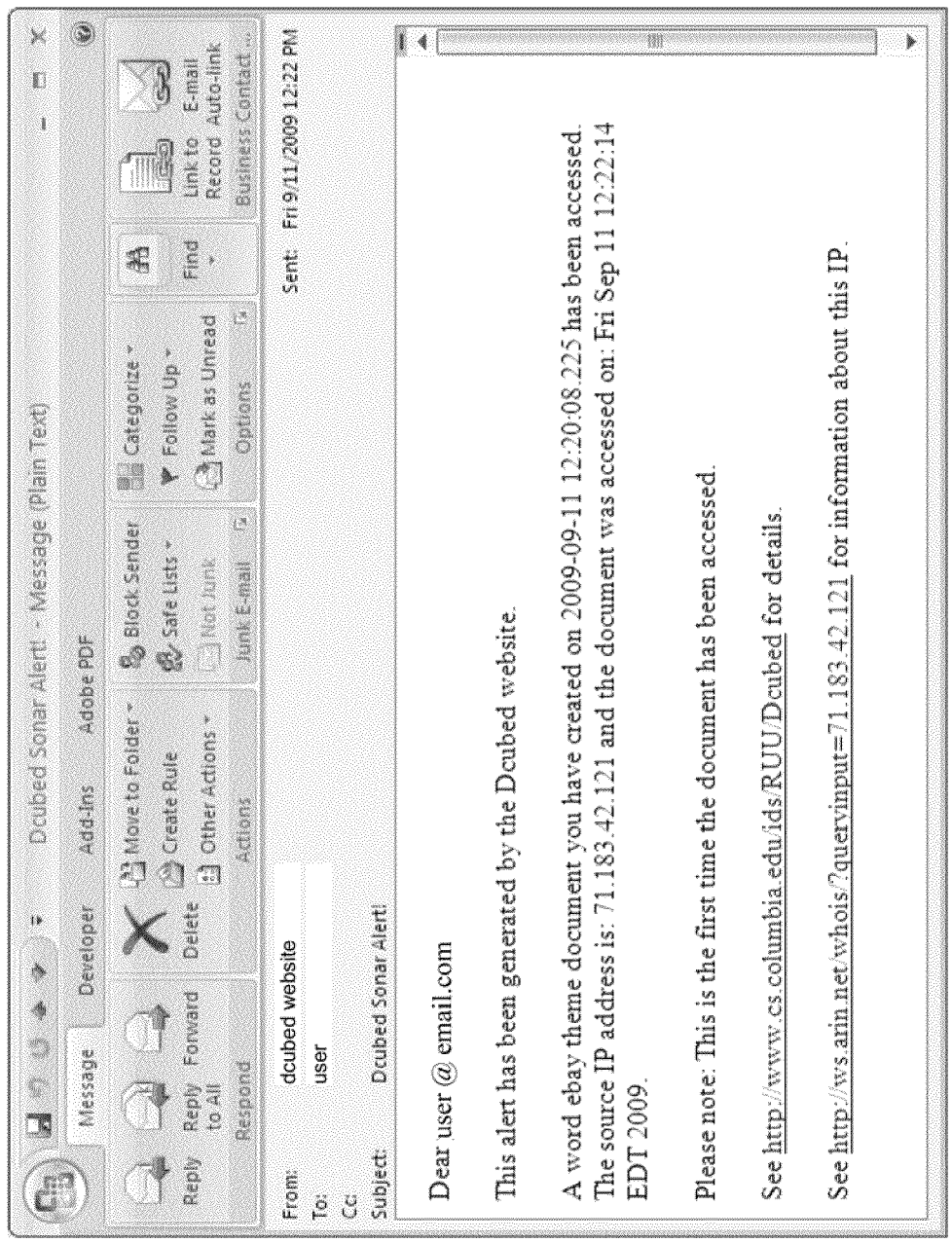
FIG. 22 is a diagram showing an example of an alert that is transmitted to a user in response to receiving signals from a beacon in accordance with some embodiments of the disclosed subject matter.

In addition, deception system 114 can transmit an email notification to the legitimate user that indicates an inside attacker may be present. As shown in FIG. 22, the notification can include information relating to the attacker, such as the IP address, the exfiltrated document, and the time that the attacker opened the document. As also shown, the notification can include count information relating to the number of times the particular decoy document has been accessed, executed, etc.

Figure 23:
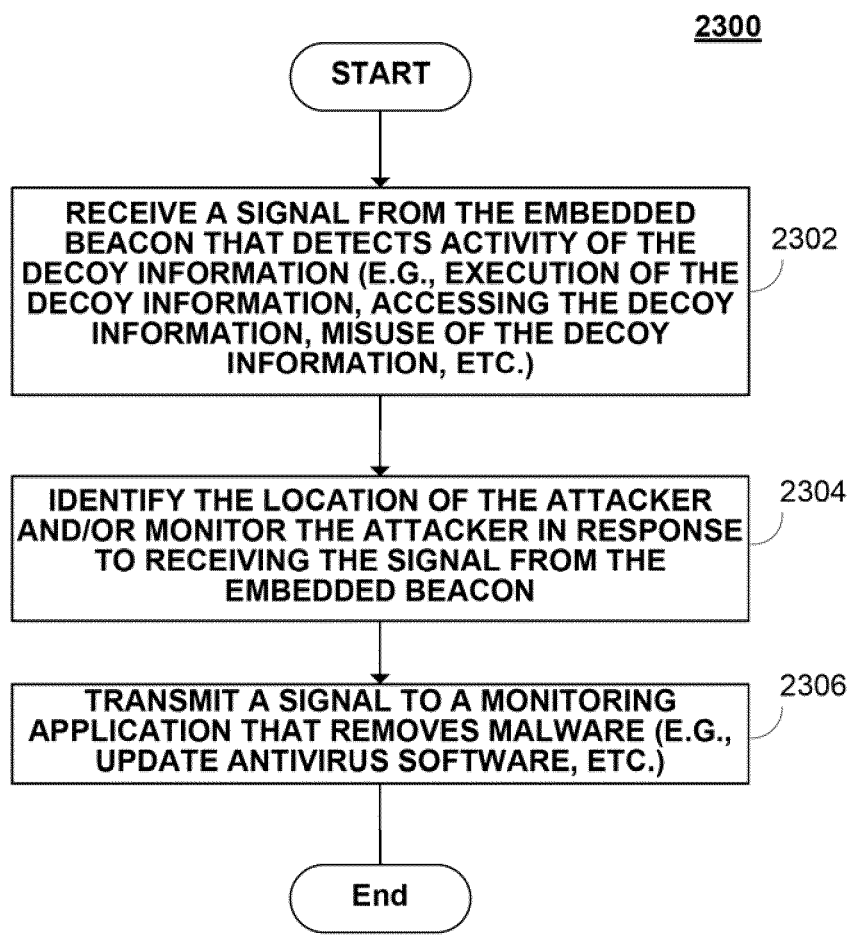
FIG. 23 is a diagram showing an example of a process for receiving signals from a beacon embedded in decoy information and removing malware in accordance with some embodiments of the disclosed subject matter.

In accordance with some embodiments, decoy information with embedded beacons are implemented using a process 2300 as illustrated in FIG. 23. Decoy information can assist in the identification of malicious/compromised computers (e.g., malicious/compromised computer 110 of FIG. 1), internal intruders (e.g., rogue users), or external intruders.

As shown, at 2302, once decoy information is inserted into the operating environment, a signal from an embedded beacon in a particular piece of decoy information can be received in response to detecting activity of the particular piece of decoy information. The embedded beacon can be configured to transmit signals to indicate that the particular piece of decoy information has been accessed, opened, executed, and/or misused. For example, in response to opening, downloading, and/or accessing the document or any other suitable media that includes the decoy information, the embedded beacon can be automatically executed to transmit a signal that the decoy information has been accessed.

In some embodiments, beacons can be implemented in connection with a host-based monitoring application (e.g., an antivirus software application) that monitors the beacons or beacon signatures. For example, the host-based monitoring application can be configured to transmit signals or an alert when it detects specific signatures in documents. By embedding specific beacon signatures in the decoy documents, the software application can detect and receive beacon signals each time the decoy documents are accessed, opened, etc. Information about the purloined document can be uploaded by the monitoring application.

At 2304, in some embodiments, the beacon signal can include information sufficient to identify the location of the attacker and/or monitor the attacker. Beacon signals can include the location of the attacker, the trail of the attacker, the unauthorized actions that the attacker has taken, etc. In some embodiments, beacon signals can include information identifying the attacker computer system (e.g., an IP address) that received and/or accessed the decoy information through an exfiltration channel.

In some embodiments, the beacon embedded in the decoy information can indicate the presence of an attacker to a user (e.g., a user of collaborative system 102, 104, or 106). For example, the decoy information can be a decoy login and a decoy password that is capable of detecting an attacker and monitoring the unauthorized activities of the attacker. In response to the decoy login and/or the decoy password being used on a website, the web server can send a notification to the user that the system of the user has been compromised.

In some embodiments, the beacon embedded in the decoy information can record an irrefutable trace of the attacker when the decoy information is accessed or used by the attacker. For example, the deception system 114 of FIG. 1 uses a back channel that an attacker cannot disable or control. A back channel can notify a website or any other suitable entity that the decoy information (e.g., decoy passwords) is being used. Using the back channel, the website of a financial institution can detect failed login attempts made using passwords that were provided by a decoy document or a decoy network flow. Accordingly, it would be difficult for an attacker to deny that the attacker obtained and used the decoy information. Alternatively, in response to opening the decoy information in the decoy media (e.g., a decoy document), the embedded beacon can transmit a signal to the website of the financial institution.

For example, in some embodiments, the beacon embedded in the decoy information can transmit a signal to a website that logs the unauthorized access of the decoy information by an attacker. The user of a collaborative system can access the website to review the unauthorized access of the decoy information to determine whether the access of the decoy information is an indication of malicious or nefarious activity. In some embodiments, the website can log information relating to the attacker for each access of the decoy information.

At 2306, in some embodiments, with the use of other applications, the malware can be removed in response to receiving the information from the embedded beacon. For example, in response to identifying that malicious code in a particular document is accessing the decoy information (or that an attacker is using the malicious code embedded in a particular document to access the decoy information), the beacon can identify the source of the malicious code and send a signal to a monitoring application (e.g., an antivirus application or a scanning application) that parses through the document likely containing the malicious code. In another example, the beacon can identify that malicious code lies dormant in the file store of the environment awaiting a future attack.

Figure 24:
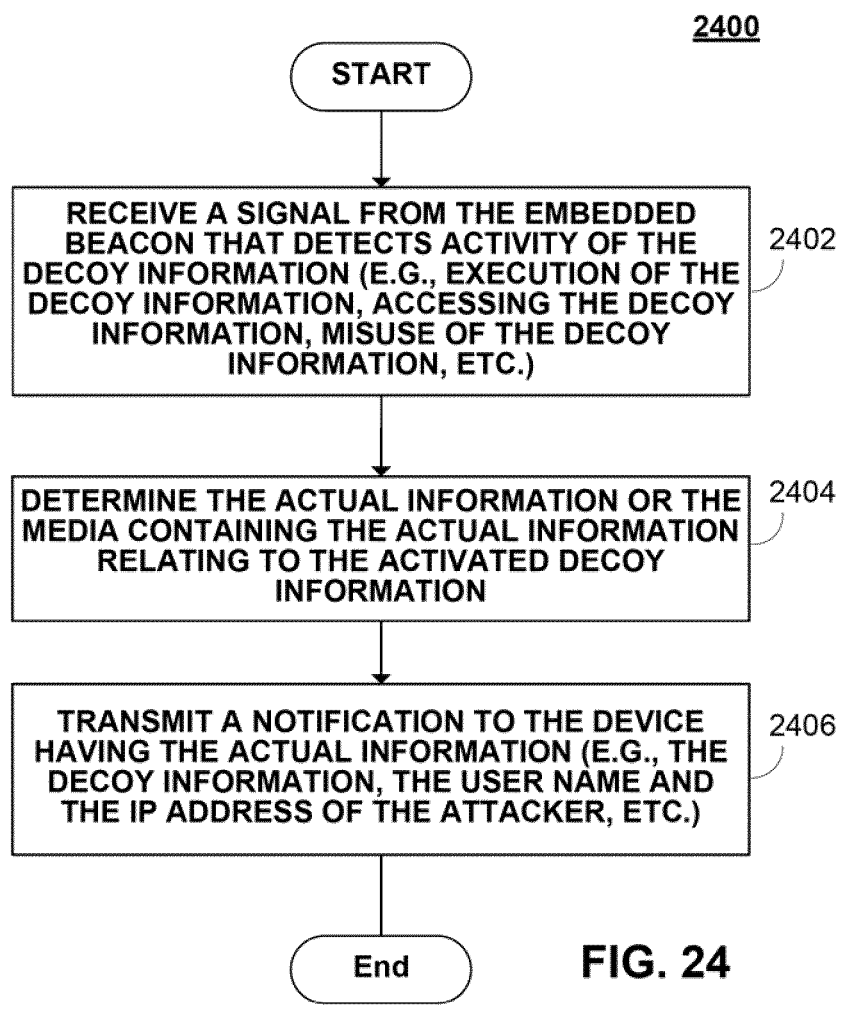
FIG. 24 is a diagram showing an example of a process for transmitting notifications and/or recommendations in response to receiving signals from an embedded beacon in accordance with some embodiments of the disclosed subject matter.

In accordance with some embodiments, decoy information with embedded beacons can transmit additional notifications and/or recommendations using a process 2400 as illustrated in FIG. 24.

As shown, at 2402, once decoy information is inserted into the operating environment, a signal from an embedded beacon in a particular piece of decoy information can be received in response to detecting activity of the particular piece of decoy information. The embedded beacon can be configured to transmit signals to indicate that the particular piece of decoy information has been accessed, opened, executed, and/or misused. For example, in response to opening, downloading, and/or accessing the document or any other suitable media that includes the decoy information, the embedded beacon can be automatically executed to transmit a signal that the decoy information has been accessed.

Alternatively, deception system 114 polls a number of servers for information to monitor decoy credential usage or any other suitable decoy information. For example, an alert component of deception system 114 can poll a number of servers to monitor credential usage, such as university authentication log servers and mail.google.com for Gmail account usage. More particularly, with regard to Gmail accounts, the alert component of deception system 114 can create custom scripts that access and parse the bait account pages to gather account activity information.

In some embodiments, in response to receiving a signal from a beacon, the actual information (e.g., the original document) associated with the decoy information can be determined at 2404. For example, in response to receiving a signal from a beacon, the deception system can determine the actual information that the decoy information was based on and determine the computing system where the actual information is located. In response, at 2406, the collaborative system that has the actual information can be alerted or notified of the accessed decoy information. In some embodiments, the collaborative system can be notified of the decoy information that was accessed, information relating to the computer that accessed, opened, executed, and/or misused the decoy information (or the media containing the decoy information), etc. For example, the deception system can transmit the user name and the IP address of the attacker computer system. In another example, the deception system can transmit, to the computing system, a recommendation to protect the actual information or the original document that contains the actual information (e.g., add or change the password protection).

It should be noted that, in some embodiments, deception system 114 or any other suitable system can be designed to defer making public the identity of a potential attacker or a user suspected of conducting unauthorized activities until sufficient evidence connecting the user with the suspected activities is collected. Such privacy preservation can be used to ensure that users are not falsely accused of conducting unauthorized activities.

Alternatively to using beacons to transmit signals to a remote website, beacons can be associated and/or embedded with decoy information to allow a legitimate user to differentiate decoy information from actual information. As described previously, the embedded beacon can be a portion of code that is configured to operate along with a physical mask, such as a uniquely patterned transparent screen. For example, a pattern can be generated on the display monitor in a bounded box. When the physical mask is overlaid on the displayed window containing the generated pattern, a derived word, picture, icon, or any other suitable indicia can be revealed that allows the legitimate user to discriminate between decoy information and actual information. In another example, the embedded beacon generates a pattern that is a convolution of the indicia and the physical mask allows a user to decode the pattern.

In some embodiments, multiple passive beacons can be embedded in a document that contains both actual and decoy information. When a physical mask is overlaid on the displayed window containing generated patterns for each passive beacon, indicia can be revealed that allows the legitimate user to determine which information is decoy information. For example, the indicia can provide the user with instructions on which information is decoy information.

As described above, deception system 114 can be modeled based on different levels of insider sophistication and capability. For example, some inside attackers have tools available to assist in determining whether a document is a decoy document or a legitimate document, while other inside attackers are equipped with their own observations and thoughts. Deception system 114 can be designed to confuse, deceive, and/or detect low threat level inside attackers having direct observation as the tool available, medium threat level inside attackers that have the opportunity to perform a more thorough investigation, high threat level inside attackers that have multiple tools available (e.g., super computers, access to informed people with organizational information), and/or highly privileged threat level inside attackers that may be aware that the system is baited with decoy information and uses tools to analyze, disable, and/or avoid decoy information. To do this, in some embodiments, multiple beacons or detection mechanisms can be placed in decoy documents or any other suitable decoy information, where these multiple detection mechanisms act synergistically to detect access or attempted exfiltration by an inside attacker, an external attacker, or malware and make it difficult for an attacker to avoid detection. This is sometimes referred to herein as a "web of detectors."

In some embodiments, a decoy document generation component can be combined with a network component that monitors network traps and/or decoy traffic. For example, as described above, the decoy document generation component generates realistic documents that contain decoy credentials that are monitored for misuse and stealthy embedded beacons that signal when the document is accessed. The network component includes monitored network traps that are ties in to the decoy document generation component. These network traps allow targeted credentials to be followed even after leaving the local system.

In another example, within a decoy document, the decoy document can include an embedded honeytoken with a computer login account that provides no access to valuable resources and that is monitored when misused. The decoy document can also include an embedded honeytoken with a banking login account that is created and monitored to entice financially motivated attackers. The decoy document can further include a network-level egress monitor that alerts whenever a marker or passive beacon, planted in the decoy document, is detected. The decoy document can further include a host-based monitor that alerts whenever a decoy document is touched in the file system (e.g., a copy operation). The decoy document can even further include an embedded active beacon that alerts a remote server at a particular website. In turn, the website sends an email alert to the registered user that created and downloaded the decoy document.

In some embodiments, the efficacy of the generated decoy information can be measured by monitoring usage of the decoy information. For example, for a website of a financial institution, the efficacy of the generated decoy information can be measured by monitoring the number of failed login attempts (e.g., on a website, daily feed, secure shell login accounts, etc.). In some embodiments, the efficacy of the generated decoy information can be measured by monitoring egress traffic or file system access. In some embodiments, the efficacy of the generated decoy information can be used to generate reports on the security of a collaborative system or any other suitable device.

In accordance with some embodiments, decoy information can be inserted into a particular software application. For example, decoy information can be inserted specifically into the Microsoft Outlook application. The decoy information can be inserted as decoy mails, decoy notes, decoy email addresses, decoy address book entries, decoy appointments, etc. In some embodiments, decoy email messages can be exchanged between decoy accounts to expose seemingly confidential information to malware or an attacker searching for particular keywords. Any attempt by the malware or an attacker using an external system in communication with the malware to access the decoy information can then be quickly detected. Evidence indicative of unauthorized activities can be collected and studied. For example, a deviation from the pre-scripted decoy traffic, unscripted access to decoy information, and/or various other suitable anomalous events can be collected.

In some embodiments, decoy information can be inserted onto multiple devices. For example, a website can be provided to a user that places decoy information contained in decoy media on registered devices (e.g., the user's computer, the user's personal digital assistant, the user's set-top box, the user's cellular telephone, etc.). Once the decoy media is accessed, a notification can be sent to the user. It should be noted that, as decoy media generally does not have production value other than to attract malware and or potential attackers, activity involving decoy media is highly suggestive of a network compromise or other nefarious activity.

Accordingly, methods, systems, and media for providing trap-based defenses using decoy information are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for providing trap-based defenses, the method comprising:
generating, using a hardware processor, decoy information based at least in part on actual information in a computing environment, wherein the decoy information is generated to comply with one or more document properties and wherein the decoy information is contained in a decoy document;
embedding, using the hardware processor, a beacon that includes code into the decoy document;
inserting, using the hardware processor, the decoy document with the embedded beacon into the computing environment;
causing the code embedded within the beacon to be executed; and
causing the executed code to transmit a signal to a remote server in response to detecting that an attacker has accessed the decoy information, wherein the signal provides a first indication that the decoy information has been accessed by the attacker, and wherein the embedded beacon provides a second indication that differentiates between the decoy information and the actual information.

2. The method of claim 1, wherein the one or more document properties comprise at least one of: believable to the attacker, variable, enticing to the attacker, conspicuous to the attacker, detectable, differentiable from the actual information, and non-interfering with a legitimate user.

3. The method of claim 1, further comprising testing, using the hardware processor, the decoy information to determine whether the decoy information complies with a believable document property by presenting the decoy information and the actual information to a user, wherein the user is provided with the opportunity to select whether the decoy information and the actual information are decoys.

4. The method of claim 3, further comprising removing, using the hardware processor, the decoy information from the computing environment in response to receiving a response rate less than a predetermined amount.

5. The method of claim 1, further comprising performing, using the hardware processor, a search through the computing environment for the actual information used for the generation of the decoy information.

6. The method of claim 1, further comprising receiving, using the hardware processor, user input relating to the actual information used for the generation of the decoy information.

7. The method of claim 1, further comprising receiving, using the hardware processor, at least one location within the computing environment to insert the decoy information.

8. The method of claim 1, further comprising analyzing, using the hardware processor, the computing environment to determine where to insert the decoy information.

9. The method of claim 1, wherein the beacon is a decoy token embedded in the decoy information.

10. The method of claim 9, further comprising monitoring, using the hardware processor, for unauthorized usage of the decoy token.

11. The method of claim 1, wherein the beacon is executable code embedded in the decoy information.

12. The method of claim 11, further comprising executing, using the hardware processor, the executable code in response to the attacker accessing the decoy information, wherein the executable code transmits a signal indicating that the decoy information has been accessed.

13. The method of claim 11, further comprising requesting using the hardware processor, that the attacker permit the execution of the executable code in response to the attacker accessing the decoy information.

14. The method of claim 1, further comprising:
receiving, using the hardware processor, the first indication from the embedded beacon in response to the attacker accessing the decoy information; and
transmitting, using the hardware processor, a notification to a legitimate user that provides information relating to the attacker.

15. The method of claim 14, further comprising tracing, using the hardware processor, an attacker in response to receiving the first indication from the embedded beacon.

16. The method of claim 1, wherein the embedded beacon is a passive beacon, the method further comprising:
detecting, using the hardware processor, that decoy information with the embedded passive beacon has been used; and
transmitting, using the hardware processor, a notification that provides information relating to the attacker.

17. The method of claim 1, wherein the embedded beacon is configured to operate in connection with a monitoring application, and wherein the monitoring application monitors the computing environment for the signal from the embedded beacon.

18. The method of claim 17, wherein the monitoring application is an antivirus application.

19. The method of claim 1, wherein the actual information is contained in an actual document and wherein the embedded beacon differentiates between the decoy document and the actual document.

20. A method for providing trap-based defenses, the method comprising:
generating, using a hardware processor, decoy information based at least in part on actual information in a computing environment, wherein the decoy information is generated to comply with one or more document properties;
embedding, using the hardware processor, a beacon into the decoy information;
inserting, using the hardware processor, the decoy information with the embedded beacon into the computing environment, wherein the embedded beacon provides a first indication that the decoy information has been accessed by an attacker and wherein the embedded beacon provides a second indication that differentiates between the decoy information and the actual information, wherein the decoy information is contained in a decoy document, wherein the actual information is contained in an actual document, and wherein the embedded beacon differentiates between the decoy document and the actual document; and
using, using the hardware processor, at least a portion of the embedded beacon and other document data to generate a pattern that is displayed to a user in response to the user accessing the decoy document; and
presenting, using the hardware processor, at an index in response to placing a physical mask over the generated pattern, wherein the physical mask decodes the generated pattern into the index and wherein the index provides an indication as to whether at least a portion of the decoy document contains the decoy information.

21. A system for providing trap-based defenses, the system comprising:
a processor that:
generates decoy information based at least in part on actual information in a computing environment, wherein the decoy information is generated to comply with one or more document properties and wherein the decoy information is contained in a decoy document;
embeds a beacon that includes code into the decoy document; and
inserts the decoy document with the embedded beacon into the computing environment;
causes the code embedded within the beacon to be executed; and
causes the executed code to transmit a signal to a remote server in response to detecting that an attacker has accessed the decoy information, wherein the signal provides a first indication that the decoy information has been accessed by the attacker, and wherein the embedded beacon provides a second indication that differentiates between the decoy information and the actual information.

22. The system of claim 21, wherein the processor is further configured to test the decoy information to determine whether the decoy information complies with the believable document property by presenting the decoy information and the actual information to a user, wherein the user is provided with the opportunity to select whether the decoy information and the actual information are decoys.

23. The system of claim 22, wherein the processor is further configured to remove the decoy information from the computing environment in response to receiving a response rate less than a predetermined amount.

24. The system of claim 21, wherein the processor is further configured to perform a search through the computing environment for the actual information used for the generation of the decoy information.

25. The system of claim 21, wherein the processor is further configured to receive user input relating to the actual information used for the generation of the decoy information.

26. The system of claim 21, wherein the processor is further configured to receive at least one location within the computing environment to insert the decoy information.

27. The system of claim 21, wherein the processor is further configured to analyze the computing environment to determine where to insert the decoy information.

28. The system of claim 21, wherein the beacon is a decoy token embedded in the decoy information, and wherein the processor is further configured to monitor for unauthorized usage of the decoy token.

29. The system of claim 21, wherein the beacon is executable code embedded in the decoy information, and wherein the processor is further configured to execute the executable code in response to the attacker accessing the decoy information, wherein the executable code transmits a signal indicating that the decoy information has been accessed.

30. The system of claim 29, wherein the processor is further configured to request that the attacker permit the execution of the executable code in response to the attacker accessing the decoy information.

31. The system of claim 21, wherein the processor is further configured to: receive the first indication from the embedded beacon in response to the attacker accessing the decoy information; and transmit a notification to a legitimate user that provides information relating to the attacker.

32. The system of claim 21, wherein the embedded beacon is a passive beacon, and wherein the processor is further configured to:
detect that decoy information with the embedded passive beacon has been used; and
transmit a notification that provides information relating to the attacker.

33. A system for providing trap-based defenses, the system comprising:
a processor that:
generates decoy information based at least in part on actual information in a computing environment, wherein the decoy information is generated to comply with one or more document properties;
embeds a beacon into the decoy information; and
inserts the decoy information with the embedded beacon into the computing environment, wherein the embedded beacon provides a first indication that the decoy information has been accessed by an attacker and wherein the embedded beacon provides a second indication that differentiates between the decoy information and the actual information, wherein the decoy information is contained in a decoy document, wherein the actual information is contained in an actual document, and wherein the embedded beacon differentiates between the decoy document and the actual document;

uses at least a portion of the embedded beacon and other document data to generate a pattern that is displayed to a user in response to the user accessing the decoy document; and presents an index in response to placing a physical mask over the generated pattern, wherein the physical mask decodes the generated pattern into the index and wherein the index provides an indication as to whether at least a portion of the decoy document contains the decoy information.

34. A non-transitory computer-readable medium containing computer-executable instructions that, when executed by a processor, cause the processor to perform a method for providing trap-based defenses, the method comprising:

generating decoy information based at least in part on actual information in a computing environment, wherein the decoy information is generated to comply with one or more document properties and wherein the decoy information is contained in a decoy document;

embedding a beacon that includes code into the decoy document;

inserting the decoy document with the embedded beacon into the computing environment;

causing the code embedded within the beacon to be executed; and causing the executed code to transmit a signal to a remote server in response to detecting that an attacker has accessed the decoy information, wherein the signal provides a first indication that the decoy information has been accessed by the attacker, and wherein the embedded beacon provides a second indication that differentiates between the decoy information and the actual information.

35. The non-transitory computer-readable medium of claim 34, wherein the method further comprises testing the decoy information to determine whether the decoy information complies with the believable document property by presenting the decoy information and the actual information to a user, wherein the user is provided with the opportunity to select whether the decoy information and the actual information are decoys.

36. The non-transitory computer-readable medium of claim 35, wherein the method further comprises removing the decoy information from the computing environment in response to receiving a response rate less than a predetermined amount.

37. The non-transitory computer-readable medium of claim 34, wherein the method further comprises performing a search through the computing environment for the actual information used for the generation of the decoy information.

38. The non-transitory computer-readable medium of claim 34, wherein the method further comprises receiving user input relating to the actual information used for the generation of the decoy information.

39. The non-transitory computer-readable medium of claim 34, wherein the method further comprises receiving at least one location within the computing environment to insert the decoy information.

40. The non-transitory computer-readable medium of claim 34, wherein the method further comprises analyzing the computing environment to determine where to insert the decoy information.

41. The non-transitory computer-readable medium of claim 34, wherein the method further comprises monitoring for unauthorized usage of a decoy token.

42. The non-transitory computer-readable medium of claim 34, wherein the beacon is executable code embedded in the decoy information, and wherein the method further comprises executing the executable code in response to the attacker accessing the decoy information, wherein the executable code transmits a signal indicating that the decoy information has been accessed.

43. The non-transitory computer-readable medium of claim 42, wherein the method further comprises requesting that the attacker permit the execution of the executable code in response to the attacker accessing the decoy information.

44. The non-transitory computer-readable medium of claim 34, wherein the method further comprises:

receiving the first indication from the embedded beacon in response to the attacker accessing the decoy information; and transmitting a notification to a legitimate user that provides information relating to the attacker.

45. The non-transitory computer-readable medium of claim 34, wherein the embedded beacon is a passive beacon, and wherein the method further comprises:

detecting that decoy information with the embedded passive beacon has been used; and transmitting a notification that provides information relating to the attacker.

46. A non-transitory computer-readable medium containing computer-executable instructions that, when executed by a processor, cause the processor to perform a method for providing trap-based defenses, the method comprising:

generating decoy information based at least in part on actual information in a computing environment, wherein the decoy information is generated to comply with one or more document properties;

embedding a beacon into the decoy information; and inserting the decoy information with the embedded beacon into the computing environment, wherein the embedded beacon provides a first indication that the decoy information has been accessed by an attacker and wherein the embedded beacon provides a second indication that differentiates between the decoy information and the actual information, wherein the decoy information is contained in a decoy document, wherein the actual information is contained in an actual document, and wherein the embedded beacon differentiates between the decoy document and the actual document;

using at least a portion of the embedded beacon and other document data to generate a pattern that is displayed to a user in response to the user accessing the decoy document; and presenting an index in response to placing a physical mask over the generated pattern, wherein the physical mask decodes the generated pattern into the index and wherein the index provides an indication as to whether at least a portion of the decoy document contains the decoy information.

* * * * *